US011689883B2

(12) United States Patent
Alawieh et al.

(10) Patent No.: US 11,689,883 B2
(45) Date of Patent: Jun. 27, 2023

(54) SIDELINK RANGING AND MULTILATERATION

(71) Applicant: Fraunhofer-Gesellschaft zur Förderung der angewandten Forschung e.V., Munich (DE)

(72) Inventors: Mohammad Alawieh, Erlangen (DE); Bastian Perner, Erlangen (DE); Niels Hadaschik, Erlangen (DE); Norbert Franke, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/990,489

(22) Filed: Aug. 11, 2020

(65) Prior Publication Data

US 2020/0374656 A1 Nov. 26, 2020

Related U.S. Application Data

(63) Continuation of application No. PCT/EP2018/054050, filed on Feb. 19, 2018.

(51) Int. Cl.
*H04W 4/02* (2018.01)
*G01S 5/00* (2006.01)
(Continued)

(52) U.S. Cl.
CPC ........... *H04W 4/023* (2013.01); *G01S 5/0072* (2013.01); *G01S 5/0257* (2013.01); *G01S 5/0268* (2013.01); *G01S 5/145* (2013.01); *H04W 72/04* (2013.01)

(58) Field of Classification Search
None
See application file for complete search history.

(56) References Cited

U.S. PATENT DOCUMENTS 9,439,039 B1 9/2016 Libin et al.
2009/0011774 A1* 1/2009 Shan .................... G01S 5/0205 455/456.1

(Continued)

FOREIGN PATENT DOCUMENTS

CN 105519211 A 4/2016
CN 107439033 A 12/2017

(Continued)

OTHER PUBLICATIONS

NGMN Alliance a White Paper "Small Cell Backhaul Requirements", Version 1.0, Jun. 4, 2012.

(Continued)

*Primary Examiner* — German Viana Di Prisco
(74) *Attorney, Agent, or Firm* — NKL Law; Jae Youn Kim

(57) ABSTRACT

A transceiver for a wireless communication system is configured to: communicate with at least one other transceiver of the system using a sidelink resource pool of the system; transmit signals on resources of the pool that are allocated to the transceiver on a period basis with equal length periods $t_{periodA}$; transmit a first signal on a first resource of the resources allocated to the transceiver, and receive a second signal from another transceiver of the system on a second resource, the second signal being transmitted by the other transceiver responsive to a reception of the first signal, the second signal being transmitted by the other transceiver on the second resource using the period $t_{periodA}$ based on which the resources are allocated to the transceiver; determine a distance to the other transceiver based on a time $t_{roundA}$ between the transmission of the first signal and the reception of the second signal from the other transceiver, and based on the period $t_{periodA}$ based on which the resources are allocated to the transceiver.

22 Claims, 26 Drawing Sheets

(51) Int. Cl.
*G01S 5/02* (2010.01)
*G01S 5/14* (2006.01)
*H04W 72/04* (2023.01)

(56) References Cited

U.S. PATENT DOCUMENTS

2015/0016428 A1 1/2015 Narasimha et al.
2018/0098299 A1* 4/2018 Chae .......................... H04J 11/00
2019/0036738 A1* 1/2019 Miao .......................... H04L 25/02
2019/0208387 A1* 7/2019 Jiang .................... H04W 72/044
2020/0128357 A1* 4/2020 Kim .......................... H04W 8/24
2020/0217918 A1* 7/2020 Rydén .................... G01S 5/0236

FOREIGN PATENT DOCUMENTS

EP 3280200 A1 2/2018
WO 96/25673 A1 8/1996

OTHER PUBLICATIONS

Technical Specification 3GPP 36.211 V13.0.0 (Dec. 2015), 3rd Generation Partnership Project, Technical Specification Group Radio Access Network; Evolved Universal Terrestrial Radio Access (E-UTRA); Physical channels and modulation (Release 13) 2016.

Technical Specification 3GPP 36.355 V13.0.0 (Dec. 2015) 3rd Generation Partnership Project; Technical Specification Group Radio Access Network; Evolved Universal Terrestrial Radio Access (E-UTRA); Lte Positioning Protocol (LPP) (Release 13), 2016.

3GPP TS 36.211 V13.0.0 (Dec. 2015) Evolved Universal Terrestrial Radio Access (E-UTRA); Physical channels and modulation (Release 13); Section 9-Sidelink.

3GPP TS 36.212 Section 5.4—Sidelink transport channels and control information.

3GPP TS 36.213 V12.8.0 (Dec. 2015), Release 12; Section 14—UE procedure related to sidelink, pp. 300-318.

TS 36.331 Section 5.10, 6.3.8.

TS 36.101 A.6—Sidelink reference measurement channels.

Drane, C..et al.: "Positioning GSM Telephones",IEEE Communications Magazine, IEEE Service Center, Piscataway, US, vol. 36, No. 4, Apr. 1, 1998 (Apr. 1, 1998). pp. 46-54,58, XP000752570, ISSN: 0163-6804, DOI: 10.1109/35.667413, Paragraphs "Propagati on Time" and "Time Difference of Arrival ", figure 1.

Eiwischger, B. et al.: "Efficient Ambiguity Resolution in Wireless Localization Systems", IEEE Transactions on Industrial Informatics, IEEE Service Center, New York, NY, US, vol. 13, No. 2, Apr. 1, 2017 (Apr. 1, 2017), pp. 888-897, XP011647211, ISSN: 1551-3203, DOI: 10.1109/TI I.2017.2649561, [retrieved on Apr. 19, 2017] p. 889, left-hand column, paragraph 2.

Part 15.8: Wireless Medium Access Control (MAC) and Physical Layer (PHY) Specifications for Peer Aware Communications (PAC); P802.15.8-D01 , IEEE Draft; P802.15.8-D01, IEEE-SA, Piscataway, NJ USA, vol. 802.15.8, No. 001 Mar. 13, 2017 (Mar. 13, 2017), p. 264, 270, Retrieved from the Internet: URL:grouper.ieee.org/groups/802/15/private/Draft/TG8/P802.15.8-D01.pdf.

Xueying Song, "Office Action for CN Application No. 201880092267.4", dated May 17, 2022, CNIPA, China.

* cited by examiner

100

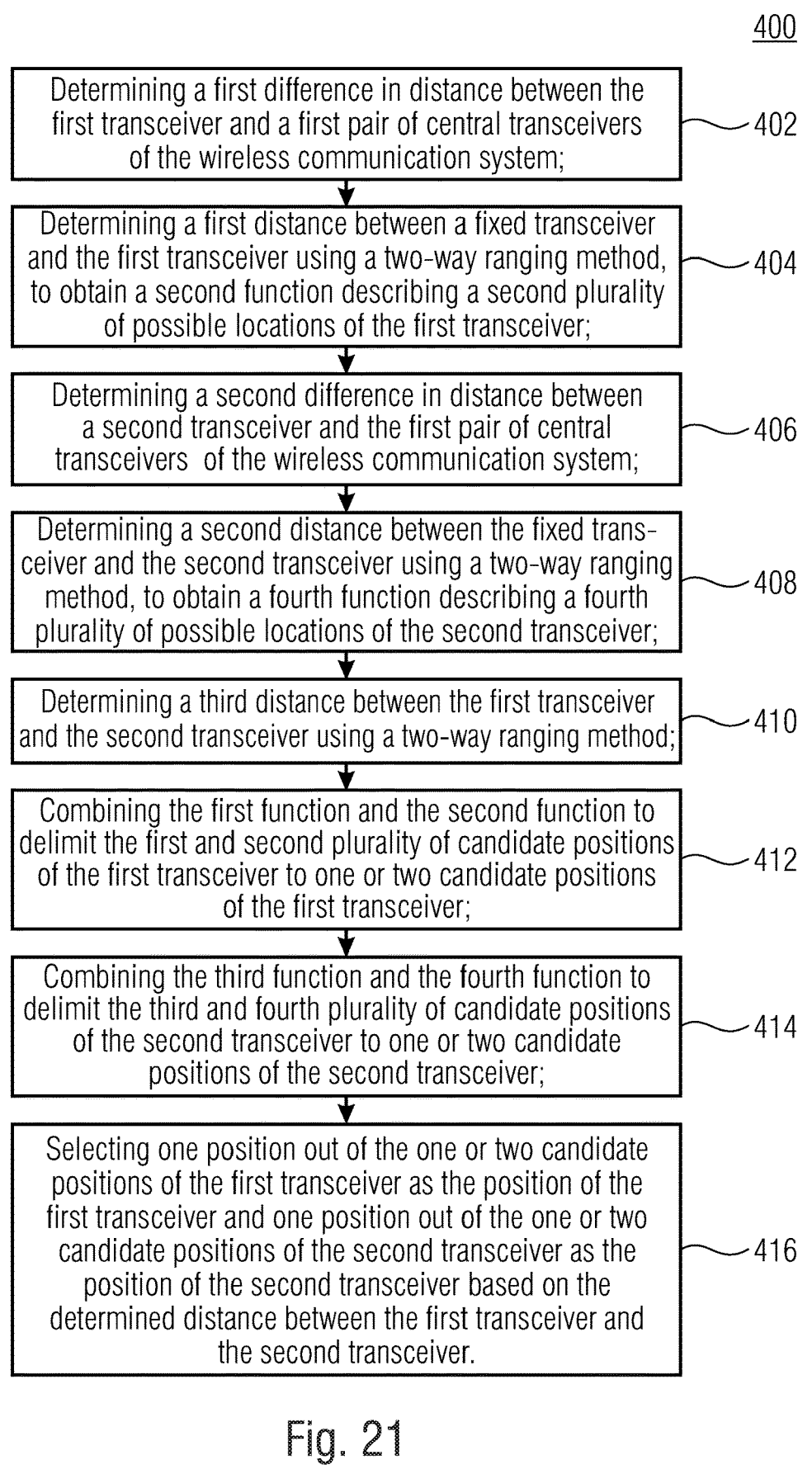

400

Determining a first difference in distance between the first transceiver and a first pair of central transceivers of the wireless communication system; 402

Determining a first distance between a fixed transceiver and the first transceiver using a two-way ranging method, to obtain a second function describing a second plurality of possible locations of the first transceiver; 404

Determining a second difference in distance between a second transceiver and the first pair of central transceivers of the wireless communication system; 406

Determining a second distance between the fixed transceiver and the second transceiver using a two-way ranging method, to obtain a fourth function describing a fourth plurality of possible locations of the second transceiver; 408

Determining a third distance between the first transceiver and the second transceiver using a two-way ranging method; 410

Combining the first function and the second function to delimit the first and second plurality of candidate positions of the first transceiver to one or two candidate positions of the first transceiver; 412

Combining the third function and the fourth function to delimit the third and fourth plurality of candidate positions of the second transceiver to one or two candidate positions of the second transceiver; 414

Selecting one position out of the one or two candidate positions of the first transceiver as the position of the first transceiver and one position out of the one or two candidate positions of the second transceiver as the position of the second transceiver based on the determined distance between the first transceiver and the second transceiver. 416

Fig. 21

SIDELINK RANGING AND MULTILATERATION

CROSS-REFERENCES TO RELATED APPLICATIONS

This application is a continuation of copending International Application No. PCT/EP2018/054050, filed Feb. 19, 2018, which is incorporated herein by reference in its entirety.

The present invention relates to the field of wireless communication networks, and more specifically, to concepts for transmitting data in wireless communication networks. Embodiments of the present invention relate to sidelink ranging. Further embodiments relate to sidelink multilateration. Some embodiments relate to an approach to enable ranging over sidelink.

BACKGROUND OF THE INVENTION

FIG. 1 is a schematic representation of an example of a wireless network 100 including a core network 102 and a radio access network 104. The radio access network 104 may include a plurality of base stations $eNB_1$ to $eNB_5$, each serving a specific area surrounding the base station schematically represented by respective cells $\mathbf{106}_1$ to $\mathbf{106}_5$. The base stations are provided to serve users within a cell. A user may be a stationary device or a mobile device. Further, the wireless communication system may be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items having embedded therein electronics, software, sensors, actuators, or the like as well as network connectivity that enable these devices to collect and exchange data across an existing network infrastructure. FIG. 1 shows an exemplary view of only five cells, however, the wireless communication system may include more such cells. FIG. 1 shows two users $UE_1$ and $UE_2$, also referred to as user equipment (UE), that are in cell $\mathbf{106}_2$ and that are served by base station $eNB_2$. Another user $UE_3$ is shown in cell $\mathbf{106}_4$ which is served by base station $eNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$. Further, FIG. 1 shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $eNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $eNB_1$ to $eNB_5$ may be connected to the core network 102, e.g. via the S1 interface, via respective backhaul links $\mathbf{114}_1$ to $\mathbf{114}_5$, which are schematically represented in FIG. 1 by the arrows pointing to "core". The core network 102 may be connected to one or more external networks. Further, some or all of the respective base station $eNB_1$ to $eNB_5$ may connected, e.g. via the X1 or X2 interface, with each other via respective backhaul links $\mathbf{116}_1$ to $\mathbf{116}_5$, which are schematically represented in FIG. 1 by the arrows pointing to "enBs"

The wireless network or communication system depicted in FIG. 1 may by a heterogeneous network having two distinct overlaid networks, a network of macro cells with each macro cell including a macro base station, like base station $eNB_1$ to $eNB_5$, and a network of small cell base stations (not shown in FIG. 1), like femto or pico base stations.

For data transmission, a physical resource grid may be used. The physical resource grid may comprise a set of resource elements to which various physical channels and physical signals are mapped. For example, the physical channels may include the physical downlink and uplink shared channels (PDSCH, PUSCH) carrying user specific data, also referred to as downlink and uplink payload data, the physical broadcast channel (PBCH) carrying for example a master information block (MIB) and a system information block (SIB), the physical downlink and uplink control channels (PDCCH, PUCCH) carrying for example the downlink control information (DCI), etc. For the uplink, the physical channels may further include the physical random-access channel (PRACH or RACH) used by UEs for accessing the network once a UE synchronized and obtained the MIB and SIB. The physical signals may comprise reference signals (RS), synchronization signals and the like. The resource grid may comprise a frame having a certain duration, like 10 milliseconds, in the time domain and having a given bandwidth in the frequency domain. The frame may have a certain number of subframes of a predefined length, e.g., 2 subframes with a length of 1 millisecond. Each subframe may include two slots of 6 or 7 OFDM symbols depending on the cyclic prefix (CP) length.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR (New Radio) standard.

In the wireless communication network as shown in FIG. 1 the radio access network 104 may be a heterogeneous network including a network of primary cells, each including a primary base station, also referred to as a macro base station. Further, a plurality of secondary base stations, also referred to as small cell base stations, may be provided for each of the macro cells. FIG. 2 is a schematic representation of a cell, like cell $\mathbf{106}_1$ in FIG. 1, having two distinct overlaid networks, the networks comprising a macro cell network including the macro cell $\mathbf{106}_1$, and a small cell network. Although FIG. 2 represents only a single macro cell, it is noted that one or more of the other cells in FIG. 1 may also use the overlaid networks. The small cell network comprises a plurality of small cell base stations $SeNB_1$ to $SeNB_5$ each operating within a respective area $\mathbf{120}_1$ to $\mathbf{120}_5$, also referring as the coverage area of the small cell. The small cell base stations $SeNB_1$ to $SeNB_5$ may be controlled by the macro cell base station $MeNB_1$ to which the respective small cell base stations $SeNB_1$ to $SeNB_5$ are connected via respective backhaul links $\mathbf{122}_1$ to $\mathbf{122}_5$. Rather than connecting the small cell base stations via the backhaul links to the macro cell base station, one or more of the small cell base stations may be coupled to the core network via respective backhaul links. FIG. 2 further shows a user equipment UE being served by the macro cell base station $MeNB_1$ as indicated by arrow $124_1$ and by the small cell base station $SeNB_1$, as indicated schematically by the arrow $124_2$. FIG. 3 is a further schematic representation of a plurality of small cells $120_1$ to $120_3$ of a macro cell (not shown). The macro cell may be similar to that in FIG. 2. Each small cell may serve one or more UEs. The respective small cell base stations $SeNB_1$, $SeNB_2$, $SeNB_3$, . . . , other than in FIG. 2, are connected via the backhaul links or connections $102_1$ to $102_3$ to the core network 102. The respective small cells $102_1$ to $102_3$ may be directly connected with each other via the X2 interface, as schematically indicated in FIG. 3. The transport network connecting the respective small cells to the core network 102 may be an optical fiber network including one or more points of presence (PoP) at which a plurality of small cells are connected to the transport network. Further details about a backhaul architecture as shown in FIG. 3 is described in reference [1].

The small cells, also referred to as secondary mobile communication cells, SCs, form an overlay network to the network of macro cells, also referred to as primary mobile communication cells, PC. The small cells may be connected via backhaul links (BL) to the macro cell (FIG. 2) and/or to the core network (FIG. 3). The backhaul links may be wired or wireless links, and in case of connecting the small cells via the backhaul links to the core network, the point of presence (PoP) of the transport network (FIG. 3) may serve as an interface to the core network. Each small cell may serve a number of mobile users UE within its coverage area by means of a wireless access link (AL) $124_2$. Further, the UEs may be connected to the primary cell, for example to receive control signals, and the connection may be referred to as a control link (CL).

In wireless communication networks as described above with reference to FIG. 1 to FIG. 3, cellular timing advance (TA) is employed.

In long term evolution (LTE), if a UE wishes to connect (establish a radio resource control (RRC) connection) it sends its uplink random access preamble. The eNB measures the timing advance that may be used based on the UE uplink signal (PUSCH/PUCCH/SRS). For that, the eNB measures the difference between the uplink reception and the subframe time.

The purpose of TA is to maintain symbol timing and therefore orthogonality, the accuracy is measured in steps of XX-TA, where each TA stands for 16*Ts=0.512 μs (as defined in 36.213 sec. 4.2.3). The distance can be estimated based on the TA measurement with one TA resulting in 78m.

The UE shall adjust the timing of its transmissions with a relative accuracy better than or equal to ±4*Ts seconds to the signaled timing advance value compared to the timing of preceding uplink transmission.

However, applying an adaptive correction similar to TA procedure will limit the accuracy according w.r.t. Ts.

Further, two way ranging systems are known. The basic ranging principle is illustrated in FIG. 4. In Detail, FIG. 4 shows in a diagram a propagation of signals between two UEs during two-way ranging. Thereby, the ordinate denotes the time, where the abscissa denotes the distance between the two UEs. Since the two UEs are not synchronized, UE1 waits for the reply signal from UE2. t_reply at UE2 is normally defined and known to UE1, hence, it can simply calculate the range from the time of flight (t_p) using the following formula:

$$t_{round}=t\_\text{reply}+2t_p$$

However, the signaling in sidelink does not allow for direct ranging approaches. The UE cannot simply reply without taking the allocated resources into account.

SUMMARY

An embodiment may have a transceiver for a wireless communication system, wherein the transceiver is configured to communicate with at least one other transceiver of the wireless communication system using a sidelink resource pool of the wireless communication system; wherein the transceiver is configured to transmit signals on resources of the sidelink resource pool that are allocated to the transceiver on a period basis with equal length periods $t_{periodA}$; wherein the transceiver is configured to transmit a first signal on a first resource of the resources allocated to the transceiver; wherein the transceiver is configured to receive a second signal from another transceiver of the wireless communication system on a second resource, the second signal transmitted by the other transceiver responsive to a reception of the first signal, wherein the second signal is transmitted by the other transceiver on the second resource using the period $t_{periodA}$ based on which the resources are allocated to the transceiver; wherein the transceiver is configured to determine a distance to the other transceiver based on a time $t_{roundA}$ between the transmission of the first signal and the reception of the second signal from the other transceiver, and based on the period $t_{periodA}$ based on which the resources are allocated to the transceiver; wherein the second resource is one of the resources allocated to the transceiver following the first resource.

According to another embodiment, a system may have: the inventive transceiver; and the other transceiver, wherein the other transceiver is configured to transmit the second signal responsive to the reception of the first signal, wherein the other transceiver is configured to transmit the second signal on the second resource using the period based on which the resources are allocated to the transceiver.

According to another embodiment, a method for determining a distance between a first transceiver and a second transceiver of a wireless communication system, the first transceiver and the second transceiver communicating with each other using resources of a sidelink resource pool allocated to the first transceiver on a period basis with equal length periods and allocated to the second transceiver on a period basis with equal length periods, may have the steps of: transmitting, by the first transceiver, a first signal on a first resource of the resources allocated to the first transceiver; transmitting, by the second transceiver, a second signal responsive to the reception of the first signal, wherein the second signal is transmitted by the second transceiver on a second resource using the period based on which the resources are allocated to the first transceiver; receiving, by the first transceiver, the second signal transmitted by second transceiver; and determining a distance between the first transceiver and the second transceiver based on a time between the transmission of the first signal by the first transceiver and the reception of the second signal by the first transceiver, and based on the period based on which the resources are allocated to the first transceiver; wherein the second resource is one of the resources allocated to the transceiver following the first resource.

Another embodiment may have a transceiver for a wireless communication system, wherein the transceiver is configured to communicate with at least one other transceiver of the wireless communication system using a sidelink resource pool of the wireless communication system;

wherein the transceiver is configured to receive a control signal from a central transceiver of the wireless communication system, the control signal allocating a response time multiplier m to the other transceiver; wherein the transceiver is configured to transmit a first signal on a resource of the sidelink resource pool; wherein the transceiver is configured to receive a second signal from the other transceiver of the wireless communication system on a resource of the sidelink resource pool, the second signal transmitted by the other transceiver responsive to a reception of the first signal, wherein the second signal is transmitted by the other transceiver using the response time multiplier m; wherein the transceiver is configured to determine a distance to the other transceiver based on a time $t_{roundA}$ between the transmission of the first signal and the reception of the second signal from the other transceiver, and based on a response time $T_s$ of the other transceiver and the response time multiplier m allocated to the other transceiver; wherein the response time $T_s$ is a sampling rate or quantization value of the other transceiver.

According to another embodiment, a system may have: the inventive transceiver; and another inventive transceiver, wherein the other transceiver is configured to transmit the second signal responsive to the reception of the first signal, wherein the other transceiver is configured to transmit the second signal using the response time multiplier m allocated to the other transceiver.

According to another embodiment, a method for determining a distance between a first transceiver and a second transceiver of a wireless communication system, the first transceiver and the second transceiver communicating with each other using resources of a sidelink resource pool, may have the steps of: receiving a control signal from a central transceiver of the wireless communication system, the control signal allocating a response time multiplier m to the other transceiver; transmitting a first signal on a resource of the sidelink resource pool; receiving a second signal from the other transceiver of the wireless communication system on a resource of the sidelink resource pool, the second signal transmitted by the other transceiver responsive to a reception of the first signal, wherein the second signal is transmitted by the other transceiver using the response time multiplier m; determining a distance to the other transceiver based on a time $t_{roundA}$ between the transmission of the first signal and the reception of the second signal from the other transceiver, and based on a response time $T_s$ of the other transceiver and the response time multiplier m allocated to the other transceiver; wherein the response time $T_s$ is a sampling rate or quantization value of the other transceiver.

According to yet another embodiment, a method for determining a position of a first transceiver of a wireless communication system may have the steps of: determining a first difference in distance between the first transceiver and a first pair of central transceivers of the wireless communication system based on a first time difference of arrival of a signal of the first transceiver received at the first pair of central transceivers, to obtain a first function describing a first plurality of candidate positions of the first transceiver; determining a second difference in distance between the first transceiver and a second pair of central transceivers of the wireless communication system based on a second time difference of arrival of a signal of the first transceiver received at the second pair of central transceivers, to obtain a second function describing a second plurality of candidate positions of the first transceiver; determining a third difference in distance between a second transceiver of the wireless communication system and the first pair of central transceivers of the wireless communication system based on a third time difference of arrival of a signal of the second transceiver received at the first pair of central transceivers, to obtain a third function describing a third plurality of candidate positions of the second transceiver; determining a fourth difference in distance between the second transceiver and the second pair of central transceivers of the wireless communication system based on a fourth time difference of arrival of a signal of the second transceiver received at the second pair of central transceivers, to obtain a fourth function describing a fourth plurality of candidate positions of the second transceiver; determining a distance between the first transceiver and the second transceiver using a two-way ranging method; combining the first function and the second function to delimit the first and second plurality of candidate positions of the first transceiver to one or two candidate positions of the first transceiver; combining the third function and the fourth function to delimit the third and fourth plurality of candidate positions of the second transceiver to one or two candidate positions of the second transceiver; selecting one position out of the one or two candidate positions of the first transceiver as the position of the first transceiver and one position out of the one or two candidate positions of the second transceiver as the position of the second transceiver based on the determined distance between the first transceiver and the second transceiver.

According to yet another embodiment, a method determining a position of a first transceiver of a wireless communication system may have the steps of: determining a first difference in distance between the first transceiver and a first pair of central transceivers of the wireless communication system based on a first time difference of arrival of a signal of the first transceiver received at the first pair of central transceivers, to obtain a first function describing a first plurality of possible positions of the first transceiver; determining a first distance between a fixed transceiver and the first transceiver using a two-way ranging method, to obtain a second function describing a second plurality of possible locations of the first transceiver; determining a second difference in distance between a second transceiver and the first pair of central transceivers of the wireless communication system based on a second time difference of arrival of a signal of the second transceiver received at the first pair of central transceivers, to obtain a third function describing a third plurality of possible positions of the second transceiver; determining a second distance between the fixed transceiver and the second transceiver using a two-way ranging method, to obtain a fourth function describing a fourth plurality of possible locations of the second transceiver; determining a third distance between the first transceiver and the second transceiver using a two-way ranging method; combining the first function and the second function to delimit the first and second plurality of candidate positions of the first transceiver to one or two candidate positions of the first transceiver; combining the third function and the fourth function to delimit the third and fourth plurality of candidate positions of the second transceiver to one or two candidate positions of the second transceiver; selecting one position out of the one or two candidate positions of the first transceiver as the position of the first transceiver and one position out of the one or two candidate positions of the second transceiver as the position of the second transceiver based on the determined distance between the first transceiver and the second transceiver.

According to yet another embodiment, a method for determining a position of a transceiver of a wireless communication system in a tunnel may have the steps of:

determining a first distance between a first fixed transceiver and the transceiver using a two-way ranging method, to obtain a first function describing a first plurality of possible locations of the transceiver; determining a second distance between a second fixed transceiver and the transceiver using a two-way ranging method, to obtain a second function describing a second plurality of possible locations of the transceiver; combining the first function and the second function to delimit the first and second plurality of candidate positions of the transceiver to one or two candidate positions of the transceiver; determining whether one of the one or two candidate positions of the transceiver is located outside the tunnel, and selecting, if one of the one or two candidate positions of the transceiver is located outside the tunnel, the other of the one or two candidate positions as the position of the transceiver, and selecting, if none of the of the one or two candidate positions of the transceiver is located outside the tunnel, one of the one or two candidate positions of the transceiver based on an RSSI measurement of a signal received from the transceiver by at least one of the first and second fixed transceivers.

Embodiments provide a transceiver (first transceiver, e.g., UE1) for a wireless communication system. The transceiver is configured to communicate with at least one other transceiver of the wireless communication system using a sidelink resource pool of the wireless communication system. Further, the transceiver is configured to transmit signals on resources of the sidelink resource pool that are allocated to the transceiver on a period basis with equal length periods $t_{pertiodA}$. Further, the transceiver is configured to transmit a first signal on a first resource of the resources allocated to the transceiver. Further, the transceiver is configured to receive a second signal from another transceiver (second transceiver, e.g., UE2) of the wireless communication system on a second resource, wherein the second signal is transmitted by the other transceiver responsive to a reception of the first signal, wherein the second signal is transmitted by the other transceiver on the second resource using the period $t_{periodA}$ based on which the resources are allocated to the transceiver. Further, the transceiver is configured to determine a distance to the other transceiver based on a time $t_{roundA}$ between the transmission of the first signal and the reception of the second signal from the other transceiver, and based on the period $t_{periodA}$ based on which the resources are allocated to the transceiver.

In embodiments, the second resource can be one of the resources allocated to the transceiver following the first resource.

In embodiments, the transceiver can be configured to mute at least one transmission on at least one of the resources allocated to the transceiver following the first resource, to obtain at least one muted resource, wherein the second resource is one of the at least one muted resource.

In embodiments, the transceiver can be configured to signal (e.g., to the other transceiver) the second resource and/or the period $t_{periodA}$ based on which the resources are allocated to the transceiver.

In embodiments, the transceiver can be configured to determine the distance to the other transceiver by determining a time $t_p$ the first signal and/or the second signal travels between transceiver and the other transceiver based on

- the time $t_{roundA}$ between the transmission of the first signal and the reception of the second signal from the other transceiver, and
- the period $t_{periodA}$ based on which the resources are allocated to the transceiver.

In embodiments, the transceiver can be configured to determine the distance to the other transceiver by determining the time $t_p$ the first signal and/or the second signal travels between transceiver and the other transceiver further based on

- a total response time $m \cdot T_s$ of the other transceiver, wherein the total response time can be a response time $T_s$ (e.g., sampling rate or quantization value) of the other transceiver multiplied by a response time multiplier m (e.g., an integer greater than or equal to one).

In embodiments, the transceiver can be configured to determine the distance $d_{AB}$ to the other transceiver based on the equation:

$$d_{AB} = \frac{t_{roundA} - N \cdot t_{periodA} - m \cdot T_s}{2} \cdot v$$

wherein $t_{roundA}$ is the time between the transmission of the first signal and the reception of the second signal, wherein N is a natural number equal to or greater than one, wherein $t_{periodA}$ is the period based on which the resources are allocated to the transceiver, wherein m is a natural number equal to or greater than zero, wherein $T_s$ is the response time of the other transceiver, and wherein v is the signal propagation speed.

In embodiments, the second signal can be transmitted by the other transceiver with a predetermined delay after the reception of the first signal or after a start of the reception of the first signal, wherein the predetermined delay can be the sum of the response time $T_s$ (or the total response time $m \cdot T_s$) of the other transceiver and the period ($t_{periodA}$) based on which the resources are allocated to the transceiver or a multiple thereof.

In embodiments, the first signal can be configured to cause the other transceiver to transmit the second signal.

In embodiments, the second signal can comprise ranging reference symbols.

In embodiments, the transceiver can be served by a central transceiver of the wireless communication system, a coverage area of the central transceiver including one zone or a plurality of zones, wherein the transceiver can be configured to operate in a first mode of operation, for example the D2D Mode 1 or V2X Mode 3, in which scheduling of resources for the communication with the at least one other transceiver is performed by the central transceiver, wherein the transceiver can be configured to signal the second resource and/or the period $t_{periodA}$ based on which the resources are allocated to the transceiver, or wherein the second resource and/or the period $t_{periodA}$ based on which the resources are allocated to the transceiver are signaled by the central transceiver (e.g. a base station).

In embodiments, the transceiver and the other transceiver can be located in the same zone, wherein the transceiver can be configured to operate in a second mode of operation, for example the D2D Mode 2 or V2X Mode 4, wherein the transceiver can be configured to schedule resources for the sidelink communication autonomously or by sensing the free channel resources, wherein the transceiver can be configured to signal the second resource and/or the period $t_{periodA}$ based on which the resources are allocated to the transceiver.

In embodiments, the muted resources can be signaled using a muting pattern, the muting pattern indicating the muted resources on which the transceiver expects a reception of the second signal.

In embodiments, the transceiver (e.g., first transceiver (e.g., UE1)) can be configured to communicate with two or more other transceivers (e.g., a second transceiver (e.g., UE2) and a third transceiver (e.g., UE3)) of the wireless communication system using the sidelink resource pool of the wireless communication system. Further, the transceiver can be configured to transmit a configuration message to the two or more other transceivers, wherein the configuration message comprises a resource pattern (e.g., muting pattern) indicating one or more second resources selected out of the resources allocated to the transceiver (that can be used by the two or more other transceivers for transmitting the second signals). Further, the transceiver can be configured to receive the second signals from the two or more other transceivers, wherein the second signals are transmitted by the two or more other transceivers responsive to a reception of the first signal, wherein the second signals are transmitted by the two or more other transceivers on one or more second resources (indicated by the resource pattern) using the period $t_{periodA}$ based on which the resources are allocated to the transceiver. Further, the transceiver can be configured, to determine distances to the two or more other transceivers based on times $t_{roundA}$ between the transmission of the first signal and the reception of the second signals from the two or more other transceivers, and based on the period $t_{periodA}$ based on which the resources are allocated to the transceiver.

For example, a plurality of resources (resource 1, resource 2, resource 3, resource 4) of the sidelink resources pool can be allocated to the transceiver on a period basis with equal length periods $t_{pertiodA}$. A first resource (e.g., resource 1) of the plurality of resources allocated to the transceiver can be used by the transceiver itself for transmitting the first signal, wherein other resources (e.g., resource 2, resource 3 and/or resource 4, referred to as second resources) of the plurality of resources allocated to the transceiver can used by the two or more other transceivers for transmitting the second signals. Thereby, the second signals can be transmitted by the two or more other transceivers on the same second resource (e.g., resource 2, resource 3 or resource 4) or on different second resources (e.g., resource 2 and resource 3, or resource 2 and resource 4, or resource 3 and resource 4) indicated by the resource pattern of the configuration message.

In embodiments, the transceiver can be configured to transmit at least one configuration message to the two or more other transceivers. For example, the transceiver can be configured to transmit only one configuration message to the two or more other transceivers. Naturally, the transceiver also can be configured to transmit more than one configuration message to the two or more other transceivers.

In embodiments, the transceiver (e.g., first transceiver (e.g., UE1)) can be configured to allocate to each of the two or more other transceivers (e.g., a second transceiver (e.g., UE2) and a third transceiver (e.g., UE3)) at least one second resource (e.g., resource 2, resource 3 and/or resource 4) out of the resources allocated to the transceiver for transmitting the second signal, wherein the configuration message can further comprise a resource allocation information allocating to each of the two or more other transceivers the respective one or more second resources.

For example, the first transceiver (e.g., UE1) can allocated resource 2 to the second transceiver (e.g., UE2) and resource 3 to the third transceiver (e.g., UE3) for transmitting the second signals. Naturally, also other allocations are possible. For example, resource 3 can be allocated to the second transceiver (e.g., UE2) and resource 4 or resource 2 to the third transceiver (e.g., UE3).

In embodiments, the transceiver can be configured to allocate for each of the two or more other transceivers the at least one or more second resources based on a signal-to-noise ratio of a signal received from the respective other transceiver (or based on coarse range information).

In embodiments, the transceiver can be configured to allocate to at least two other transceivers out of the two or more other transceivers the same one or more second resources, wherein the transceiver can be configured to allocate to the at least two other transceivers different codes for separating the second signals transmitted by the at least two other transceivers on the same one or more second resources, or to allocate to the at least two other transceivers different resource elements of the same one or more second resources for separating the second signals transmitted by the at least two other transceivers on the same one or more muted resource, wherein the resource allocation information of the one configuration message further allocates the different codes or different resource elements to the at least two other transceivers.

For example, the first transceiver (e.g., UE1) can be configured to allocate the same second resource (e.g., resource 2, resource 3 or resource 4) to the second transceiver (e.g., UE2) and to the third transceiver (e.g., UE3), if signals received from the second transceiver (e.g., UE2) and the third transceiver (e.g., UE3) comprise high signal-to-noise ratios or similar high signal-to-noise ratios. In this case, the second signals transmitted by second transceiver (e.g., UE2) and the third transceiver (e.g., UE3) can be separated, for example, by different codes.

In embodiments, the transceiver can be configured to allocate a first resource of the at least two or more second resources to a first transceiver of the two or more other transceivers, a signal received from which comprises a higher signal-to-noise ratio than a signal received from a second transceiver of the two or more other transceivers, wherein the transceiver can be configuring to allocate a second resource of the at least two or more second resources to the second transceiver of the two or more other transceivers, wherein the second resource follows the first resource in time.

For example, if signals received from the second transceiver (e.g., UE2) and the third transceiver (e.g., UE3) comprise low signal-to-noise ratios or different high signal-to-noise ratios, different second resources can be allocated to second transceiver (e.g., UE2) and the third transceiver (e.g., UE3). For example, assuming that a signal received from the second transceiver (e.g., UE2) comprises a higher signal-to-noise ratio than a signal received from the third transceiver (e.g., UE3), then resource 2 can be allocated to the second transceiver (e.g., UE2) and resource 3 can be allocated to the third transceiver (e.g., UE3).

Further embodiments provide a system comprising the above described transceiver (e.g., first transceiver (e.g., UE1)) and the other transceiver (e.g., second transceiver (e.g., UE2), wherein the other transceiver can be configured to transmit the second signal responsive to the reception of the first signal, wherein the other transceiver can be configured to transmit the second signal on the second resource using the period ($t_{periodA}$) based on which the resources are allocated to the transceiver.

In embodiments, the other transceiver knows the second resource and/or the $t_{periodA}$ based on which the resources are allocated to the transceiver.

In embodiments, the other transceiver is configured to receive a signaling information from the transceiver or a central transceiver of the wireless communication system, the signaling information indicating the second resource and/or the $t_{periodA}$ based on which the resources are allocated to the transceiver.

In embodiments, the other transceiver can be configured to determine the $t_{periodA}$ based on which the resources are allocated to the transceiver based on a reception of at least two first signals from the transceiver on at least two different resources allocated to the transceiver.

Further embodiments provide a method for determining a distance between a first transceiver and a second transceiver of a wireless communication system, the first transceiver and the second transceiver communicating with each other using resources of a sidelink resource pool allocated to the first transceiver on a period basis with equal length periods $t_{periodA}$ and allocated to the second transceiver on a period basis with equal length periods $t_{periodA}$. The method comprises a step of transmitting, by the first transceiver, a first signal on a first resource of the resources allocated to the first transceiver. Further, the method comprises a step of transmitting, by the second transceiver, a second signal responsive to the reception of the first signal, wherein the second signal is transmitted by the second transceiver on a second resource using the period ($t_{periodA}$) based on which the resources are allocated to the first transceiver. Further, the method comprises a step of receiving, by the first transceiver, the second signal transmitted by second transceiver. Further, the method comprises a step of determining a distance between the first transceiver and the second transceiver based on a time between the transmission of the first signal by the first transceiver and the reception of the second signal by the first transceiver, and based on the period ($t_{periodA}$) based on which the resources are allocated to the first transceiver.

Further embodiments provide a transceiver (e.g., first transceiver (e.g., UE1)) for a wireless communication system. The transceiver is configured to communicate with at least one other transceiver (e.g., a second transceiver (e.g., UE2) and/or a third transceiver (e.g., UE3)) of the wireless communication system using a sidelink resource pool of the wireless communication system. Further, the transceiver is configured to receive a control signal from a central transceiver of the wireless communication system, the control signal allocating a response time multiplier m to the other transceiver. Further, the transceiver is configured to transmit a first signal on a resource of the sidelink resource pool. Further, the transceiver is configured to receive a second signal from the other transceiver of the wireless communication system on a resource of the sidelink resource pool, the second signal transmitted by the other transceiver responsive to a reception of the first signal, wherein the second signal is transmitted by the other transceiver using the response time multiplier m. Further, the transceiver is configured to determine a distance to the other transceiver based on a time $t_{roundA}$ between the transmission of the first signal and the reception of the second signal from the other transceiver, and based on a response time $T_s$ of the other transceiver and the response time multiplier m allocated to the other transceiver.

In embodiments, the transceiver can be configured to determine the distance to the other transceiver by determining a time $t_p$ the first signal and/or the second signal travels between transceiver and the other transceiver based on the time $t_{roundA}$ between the transmission of the first signal and the reception of the second signal from the other transceiver, and a total response time $m \cdot T_s$ of the other transceiver, wherein the total response time can be a response time $T_s$ (e.g., sampling rate or quantization value) of the other transceiver multiplied by a response time multiplier m (e.g., an integer greater than or equal to one).

In embodiments, the transceiver can be configured to determine the distance $d_{AB}$ to the other transceiver based on the equation:

$$d_{AB} = \frac{t_{roundA} - m \cdot T_s}{2} \cdot v$$

wherein $t_{roundA}$ is the time between the transmission of the first signal and the reception of the second signal, wherein m is a natural number equal to or greater than one, wherein $T_s$ is the response time of the other transceiver, and wherein v is the signal propagation speed.

In embodiments, the transceiver can be configured to transmit signals on resources of the sidelink resource pool that are allocated to the transceiver on a period basis with equal length periods $t_{periodA}$. Further, the transceiver is configured to transmit the first signal on a first resource of the resources allocated to the transceiver. Further, the transceiver can be configured to receive the second signal from the other transceiver of the wireless communication system on a second resource of the resources allocated to the transceiver, wherein the second signal is transmitted by the other transceiver on the second resource using the period $t_{periodA}$ based on which the resources are allocated to the transceiver. Further, the transceiver can be configured to determine the distance to the other transceiver further based on the period $t_{periodA}$ based on which the resources are allocated to the transceiver.

Further embodiments provide a system comprising the above described transceiver (e.g., first transceiver (e.g., UE1)) and the other transceiver (e.g., second transceiver (e.g., UE2)), wherein the other transceiver is configured to transmit the second signal responsive to the reception of the first signal, wherein the other transceiver is configured to transmit the second signal using the response time multiplier m allocated to the other transceiver.

In embodiments, the other transceiver can be configured to receive the control signal from the central transceiver of the wireless communication system, the control signal allocating the response time multiplier m to the other transceiver.

Further embodiments provide a method for determining a distance between a first transceiver and a second transceiver of a wireless communication system, the first transceiver and the second transceiver communicating with each other using resources of a sidelink resource pool. The method comprises a step of receiving a control signal from a central transceiver of the wireless communication system, the control signal allocating a response time multiplier m to the other transceiver. Further, the method comprises a step of transmitting a first signal on a resource of the sidelink resource pool. Further, the method comprises a step of receiving a second signal from the other transceiver of the wireless communication system on a resource of the sidelink resource pool, the second signal transmitted by the other transceiver responsive to a reception of the first signal, wherein the second signal is transmitted by the other transceiver using the response time multiplier m. Further, the method comprises a step of determining a distance to the other transceiver based on a time $t_{roundA}$ between the transmission of the first signal and the reception of the second signal from the other transceiver, and based on a response time $T_s$ of the other transceiver and the response time multiplier m allocated to the other transceiver.

Further embodiments provide a method for determining a position of a first transceiver of a wireless communication system. The method comprises a step of determining a first difference in distance between the first transceiver and a first pair of central transceivers (e.g., a first base station (e.g., eNB1) and a second base station (e.g., eNB2)) of the wireless communication system based on a first time difference of arrival of a signal of the first transceiver received at the first pair of central transceivers, to obtain a first function describing a first plurality of candidate positions of the first transceiver. Further, the method comprises a step of determining a second difference in distance between the transceiver and a second pair of central transceivers (e.g., the first base station (e.g., eNB1) and a third base station (e.g., eNB3)) of the wireless communication system based on a second time difference of arrival of a signal of the first transceiver received at the second pair of central transceivers, to obtain a second function describing a second plurality of candidate positions of the first transceiver. Further, the method comprises a step of determining a third difference in distance between a second transceiver of the wireless communication system and the first pair of central transceivers of the wireless communication system based on a third time difference of arrival of a signal of the second transceiver received at the first pair of central transceivers, to obtain a third function describing a third plurality of candidate positions of the second transceiver. Further, the method comprises a step of determining a fourth difference in distance between the second transceiver and the second pair of central transceivers of the wireless communication system based on a fourth time difference of arrival of a signal of the second transceiver received at the second pair of central transceivers, to obtain a fourth function describing a fourth plurality of candidate positions of the second transceiver. Further, the method comprises a step of determining a distance between the first transceiver and the second transceiver using a two-way ranging method. Further, the method comprises a step of combining the first function and the second function to delimit the first and second plurality of candidate positions of the first transceiver to one or two candidate positions of the first transceiver. Further, the method comprises a step of combining the third function and the fourth function to delimit the third and fourth plurality of candidate positions of the second transceiver to one or two candidate positions of the second transceiver. Further, the method comprises a step of selecting one position out of the one or two candidate positions of the first transceiver as the position of the first transceiver and one position out of the one or two candidate positions of the second transceiver as the position of the second transceiver based on the determined distance between the first transceiver and the second transceiver.

For example, the first function can describe a first hyperbolic curve describing the first plurality of candidate positions of the first transceiver, wherein the second function can describe a second hyperbolic curve describing the second plurality of candidate positions of the first transceiver. Combining the first function and the second function can comprise determining one or more intersections between the first hyperbolic curve and the second hyperbolic curve, to delimit the first and second plurality of candidate positions of the first transceiver to one or two candidate positions of the first transceiver.

For example, the third function can describe a third hyperbolic curve describing the third plurality of candidate positions of the second transceiver, wherein the fourth function can describe a fourth hyperbolic curve describing the fourth plurality of candidate positions of the second transceiver. Combining the third function and the fourth function can comprise determining one or more intersections between the third hyperbolic curve and the fourth hyperbolic curve, to delimit the third and fourth plurality of candidate positions of the second transceiver to one or two candidate positions of the second transceiver.

In embodiments, the first pair of central transceivers can comprise or consist of a first central transceiver and a second central transceiver, wherein the second pair of central transceivers can comprise consists of the first central transceiver and a third central transceiver, wherein the first central transceiver, second central transceiver and third central transceiver are synchronized in time and located at known positions.

In embodiments, the first central transceiver, second central transceiver and third central transceiver are base stations.

In embodiments, the first transceiver and the second transceiver can be user equipments.

In embodiments, the distance between the first transceiver and the second transceiver can be determined according to one of the above described methods for determining a distance between a first transceiver and a second transceiver (two-way ranging methods).

Further embodiments provide a method for determining a position of a first transceiver of a wireless communication system. The method comprises a step of determining a first difference in distance between the first transceiver and a first pair of central transceivers (e.g., a first base station (e.g., eNB1) and a second base station (e.g., eNB2)) of the wireless communication system based on a first time difference of arrival of a signal of the first transceiver received at the first pair of central transceivers, to obtain a first function describing a first plurality of possible positions of the first transceiver. Further, the method comprises a step of determining a first distance between a fixed transceiver (e.g., a road side unit (e.g., RSU)) and the first transceiver using a two-way ranging method, to obtain a second function describing a second plurality of possible locations of the first transceiver. Further, the method comprises a step of determining a second difference in distance between a second transceiver and the first pair of central transceivers (e.g., the first base station (e.g., eNB1) and the second base station (e.g., eNB2)) of the wireless communication system based on a second time difference of arrival of a signal of the second transceiver received at the first pair of central transceivers, to obtain a third function describing a third plurality of possible positions of the second transceiver. Further, the method comprises a step of determining a second distance between the fixed transceiver (e.g., the road side unit (e.g., RSU)) and the second transceiver using a two-way ranging method, to obtain a fourth function describing a fourth plurality of possible locations of the second transceiver. Further, the method comprises a step of determining a third distance between the first transceiver and the second transceiver using a two-way ranging method. Further, the method comprises a step of combining the first function and the second function to delimit the first and second plurality of candidate positions of the first transceiver to one or two candidate positions of the first transceiver. Further, the method comprises a step of combining the third function and the fourth function to delimit the third and fourth plurality of candidate positions of the second transceiver to one or two candidate positions of the second transceiver. Further, the method comprises a step of selecting one position out of the one or two candidate positions of the first transceiver as the position of the first transceiver and one position out of the one or two candidate positions of the second transceiver as the position of the second transceiver based on the determined distance between the first transceiver and the second transceiver.

For example, the first function can describe a first hyperbolic curve describing the first plurality of candidate positions of the first transceiver, wherein the second function can describe a first circle describing the second plurality of candidate positions of the first transceiver. Combining the first function and the second function can comprise determining one or more intersections between the first hyperbolic curve and the first circle, to delimit the first and second plurality of candidate positions of the first transceiver to one or two candidate positions of the first transceiver.

For example, the third function can describe a second hyperbolic curve describing the third plurality of candidate positions of the second transceiver, wherein the fourth function can describe a second circle describing the fourth plurality of candidate positions of the second transceiver. Combining the third function and the fourth function can comprise determining one or more intersections between the second hyperbolic curve and the second circle, to delimit the third and fourth plurality of candidate positions of the second transceiver to one or two candidate positions of the second transceiver.

In embodiments, the first pair of central transceivers comprises or consists of a first central transceiver and a second central transceiver, wherein the first central transceiver and the second central transceiver are synchronized in time and located at known positions.

In embodiments, the first central transceiver and the second central transceiver can be base stations.

In embodiments, the fixed transceiver can be a road side unit.

In embodiments, the first transceiver and the second transceiver can be user equipments.

In embodiments, the third distance between the first transceiver and the second transceiver can be determined according to one of the above described methods for determining a distance between a first transceiver and a second transceiver (two-way ranging methods).

Further embodiments provide a method for determining a position of a transceiver (e.g., user equipment (e.g., UE)) of a wireless communication system in a tunnel. The method comprises a step of determining a first distance between a first fixed transceiver (e.g., a first road side unit (e.g., RSU1)) and the transceiver using a two-way ranging method, to obtain a first function describing a first plurality of possible locations of the transceiver. Further, the method comprises a step of determining a second distance between a second fixed transceiver (e.g., second roadside unit (e.g., RSU2)) and the transceiver using a two-way ranging method, to obtain a second function describing a second plurality of possible locations of the transceiver. Further, the method comprises a step of combining the first function and the second function to delimit the first and second plurality of candidate positions of the transceiver to one or two candidate positions of the transceiver. Further, the method comprises a step of determining whether one of the one or two candidate positions of the transceiver is located outside the tunnel, and selecting, if one of the one or two candidate positions of the transceiver is located outside the tunnel, the other of the one or two candidate positions as the position of the transceiver, or selecting, if none of the of the one or two candidate positions of the transceiver is located outside the tunnel, one of the one or two candidate positions of the transceiver based on an RSSI measurement of a signal received from the transceiver by at least one of the first and second fixed transceivers.

In embodiments, the transceiver can be an user equipment.

In embodiments, the first fixed transceiver and the second fixed transceiver can be roadside units.

In embodiments, the first distance between the first fixed transceiver and the transceiver can be determined according to one of the above described methods for determining a distance between a first transceiver and a second transceiver (two-way ranging methods).

In embodiments, the second distance between the second fixed transceiver and the transceiver is determined according to one of the above described methods for determining a distance between a first transceiver and a second transceiver (two-way ranging methods).

BRIEF DESCRIPTION OF THE DRAWINGS

Embodiments of the present invention will be detailed subsequently referring to the appended drawings, in which:

FIG. 21 shows a flowchart of a method for determining a position of a first transceiver of a wireless communication system, according to an embodiment;

DETAILED DESCRIPTION OF THE INVENTION

Figure 1:
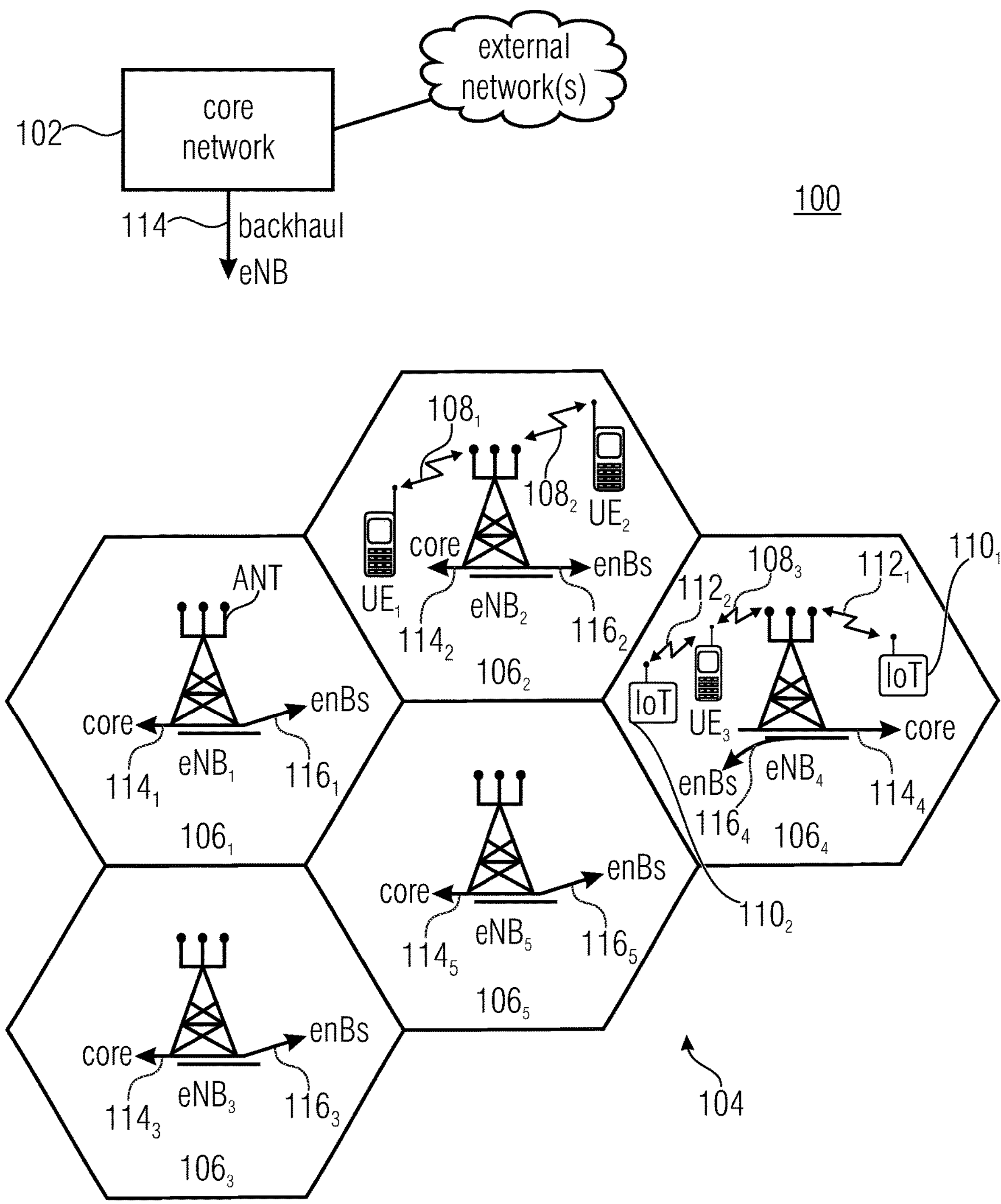
FIG. 1 shows a schematic representation of an example of a wireless communication system.
Figure 2:
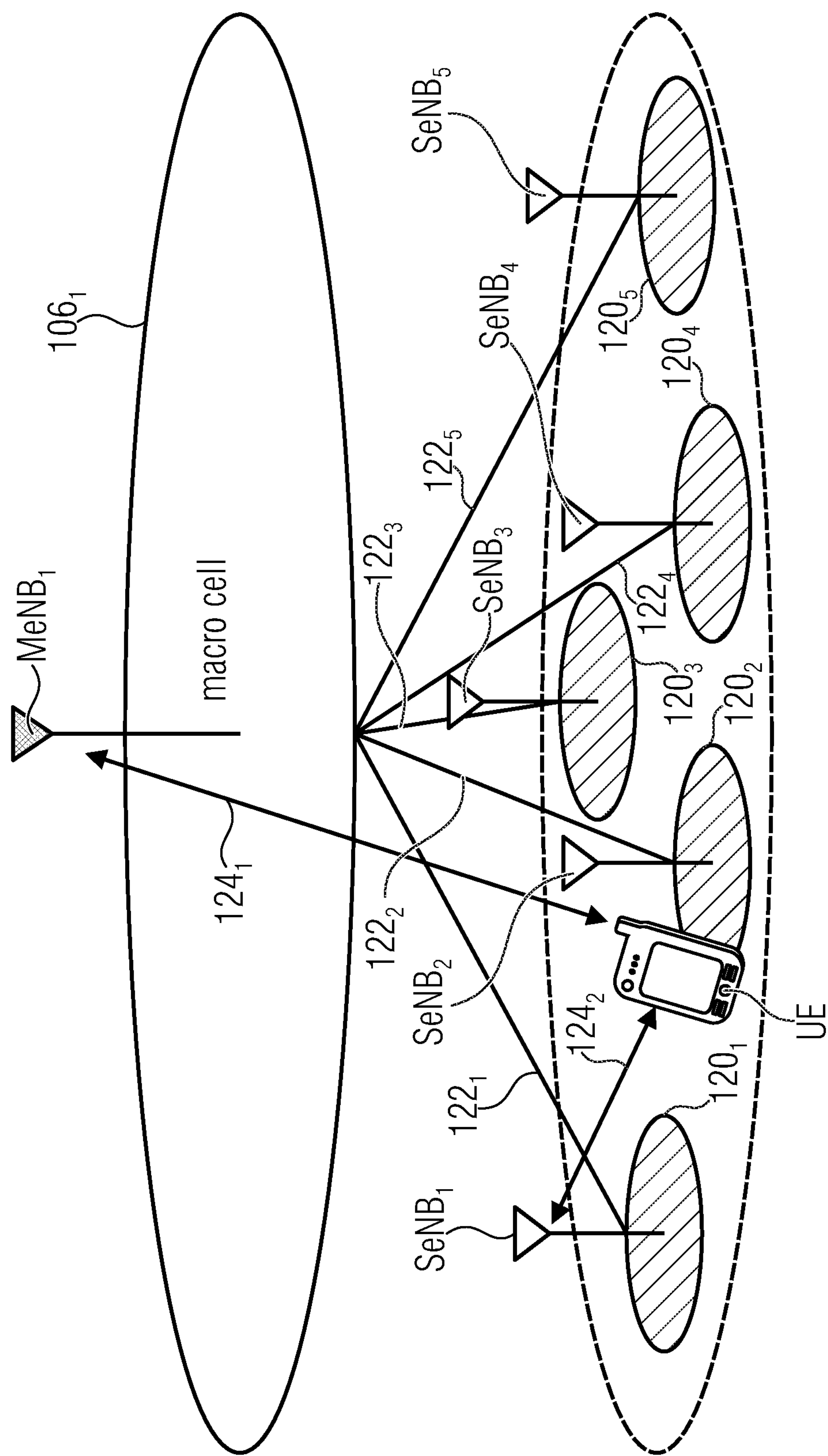
FIG. 2 shows a schematic representation of a cell, like a cell in FIG. 1, having two distinct overlaid networks, namely a macro cell network including a macro cell and a small cell network including small cell base stations connected via backhaul links to the macro cell base station.
Figure 3:
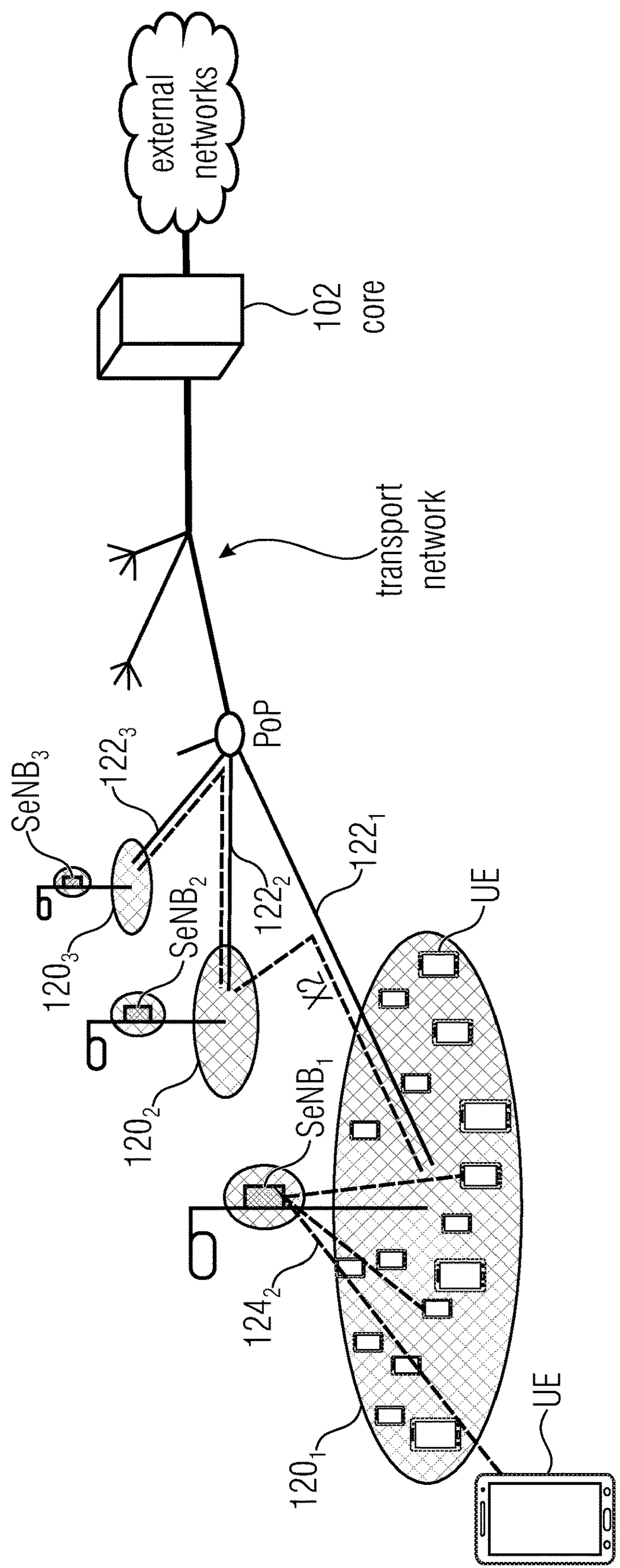
FIG. 3 shows a further schematic representation of a plurality of small cells of a macro cell, similar to FIG. 2, wherein the small cell base stations are connected via backhaul links to each other and to the core network.
Figure 4:
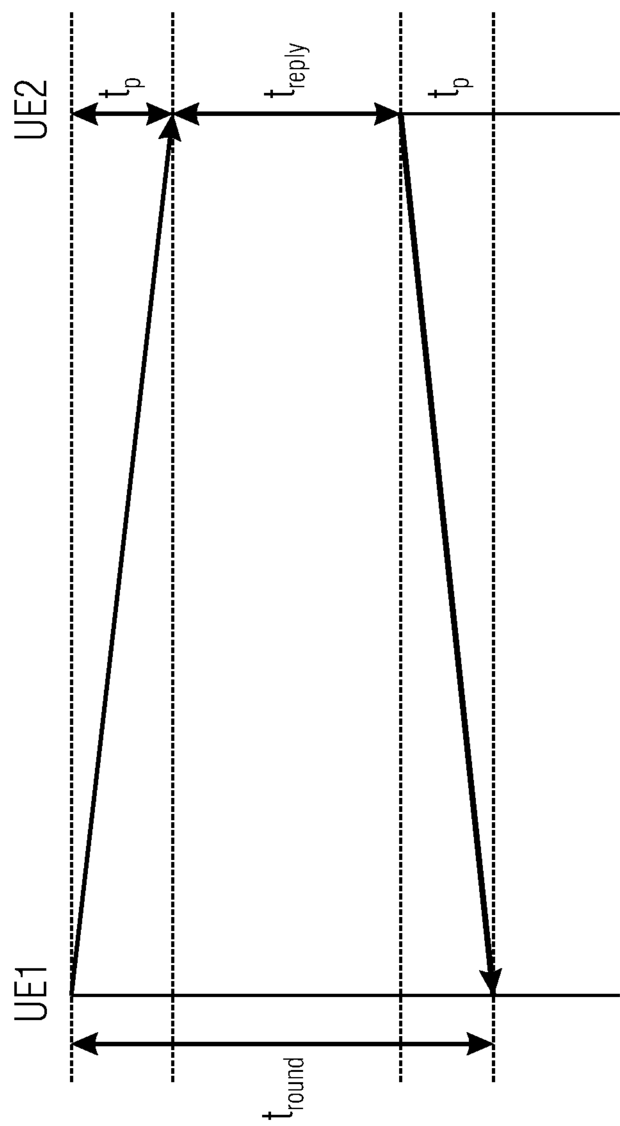
FIG. 4 shows in a diagram a propagation of signals between two UEs during two way ranging.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 5:
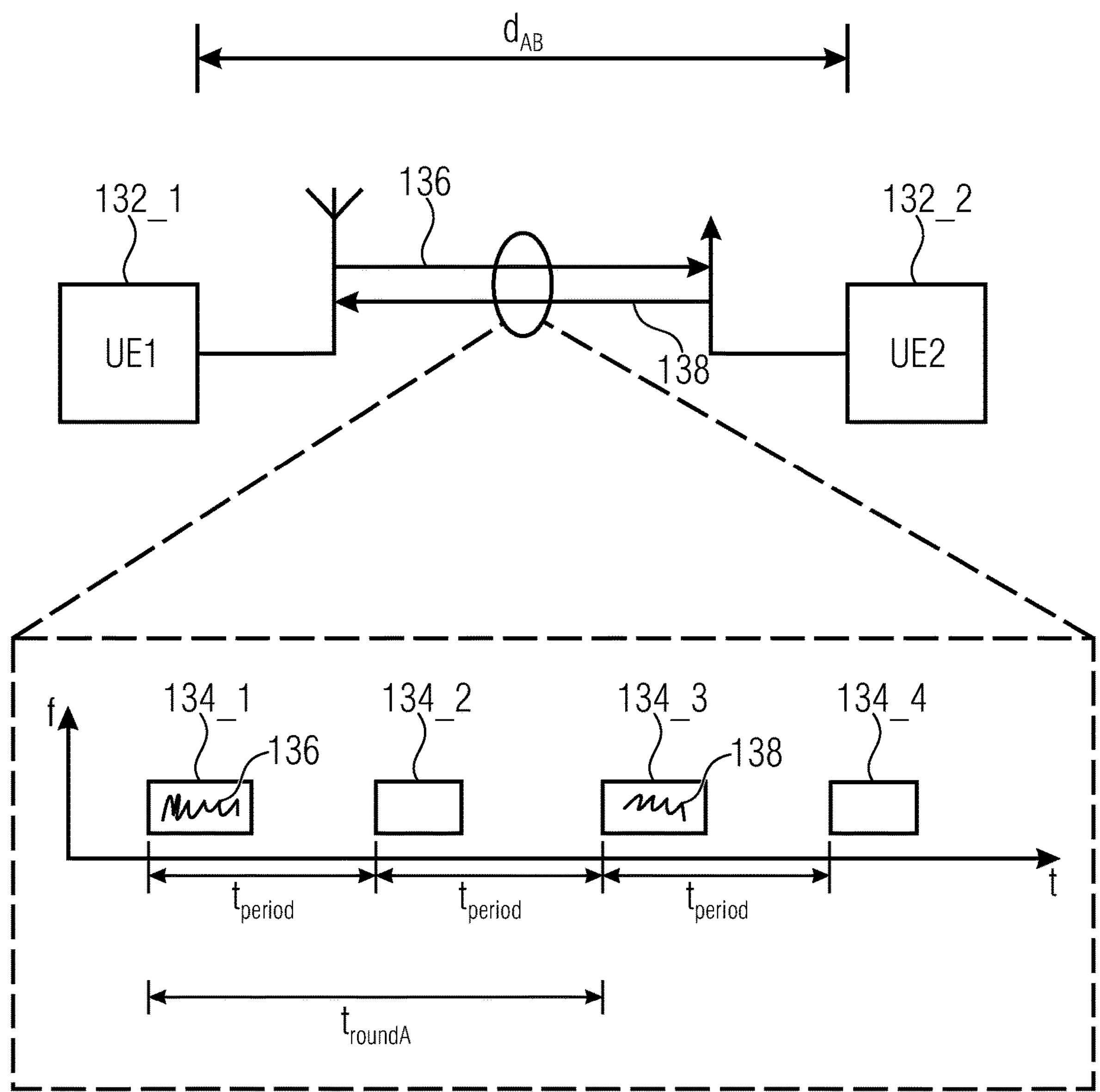
FIG. 5 shows a schematic block diagram of a wireless communication system according to an embodiment.

FIG. 5 shows a schematic block diagram of a wireless communication system 100 according to an embodiment. The wireless communication system 100 comprises a transceiver (e.g., a first transceiver (e.g., UE1)) 132_1 configured to communicate with at least one other transceiver (e.g., a second transceiver (e.g., UE2)) 132_2 of the wireless communication system 100 using a sidelink resource pool of the wireless communication system. Further, the transceiver 132_1 can be configured to transmit signals on resources 134_1, 134_2, 134_3, 134_4 of the sidelink resource pool that are allocated to the transceiver 132_1 on a period basis with equal length periods $t_{periodA}$. Further, the transceiver 132_1 can be configured to transmit a first signal 136 on a first resource, wherein the first resource is one of the resources 134_1, 134_2, 134_3, 134_4 allocated to the transceiver 132_1. Further, the transceiver 100_2 can be configured to receive a second signal 138 from the other transceiver 132_2 of the wireless communication system 100 on a second resource, wherein the second signal 138 is transmitted by the other transceiver 132_2 responsive to a reception of the first signal 136, wherein the second signal 138 is transmitted by the other transceiver 132_2 on the second resource using the period $t_{periodA}$ based on which the resources are allocated to the transceiver 132_1. Further, the transceiver 132_1 can be configured to determine a distance to the other transceiver 132_2 based on a time $t_{roundA}$ between the transmission of the first signal 136 and the reception of the second signal 138 from the other transceiver 132_2, and based on the period $t_{periodA}$ based on which the resources are allocated to the transceiver 132_1.

As shown by way of example, the first resource on which the transceiver 132_1 transmits the first signal 136 can be the resource 134_1 of the resources 134_1, 134_2, 134_3, 134_4 allocated to the transceiver 132_1.

In embodiments, the second resource on which the other transceiver 132_2 transmits the second signal 138 can be one of the resources 134_2, 134_3, 134_4 allocated to the transceiver 132_1 following the first resource 134_1, such as the resource 134_3, as exemplarily shown in FIG. 5.

In other words, a plurality of resources (e.g., resource 134_1, resource 134_2, resource 134_2, resource 134_4) of the sidelink resources pool can be allocated to the transceiver 132_1 on a period basis with equal length periods $t_{periodA}$, wherein a first resource (e.g., resource 134_1) of the plurality of resources allocated to the transceiver 132_1 can be used by the transceiver 132_1 itself for transmitting the first signal 136, wherein another resource (e.g., resource 134_3 in FIG. 5) of the plurality of resources allocated to the transceiver 132_1 can used by the other transceiver 132_2 for transmitting the second signal 108.

In embodiments, the transceiver 132_1 can be configured to mute (i.e., to not transmit on said resource) at least one transmission on at least one of the resources 134_2, 134_3 and 134_4 allocated to the transceiver 132_1 following the first resource 134_1, to obtain at least one muted resource (e.g., resources 134_2, 134_3 and 134_4 in FIG. 5), wherein the second resource is one of the at least one muted resource (e.g., resource 134_3 in FIG. 5).

In embodiments, the transceiver 132_1 can be configured to signal (e.g., to the other transceiver 132_2) the second resource and/or the period $t_{periodA}$ based on which the resources are allocated to the transceiver 132_1.

In embodiments, the transceiver 132_1 can be configured to determine the distance $d_{AB}$ to the other transceiver 132_2 by determining a time $t_p$ the first signal 136 and/or the second signal 138 travels between transceiver 132_1 and the other transceiver 132_2 based on the time $t_{roundA}$ between the transmission of the first signal 136 and the reception of the second signal 138 from the other transceiver 132_2, and based on the period $t_{periodA}$ based on which the resources are allocated to the transceiver 132_1, and optionally based on a total response time $m \cdot T_s$ of the other transceiver 132_1, wherein the total response time can be a response time $T_s$ (e.g., sampling rate or quantization value) of the other transceiver 132_2 multiplied by a response time multiplier m (e.g., an integer greater than or equal to one).

The transceiver 132_1 and the at least one other transceiver 132_2 enable ranging on the sidelink given the current specifications and signaling constraints. Sidelink ranging enables estimating the distance between the transceiver 132_1 (first sidelink device) and the at least one other transceiver 132_2 (one other sidelink device). The fields in 3GPP where ranging on the sidelink can be applied are, for example, V2V, D2D and/or feD2D.

In the following, the transceiver 132_1 and the at least one other transceiver 132_2, which enable ranging on the sidelink, are described in further detail. Thereby, it is exemplarily assumed that the transceiver 132_1 is a first user equipment (UE1), and that the least one other transceiver 132_2 is at least a second user equipment (UE2).

Overview

Sidelink communication has been introduced in 3GPP Release 12 to allow direct connectivity between two or more devices. There are two types of connectivity type: communication and discovery with different transmission modes depending on whether the devices are in-coverage (e.g., under network coverage), out-of-coverage (e.g., outside network coverage) or partial-coverage (e.g., some devices out of network coverage).

The most relevant parameter for ranging is the assigned resource pool or the assignment of the transmission resources. This means a set of physical resources (e.g., subframes and resource blocks) are assigned to the sidelink device. The device can either be assigned from the network or the by device itself, depending on the configuration and connection state of the UEs (in-coverage or out-of-coverage). For example, a device can select from the resources of PSCCH (physical sidelink control channel) and PSSCH (physical sidelink shared channel). In any case the resources are configured on a period based with equal length periods, as shown in FIG. 6.

Figure 6:
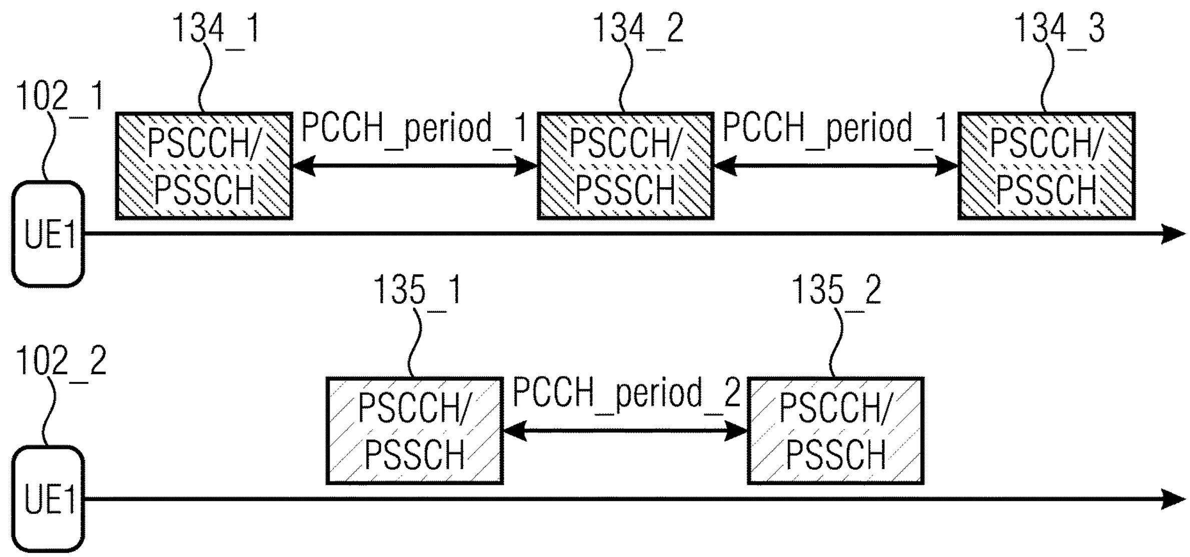
FIG. 6 shows in a schematic diagram an allocation of resources of the sidelink resource pool to a first user equipment on a period basis with equal length periods, and an allocation of resources of the sidelink resource pool to a second user equipment on a period basis with equal length periods.

In detail, FIG. 6 shows in a schematic diagram an allocation of resources 134_1, 134_2 and 134_3 of the sidelink resource pool to a first user equipment (UE1) 132_1 on a period basis with equal length periods $t_{periodA}$ (PCCH_Period_1), and an allocation of resources 135_1 and 135_2 of the sidelink resource pool to a second user equipment (UE1) 132_2 on a period basis with equal length periods $t_{periodB}$ (PCCH_Period_2).

Unless the two user equipments 132_1 and 132_2 are very well synchronized, ranging cannot be performed with this signaling scheme. The sidelink synchronization aims mainly to reduce the risk of interference and does not suffice to enable the devices perform ranging. Synchronizing two devices down to few nanoseconds is not enabled by current implementations (e.g., sidelink for LTE) and is otherwise very costly and complex to achieve, which are not reasonable constraints on consumer devices.

Figure 7:
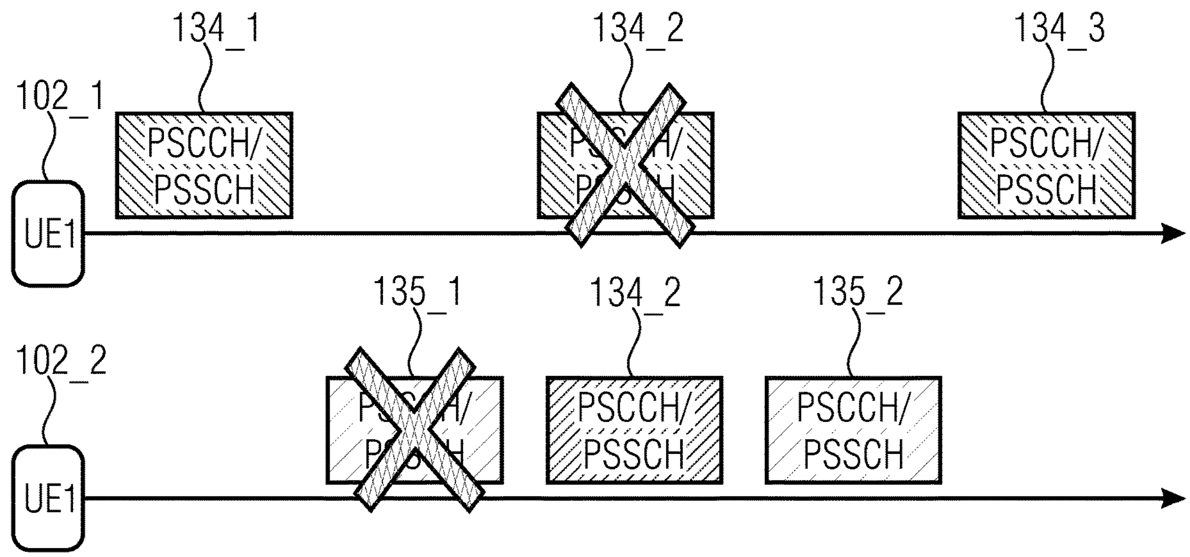
FIG. 7 shows in a schematic diagram the allocation of resources to the two user equipments shown in FIG. 6, wherein the first user equipment enables the second user equipment to send a ranging signal on a resource, which is normally allocated to the first user equipment, according to an embodiment.

However, if the device (e.g., the first user equipment (UE1) 132_1) enables a second device (e.g., the second user equipment (UE2) 132_2) to send a ranging signal on one or some of the resources of the device (e.g., the first user equipment (UE1) 132_1) as shown in FIG. 7, then, the device (e.g., the first user equipment (UE1) 132_1) is enabled to compute the range.

In detail, FIG. 7 shows in a schematic diagram the allocation of resources to the two user equipments 132_1 and 132_2 shown in FIG. 6, wherein the first user equipment (UE1) 132_1 enables the second user equipment (UE2) 132_2 to send a ranging signal 138 on the resource 134_2, which is normally allocated to the first user equipment (UE1) 132_1.

Procedure

Assuming that both devices (i.e., UE1 132_1 and UE2 132_2) are in coverage, the network 100 assigns for both devices the physical resources they can use for transmission.

Figure 8:
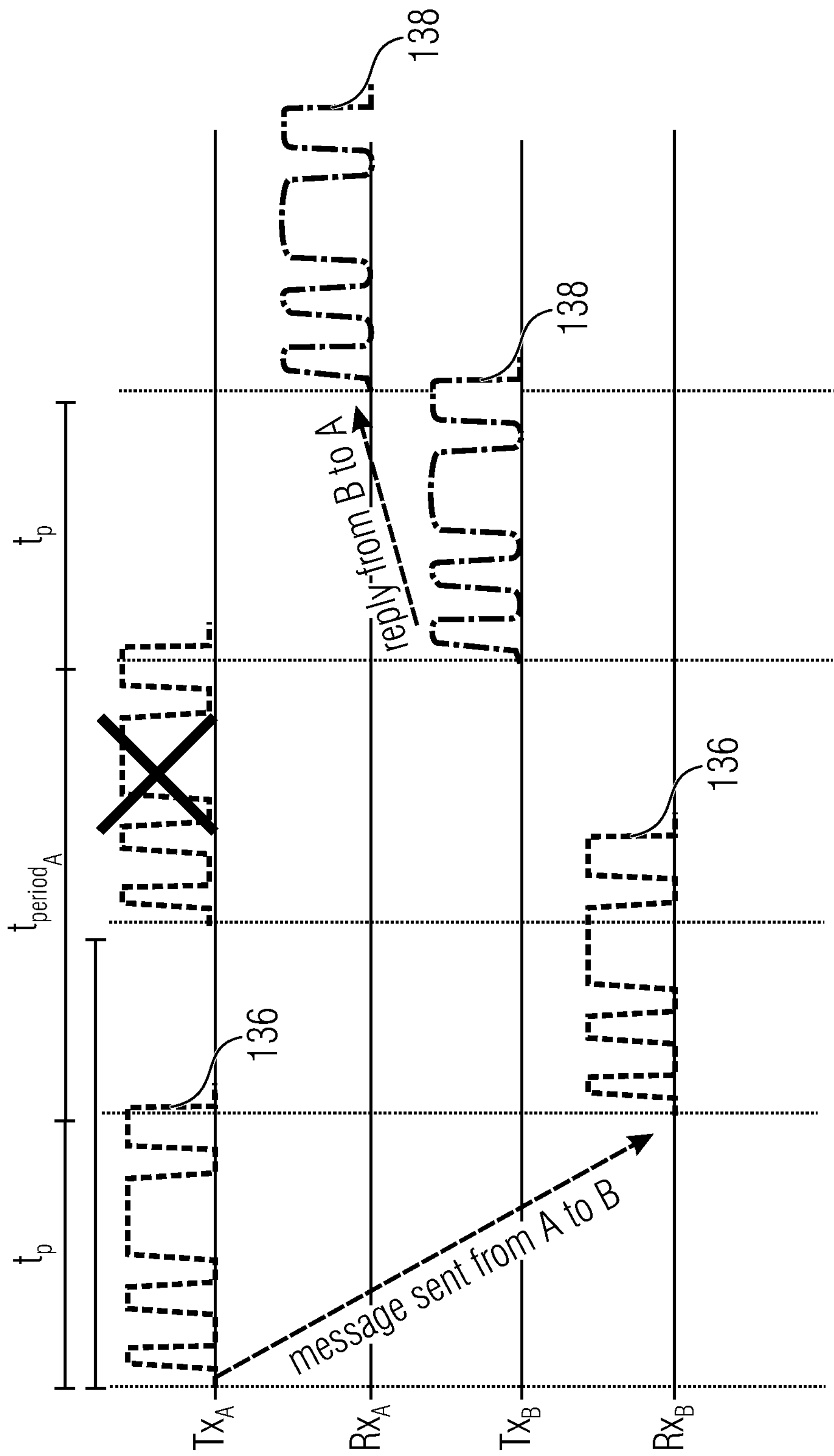
FIG. 8 shows in a diagram the transmission of the first signal and the second signal between the first user equipment and the second user equipment during ranging, according to an embodiment.

FIG. 8 shows in a diagram the transmission of the first signal 136 and the second signal 138 between the first user equipment (UE1) 132_1 and the second user equipment (UE2) 132_2 during ranging. Thereby, the ordinate denotes the respective Tx and Rx sidelink resource pools for UE1 and UE2 (i.e., $Tx_A$ and $Rx_A$ for UE1, and $Tx_B$ and $Rx_B$ for UE2), where the abscissa denotes the time. In other words, FIG. 8 shows ranging over the sidelink between UE1 and UE2.

As shown in FIG. 8, UE1 transmits ($Tx_A$) the first signal 136, which is received ($Rx_B$) by UE2 after the time $t_p$. With a delay of $t_{periodA}$ (i.e., the period based on which the resources of the sidelink resource pool are allocated to UE1) or a multiple thereof, UE2 transmits ($Tx_B$) the second signal 108, which is received ($Rx_A$) by UE1 after the time $t_p$.

Figure 9:
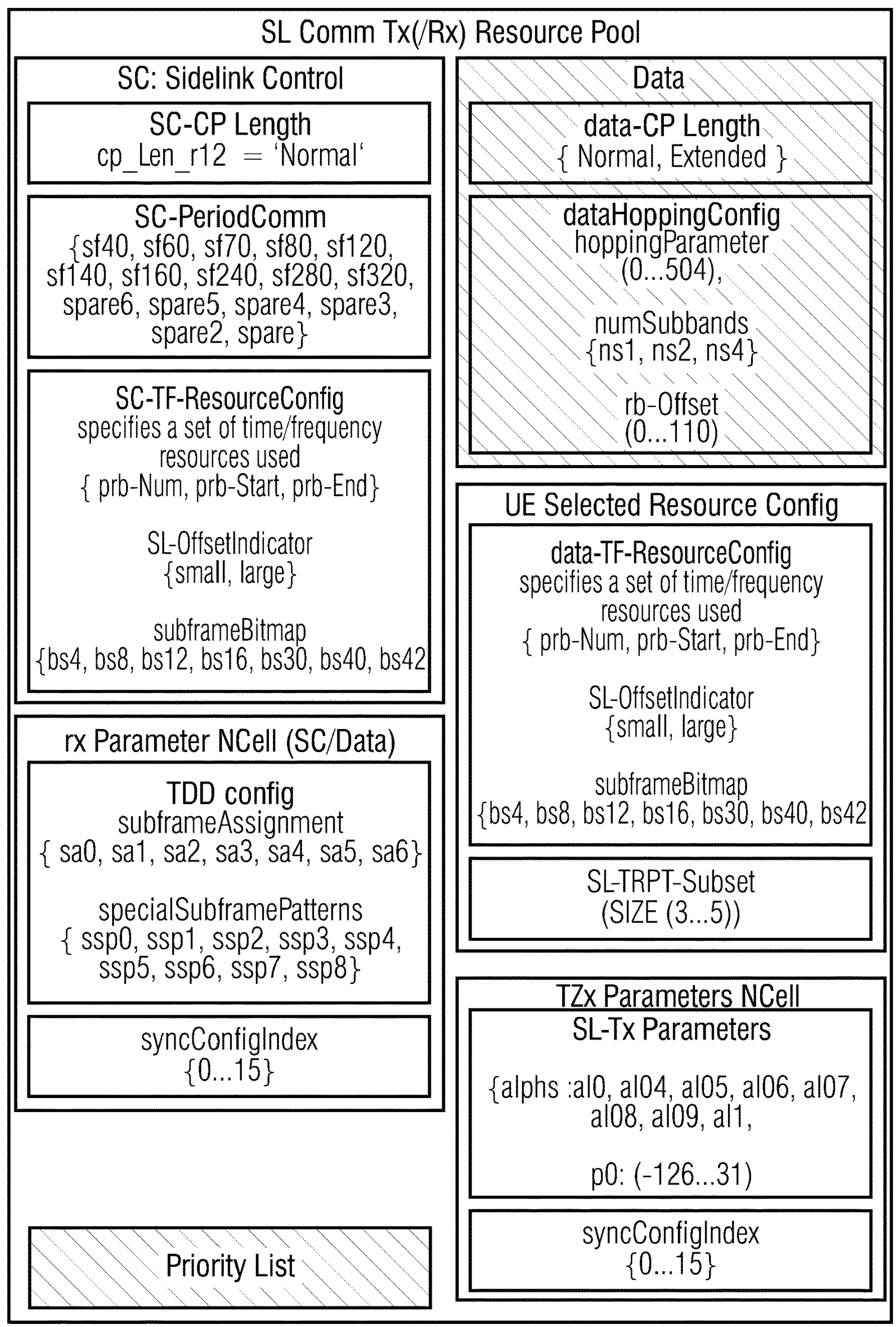
FIG. 9 shows in a schematic diagram the sidelink Tx(/Rx) resource pool and the current sidelink resource messages defined in SIB18, according to an embodiment.

In other words, FIG. 8 shows the basic procedure. Without any loss in generality, it is assumed here that UE2 knows the period $t_{periodA}$ and the slot reserved originally for UE1 that it can use it for ranging. The information may be conveyed via the network broadcasted information SIB 18 (System Information Block) or form serving cell when the UE is in RRC connected mode. FIG. 9 shows the information currently defined for sidelink Tx and Rx resource pools. If the UE is in idle state, it uses the Tx resources defined with the element commTxPoolNormalcommon having the structure in FIG. 9. The sc-Period field indicates the period over which resources are allocated in a cell for SC and over which scheduled and UE selected data transmissions occur.

As shown in FIG. 8, the signal travels a time $t_p$ from UE1 to UE2 (and vice versa), which is equivalent to the distance separating UE1 and UE2 multiplied with the signal propagation speed v (which is usually approximated by the vacuum speed of light). $UE_2$ sends the reply after $N \cdot t_{periodA}$, wherein in the example of FIG. 8, N is set to one. The round trip time $t_{roundA}$ represents the time elapsed from the transmission ($Tx_A$) of the signal by UE1, till UE1 receives ($Rx_A$) the reply from UE2. For UE1, the round trip time $t_{roundA}$ can be expressed by $$t_{roundA}=2 \cdot t_p+N \cdot t_{periodA}+m \cdot T_s$$

where $T_s$ represents the sampling rate or quantization value and m is an integer. The value of $N \cdot t_{periodA}$ is normally a long period which is normally larger than or equal 40 ms, wherein $m \cdot T_s$ on the other hand can be much shorter. For example, if the reporting $T_s$ is 10 ns, then N can be set to zero and m can be set to 1000. In this case the reply time can be 1 ms (1000*10 ns).

The distance $d_{AB}$ separating the two user equipments UE1 and UE2 is $$d_{AB} = t_p \cdot v = \left(\frac{t_{roundA} - N \cdot t_{periodA} - m \cdot T_s}{2}\right) \cdot v$$

Resource Allocation for Modes 1 and 3 (in-Coverage)

In embodiments, UE1 can be served by a central transceiver of the wireless communication system (e.g., a base station (e.g., eNB)), a coverage area of the central transceiver including one zone or a plurality of zones, wherein UE1 can be configured to operate in a first mode of operation, for example the D2D Mode 1 or V2X Mode 3, in which scheduling of resources for the communication with UE2 is performed by the central transceiver, wherein UE1 can be configured to signal the second resource and/or the period $t_{periodA}$ based on which the resources are allocated to UE1, or wherein the second resource and/or the period $t_{periodA}$ based on which the resources are allocated to UE1 are signaled by the central transceiver.

For example, for devices in mode 1, the UEs can be configured by the network. The TxResourcePool may be indicated from the serving cell. An extra message indicating the resources dedicated for ranging w.r.t. the ranging device (e.g., UE1) can be defined.

This could in the context of 3gpp TS 36.331 that:

- a UE capable of SL communication, or V2X communication, and is in RRC connected mode may initiate the procedure or indicate it's interested in ranging information;
- a UE or the network (in connected mode) may initialize the procedure for allocating resources;
- the resources allocated for ranging can be separated with a defined muting pattern; the pattern indicates the resources are reserved for the ranging where the Device does not transmit and is expecting reply on its ranging messages;
- the number of ranging messages needed can be mapped with the accuracy needed; for high accuracy, multiple ranging session can be defined or multiple reply from the second ranging device;
- a UE can indicate it's no longer interested in SL-R (sidelink ranging).

Resource Allocation for Modes 2 and 4 (Out-of-Coverage)

In embodiments, UE1 and UE2 can be located in the same zone, wherein UE1 (and also UE2) can be configured to operate in a second mode of operation, for example the D2D Mode 2 or V2X Mode 4, wherein UE1 can be configured to schedule resources for the sidelink communication autonomously or by sensing the free channel resources. Thereby, UE1 can be configured to signal the second resource and/or the period $t_{periodA}$ based on which the resources are allocated to UE1.

For example, the information similar to the above description can be provided to a device (e.g., UE) in out-of-coverage mode or did not receive resource allocation information from the network. SIB18 in TxResourcePool can indicate an extra message indicating the resources dedicated for ranging w.r.t. a given UE.

Enhancements

As already mentioned above, the first transceiver (UE1) 132_2 can be configured to transmit a signaling information, the signaling information indicating the at least one second resource (e.g., resources 134_2, 134_3 and 134_4 in FIG. 5)) and/or the $t_{periodA}$ based on which the resources are allocated to the first transceiver (UE1) 132_2.

Moreover, it is also possible, that the signaling information indicating the at least one second resource (e.g., resources 134_2, 134_3 and 134_4 in FIG. 5)) and/or the $t_{periodA}$ based on which the resources are allocated to the first transceiver (UE1) 132_2 is transmitted (e.g., broadcasted) by a central transceiver of the wireless communication system, such as a base station (eNB).

In both cases, the second transceiver (UE2) 132_2 can be configured to receive the signaling information from the first transceiver (UE1) 132_1 or the central transceiver of the wireless communication system, and to transmit the second signal 138 on (at least one of) the at least one second resources using the period $t_{periodA}$ based on which the resources are allocated to the first transceiver (UE1) 132_1.

However, it is also possible that the second transceiver (UE1) 132_2 is not in possession of the signaling information (or does not know the $t_{periodA}$ based on which the resources are allocated to the first transceiver (UE1) 132_1 and/or does not know the at least one second resource), either because the first transceiver (UE1) 132_1 or the central transceiver did not transmit the signaling information or the second transceiver (UE2) 132_2 did not receive the signaling information, e.g., due to interferences or collisions.

In this case, the second transceiver (UE2) 132_2 can be configured to determine the $t_{periodA}$ based on which the resources are allocated to the first transceiver (UE1) 132_1 based on a reception of at least two first signals 136 from the first transceiver (UE1) 132_1 on at least two different resources allocated to the first transceiver (UE1) 132_1.

Figure 10:
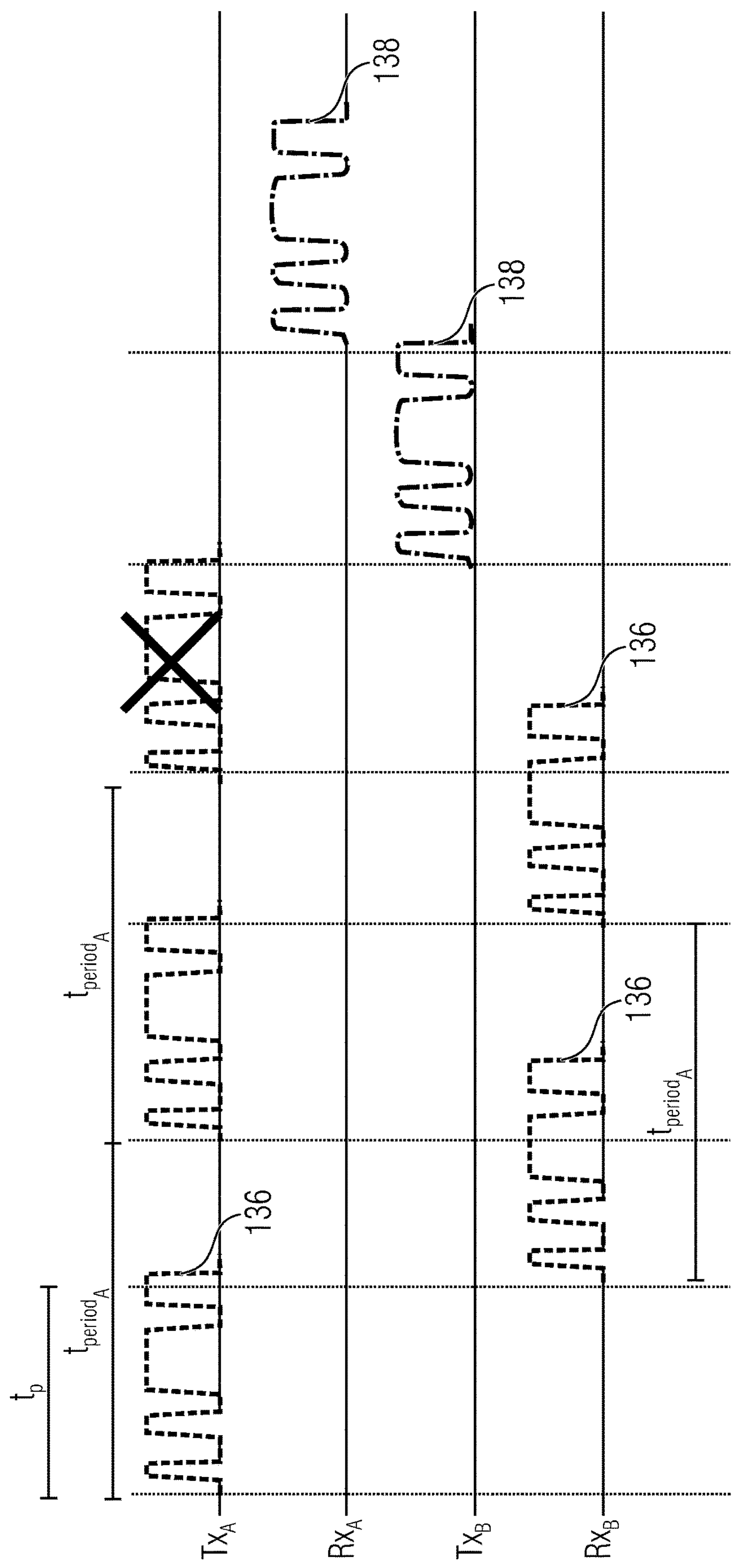
FIG. 10 shows in a diagram the transmission of the first signal and the second signal between the first user equipment and the second user equipment during ranging, according to an embodiment.

In other words, in case UE2 132_2 does not have prior information on the period $t_{periodA}$, or the period information is not accurate, then UE2 132_2 can measure the period $t_{periodA}$ based on multiple received signals, as shown in FIG. 10.

FIG. 10 shows in a diagram the transmission of first signals 136 and the second signal 138 between the first user equipment (UE1) 132_1 and the second user equipment (UE2) 132_2 during ranging. Thereby, the ordinate denotes the respective Tx and Rx sidelink resource pools for UE1 and UE2 (i.e., $Tx_A$ and $Rx_A$ for UE1, and $Tx_B$ and $Rx_B$ for UE2), where the abscissa denotes the time.

As shown in FIG. 10, UE1 transmits ($Tx_A$) the first signal 136 several times (e.g., twice) on consecutive first resources, each of which is received ($Rx_B$) by UE2 after the time $t_p$. Based on the periodicity between the reception of the first signals 136, $UE_2$ can determine (e.g., estimate or calculate) the $t_{periodA}$ based on which the resources are allocated to the first transceiver (UE1) 132_1. With a delay of $t_{periodA}$ (i.e., the period based on which the resources of the sidelink resource pool are allocated to UE1) or a multiple thereof, UE2 transmits ($Tx_B$) the second signal 108, which is received ($Rx_A$) by UE1 after the time $t_p$.

Subsequently, further embodiments of the first transceiver 132_1 are described, in which the first transceiver 132_1 determines the distances to two or more other transceivers (group ranging). Using the above ranging mechanism has the advantage, that multiple devices (transceivers) can perform ranging with reduced signaling compared to separate ranging, as will become clear from the following description.

Group Ranging

In embodiments, the first transceiver 132_1 can be configured to communicate with two or more other transceivers of the wireless communication 100 system using the sidelink resource pool of the wireless communication system 100. Further, the first transceiver 102 can be configured to transmit a configuration message to the two or more other transceivers, wherein the configuration message comprises a resource pattern (e.g., muting pattern) indicating one or more second resources selected out of the resources allocated to the first transceiver 132_1 (that can be used by the two or more other transceivers for transmitting the second signals). Further, the first transceiver 132_1 can be configured to receive the second signals 138 from the two or more other transceivers, wherein the second signals are transmitted by the two or more other transceivers responsive to a reception of the first signal 108, wherein the second signals 136 are transmitted by the two or more other transceivers on one or more second resources (indicated by the resource pattern) using the period $t_{periodA}$ based on which the resources are allocated to the first transceiver 132_1. Further, the first transceiver 132_1 can be configured, to determine distances to the two or more other transceivers based on times $t_{roundA}$ between the transmission of the first signal and the reception of the second signals from the two or more other transceivers, and based on the period $t_{periodA}$ based on which the resources are allocated to the first transceiver 132_1.

Figure 11:
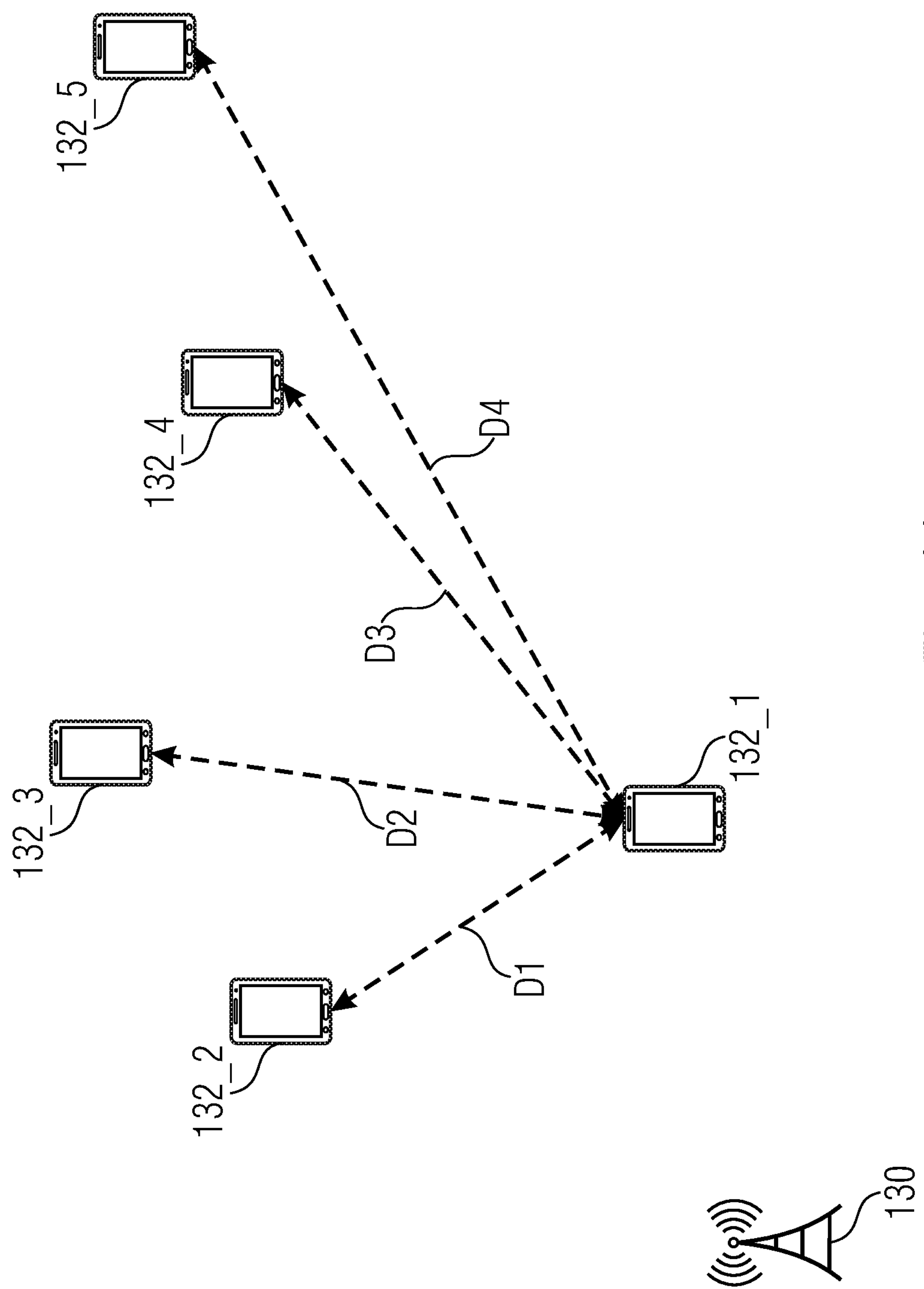
FIG. 11 shows a schematic block diagram of a wireless communication system according to an embodiment, according to an embodiment.

FIG. 11 shows a schematic block diagram of a wireless communication system 100 according to an embodiment (sidelink ranging with multiple devices). As shown in FIG. 11, the first transceiver 132_1 can be configured to communicate with two or more other transceivers, in detail, a second transceiver 132_2, a third transceiver 132_3, a fourth transceiver 132_4 and a fifth transceiver 132_5. Further, as indicated in FIG. 11 by way of example, the wireless communication system 100 may optionally comprise a central transceiver 130, such as a base station.

In embodiments, a plurality of resources (resource 1, resource 2, resource 3, resource 4, resource 5, etc.) of the sidelink resources pool can be allocated to the first transceiver 132_1 on a period basis with equal length periods $t_{periodA}$. A first resource (e.g., resource 1) of the plurality of resources allocated to the first transceiver 132_1 can be used by the first transceiver 132_1 itself for transmitting the first signal 136, wherein other resources (e.g., resource 2, resource 3, resource 4, resource 5, etc., referred to as second resources) of the plurality of resources allocated to the first transceiver 132_1 can used by the two or more other transceivers (e.g., the four transceiver 132_2, 132_3, 132_4 and 132_5 shown in FIG. 11) for transmitting the second signals 136. Thereby, the second signals can be transmitted by the two or more other transceivers on the same second resource (e.g., resource 2, resource 3, resource 4, resource 5, etc.) or on different second resources (e.g., resource 2 and resource 3, or resource 2 and resource 4, or resource 3 and resource 4, and so on) indicated by the resource pattern of the configuration message.

In embodiments, the first transceiver 132_1 can be configured to transmit at least one configuration message to the two or more other transceivers (e.g., the four transceivers 132_2, 132_3, 132_4 and 132_5 shown in FIG. 11). For example, the first transceiver 132_1 can be configured to transmit only one configuration message to the two or more other transceivers. Naturally, the first transceiver 132_1 also can be configured to transmit more than one configuration message to the two or more other transceivers.

In embodiments, the first transceiver can be configured to allocate to each of the two or more other transceivers (e.g., the four transceivers 132_2, 132_3, 132_4 and 132_5 shown in FIG. 11) at least one second resource (e.g., resource 2, resource 3, resource 4, resource 5, etc.) out of the resources allocated to the first transceiver for transmitting the second signal, wherein the configuration message can further comprise a resource allocation information allocating to each of the two or more other transceivers the respective one or more second resources.

For example, the first transceiver 132_1 can allocated resource 2 to the second transceiver 132_2 and resource 3 to the third transceiver 132_3 for transmitting the second signals 136. Naturally, also other allocations are possible. For example, resource 3 can be allocated to the second transceiver 132_2 and resource 4 or resource 2 to the third transceiver 132_3.

In embodiments, the first transceiver 132_1 can be configured to allocate for each of the two or more other transceivers (e.g., the four transceivers 132_2, 132_3, 132_4 and 132_5 shown in FIG. 11) the at least one or more second resources based on a signal-to-noise ratio of a signal received from the respective other transceiver.

In embodiments, the first transceiver 132_1 can be configured to allocate to at least two other transceivers out of the two or more other transceivers (e.g., the four transceivers 132_2, 132_3, 132_4 and 132_5 shown in FIG. 11) the same one or more second resources, wherein the first transceiver 132_1 can be configured to allocate to the at least two other transceivers different codes for separating the second signals transmitted by the at least two other transceivers on the same one or more second resources, or to allocate to the at least two other transceivers different resource elements of the same one or more second resources for separating the second signals transmitted by the at least two other transceivers on the same one or more muted resource, wherein the resource allocation information of the one configuration message further allocates the different codes or different resource elements to the at least two other transceivers.

For example, the first transceiver 132_1 can be configured to allocate the same second resource (e.g., resource 2) to the second transceiver 132_2 and to the third transceiver 132_3, if signals received from the second transceiver 132_2 and the third transceiver 132_3 comprise high signal-to-noise ratios or similar high signal-to-noise ratios. In this case, the second signals transmitted by second transceiver 132_2 and the third transceiver 132_3 can be separated, for example, by different codes.

In embodiments, the first transceiver 132_1 can be configured to allocate a first resource of the at least two or more second resources to a first transceiver of the two or more other transceivers, a signal received from which comprises a higher signal-to-noise ratio than a signal received from a second transceiver of the two or more other transceivers, wherein the transceiver can be configuring to allocate a second resource of the at least two or more second resources to the second transceiver of the two or more other transceivers, wherein the second resource follows the first resource in time.

For example, if signals received from the second transceiver 132_2 and the third transceiver 132_3 comprise low signal-to-noise ratios or different high signal-to-noise ratios, different second resources can be allocated to second transceiver 132_2 and the third transceiver 132_3. For example, assuming that a signal received from the second transceiver 132_3 comprises a higher signal-to-noise ratio than a signal received from the third transceiver 132_3, then resource 2 can be allocated to the second transceiver 132_2 and resource 3 can be allocated to the third transceiver 132_3.

In embodiments, if a group of devices is identified (for example during the discovery or initial mode) to cooperate in ranging, then the procedure bellow can be applied:

1. Is there a message indicating the availability of ranging.
   a. It may be distributed from the initiating device (e.g., the first transceiver 132_1) by the D2D MIB (master information block). An additional (optional) field can be added to indicate if the device is capable/interested in doing ranging.
   b. Currently, there is no field intended for that.
2. Then the remote devices (e.g., the other transceivers 132_2, 132_3, 132_4 and 132_5 in FIG. 11) may respond with their ability to range.
3. Determine who needs the range information:
   a. Master device (or transfer measurements to a central Location Server).
      i. A device being first to demand ranging could be the one to take the role of a master device.
      ii. Different types of devices could have different priority to be "master device" (inside a cluster). Example: UE-type RSUs vs. vehicular UEs.
   b. All/multiple devices need the range information.
4. Determine the accuracy mode (could involve multiple TWR signaling, SDS to compensate oscillator effect, upsampling reporting accuracy).
5. Determine the acceptable resource allocation procedures (separate signals in time, frequency or code).
   a. Identify if previous information is available like prior coarse range information or use the SNR measurements.
   b. Devices with good SNR can be separated with different codes on the same allocated resources. A code
      i. in the time domain;
      ii. in the frequency domain;
      iii. in both (e.g. in one or multiple resource blocks).
   c. The ranging reference symbols can be
      i. continuously in the spectrum (this involves complete user differentiation in the code domain □CDMA);
      ii. sporadically distributed in the spectrum (like the PRS, that uses every 6th subcarrier per OFDM symbol, which allows 6 users to share the resources without or with very little interference (in case of frequency mismatches or frequency spready).
   d. A muting pattern can be defined, where one/multiple ranging devices do not send a reply in the allocated resources in order to avoid interference with far away devices (near-far effect) like implemented for the PRS in LTE.
   e. Low SNR devices can have different (or priority procedure):
      i. Use separate frequency/time allocated resources.
      ii. Identify from the group devices if they can act as relay and calculate the range from the extra information without direct measurement with the master node (check if such a procedure is doable).
      iii. Potentially, a clustering based on coarse (or earlier) distance or power measurements provides different clusters of ranging targets that may range at the same time (avoiding the near-far effect).

Figure 12:
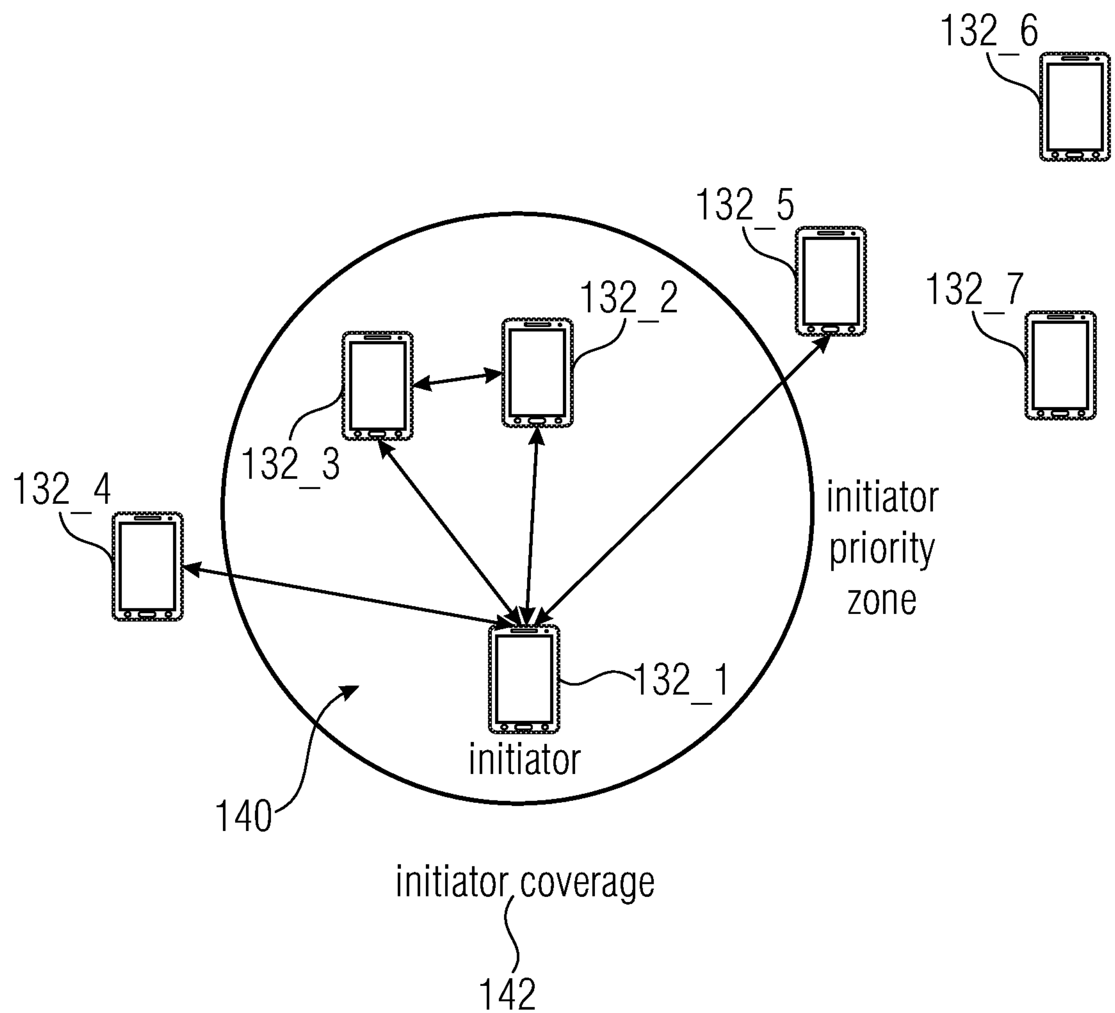
FIG. 12 shows a schematic block diagram of a communication system comprising a first transceiver and a plurality of other transceivers located in different coverage areas of the first transceiver, according to an embodiment.

FIG. 12 shows a schematic block diagram of a communication system 100 comprising a first transceiver 132_2 and a plurality of other transceivers located in different coverage areas of the first transceiver. In other words, FIG. 12 shows that the initiator (=first transceiver 132_1, e.g., master device) categorizes the priority of the devices (=other transceivers).

In detail, in FIG. 12, a second transceiver 132_2 and a third transceiver 132_3 are located in a priority zone 140 of the first transceiver 132_1 (initiator priority zone), wherein a fourth transceiver 132_4 and a fifth transceiver 132_5 are located in a coverage area 142 of the first transceiver 132_1 (initiator coverage), and wherein a sixth transceiver 132_6 and a seventh transceiver 132_7 are located out of the coverage area 142 of the first transceiver 132_1.

For example, the device (e.g., first transceiver 132_1) in FIG. 12 identifies that there are four devices (e.g., second transceiver 132_2, third transceiver 132_3, fourth transceiver 132_4 and fifth transceiver 132_5) in coverage and are capable of performing ranging. Based on the received signal strength or similar measurements (e.g., S-RSRP (sidelink reference Signal Power)). For applications like V2X, in case of a crash or emergency notification, it is important that the near devices are informed as fast as possible. Hence, the initiator (e.g., first transceiver 132_1) sets the priority zone 140, where the devices within the priority zone (e.g., the second transceiver 132_2 and third transceiver 132_3) have priority above the devices in the coverage area 142 but outside the priority zone 140 (e.g., the fourth transceiver 132_4 and fifth transceiver 132_5).

In embodiments, the initiator (e.g., the first transceiver 132_1) sends the ranging resource bitmap (or muting pattern), which indicates the resources that will not be used by the initiator for transmission and can hence be used. The initiator informs all the other devices (e.g., the second transceiver 132_2, third transceiver 132_3, fourth transceiver 132_4 and fifth transceiver 132_5 in FIG. 12) at which instances the reply should take place, for example:

1. UE2 132_2 and UE3 132_3 are in the priority zone 140 and are assigned the earliest resources:
   a. If the received signal strength for both UEs 132_2 and 132_4 is similar at the initiator 132_1, then the initiator 132_1 can most probably recover both signals if they are received at same time. The reply of UE2 132_2 and UE3 132_3 each use a different code (like Gold codes or using Zadoff-Chu sequences). In this case N is 1 and the round trip time can be expressed as:

$$t_{round\ Initiator}=2\cdot t_p+(1)\cdot t_{periodA}+m\cdot T_s$$

b. If the difference in the received signal power is high in the priority zone 140 (example when UE3 132_3 is very near to the initiator node 132_1), then the initiator 132_1 can decide to assign UE2 132_1 and UE3 132_3 separate resources.
2. The initiator 132_1 may indicate UE4 132_4 and UE5 132_5 that they can use the next resources respectively. Since the transmit pattern is [1 0 0 1 0] in the example shown in FIG. 12, UE4 132_4 replies at N=2 while UE5 132_5 has to reply at N=4 since the initiator is transmitting over N=3 resources.

Figure 13:
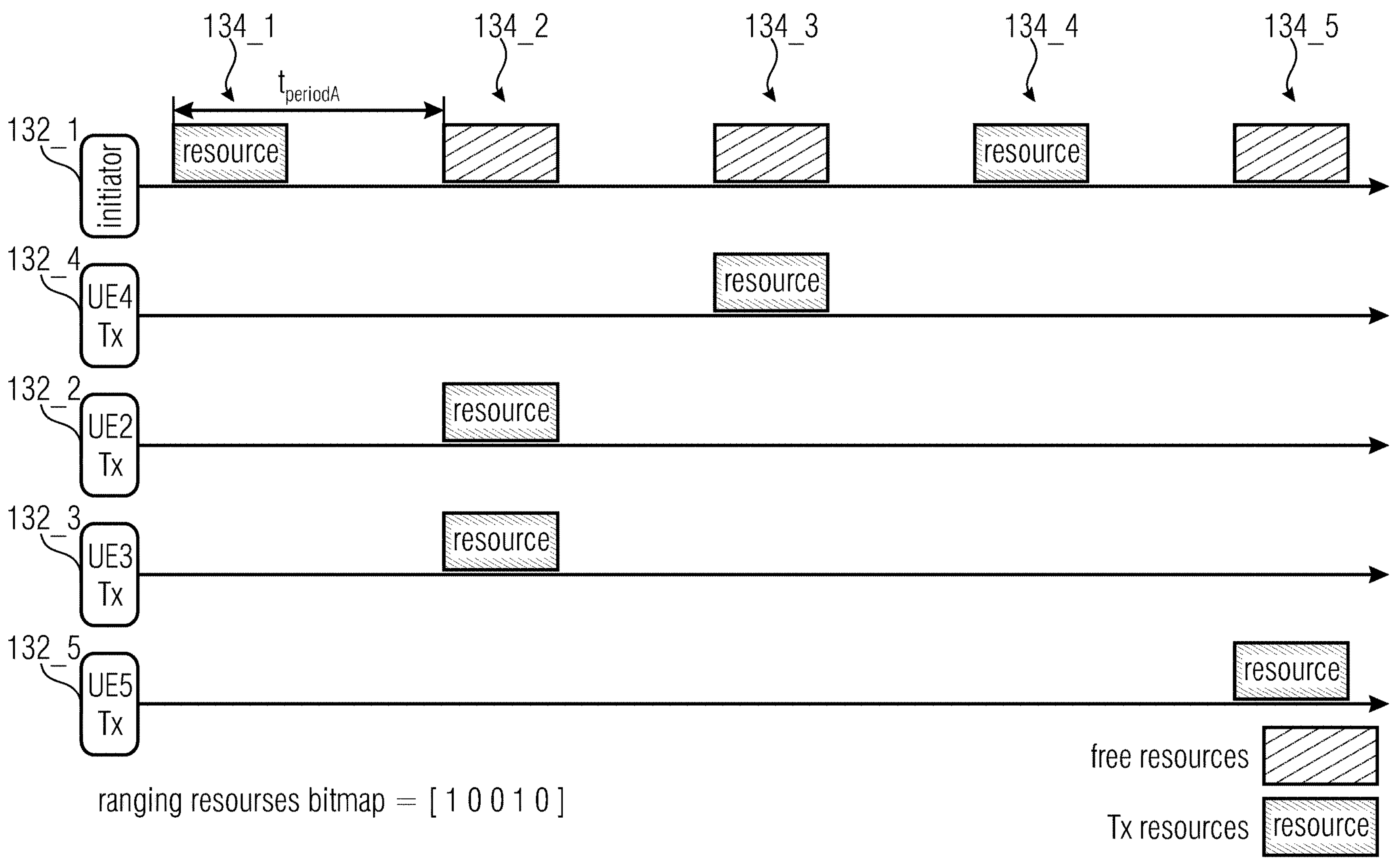
FIG. 13 shows in a diagram an exemplary ranging resources configuration for the scenario shown in FIG. 12, according to an embodiment.

FIG. 13 shows in a diagram an exemplary ranging resources configuration for the scenario shown in FIG. 12. Thereby, the ordinate denotes the respective Tx sidelink resource pools for the initiator (e.g., the first transceiver 132_1) and the four other devices (e.g., second transceiver 132_2, third transceiver 132_3, fourth transceiver 132_4 and fifth transceiver 132_5), where the abscissa denotes the time, or more precisely, the resources 134_1 to 134_5 allocated to the initiator on the period $t_{periodA}$ basis.

As shown in FIG. 13, the muting pattern (or ranging resource bitmap) signaled by the configuration message may be [1 0 0 1 0], i.e. the initiator 132_1 uses the first resource 134_1 and the fourth resource 134_4 for own transmissions, whereas the second resource 134_2, the third resource 134_3 and the fifth resource are muted and thus can be used by the four other devices (e.g., second transceiver 132_2, third transceiver 132_3, fourth transceiver 132_4 and fifth transceiver 132_5) for transmitting ranging signals (second signals).

As described above, the second resource 134_2 can be assigned to the second transceiver 132_2 and the third transceiver 132_3, which are located in the priority zone 140 and signals received from which have good SNR and thus can be separated by different codes, wherein the third resource 134_3 can be allocated to the fourth transceiver 132_4, and wherein the fifth resource 134_5 can be allocated to the fifth transceiver 134_5.

Figure 14:
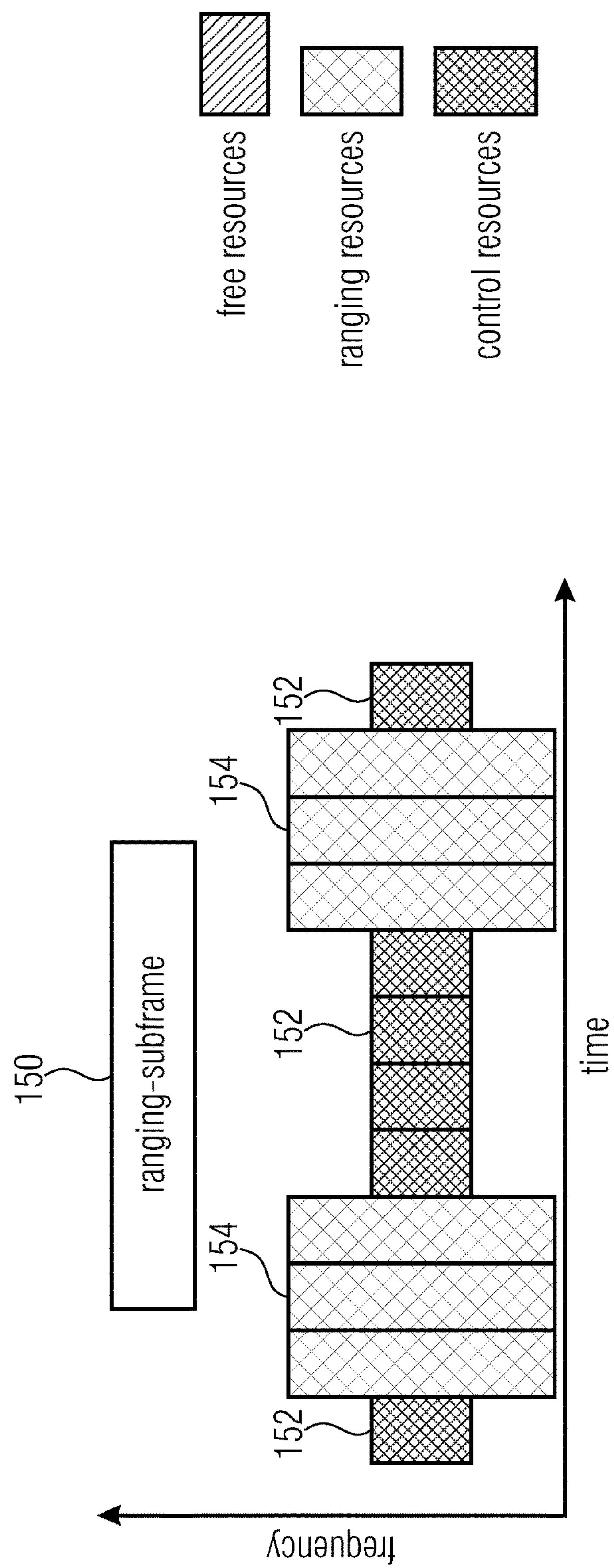
FIG. 14 shows in a diagram an exemplary ranging subframe configuration, according to an embodiment.

FIG. 14 shows in a diagram an exemplary ranging subframe configuration. Thereby, the ordinate denotes the frequency, where the abscissa denotes the time. As shown in FIG. 14, the ranging subframe 150 can comprise control resources 152 and ranging resources 154.

In other words, FIG. 14 shows an example of a ranging subframe configuration. The control resources (or configuration message) carries information for the other ranging devices, such as the resources bitmap, current position of the initiator, ranging sequence and the configuration for the reflector nodes. The ranging resources can be spread over wider frequencies to achieve better ranging results.

In other embodiments, waiting for N periods could be a long time for low latency sidelink applications. For ranging, in addition, the ranging measurement accuracy is better, if reply time is kept low (because of the oscillator effects). In this case, the value plays a vital role; since the flexibility to instantaneous reply and the extend the option on separating the resources in time.

Thus, in embodiments, the first transceiver (e.g., UE1) 132_1 can be configured to communicate with at least one other transceiver (e.g., a second transceiver (e.g., UE2)) of the wireless communication system 100 using a sidelink resource pool of the wireless communication system 100. Further, the first transceiver (e.g., UE1) 132_1 can be configured to receive a control signal from a central transceiver of the wireless communication system, the control signal allocating a response time multiplier m to the other transceiver (e.g., UE2 132_2). Further, the first transceiver (e.g., UE1) 132_1 can be configured to transmit a first signal on a resource of the sidelink resource pool. Further, the first transceiver (e.g., UE1) 132_1 can be configured to receive a second signal from the other transceiver (e.g., UE2 132_2) of the wireless communication system on a resource of the sidelink resource pool, the second signal transmitted by the other transceiver (e.g., UE2 132_2) responsive to a reception of the first signal, wherein the second signal can be transmitted by the other transceiver (e.g., UE2 132_2) using the response time multiplier m. Further, the first transceiver (e.g., UE1) 132_1 can be configured to determine a distance to the other transceiver (e.g., UE2 132_2) based on a time $t_{roundA}$ between the transmission of the first signal and the reception of the second signal from the other transceiver (e.g., UE2 132_2), and based on a response time $T_s$ of the other transceiver (e.g., UE2 132_2) and the response time multiplier m allocated to the other transceiver (e.g., UE2 132_2).

In embodiments, the first transceiver (e.g., UE1) 132_1 can be configured to determine the distance to the other transceiver (e.g., UE2 132_2) by determining a time $t_p$ the first signal and/or the second signal travels between the first transceiver (e.g., UE1) and the other transceiver (e.g., UE2 132_2) based on

- the time $t_{roundA}$ between the transmission of the first signal and the reception of the second signal from the other transceiver (e.g., UE2 132_2), and
- a total response time $m \cdot T_s$ of the other transceiver (e.g., UE2 132_2), wherein the total response time can be a response time $T_s$ (e.g., sampling rate or quantization value) of the other transceiver multiplied by a response time multiplier m (e.g., an integer greater than or equal to one).

In embodiments, the transceiver can be configured to determine the distance $d_{AB}$ to the other transceiver (e.g., UE2 132_2) based on the equation:

$$d_{AB} = \frac{t_{roundA} - m \cdot T_s}{2} \cdot v$$

wherein $t_{roundA}$ is the time between the transmission of the first signal and the reception of the second signal, wherein m is a natural number equal to or greater than one, wherein $T_s$ is the response time of the other transceiver, and wherein v is the signal propagation speed.

Figure 15:
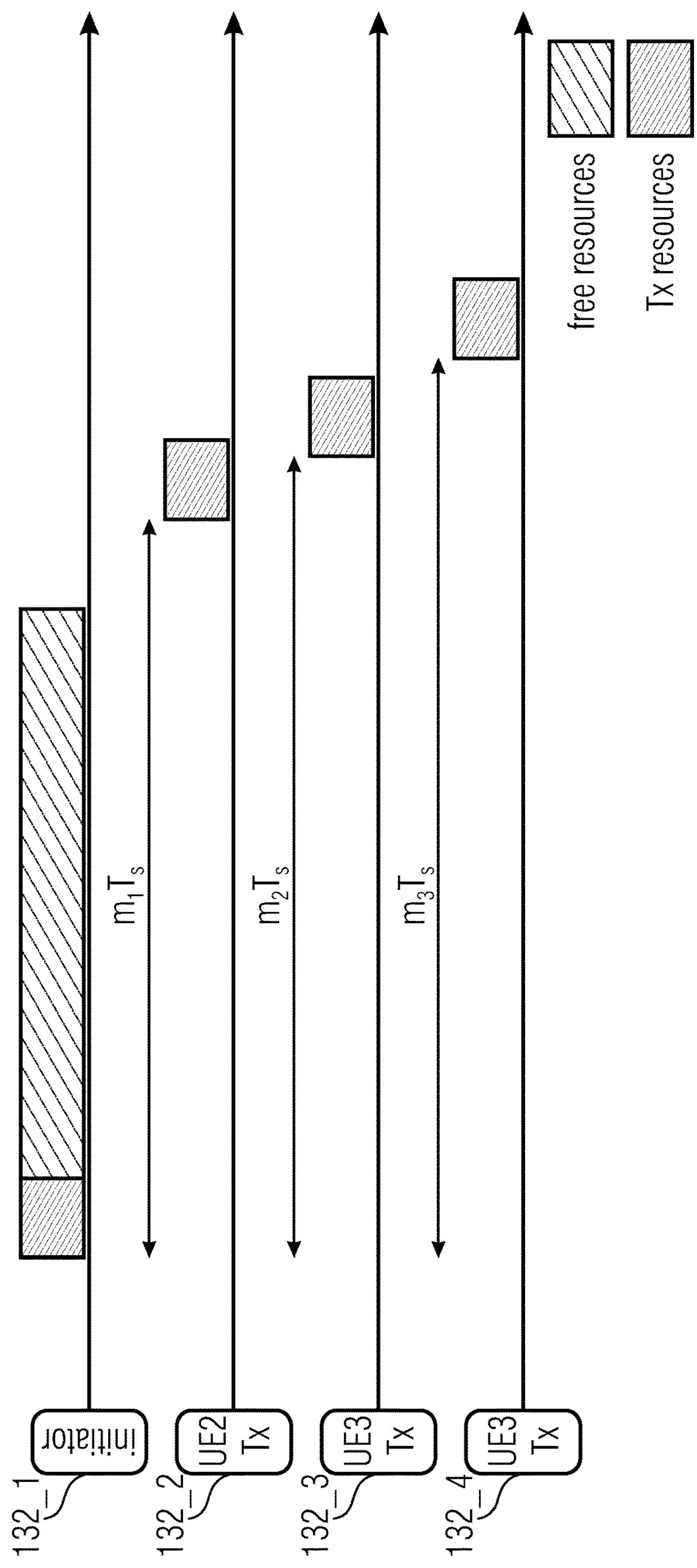
FIG. 15 shows in a diagram an exemplary ranging resources configuration, according to an embodiment.

FIG. 15 shows in a diagram an exemplary ranging resources configuration. Thereby, the ordinate denotes the respective Tx sidelink resource pools for the initiator (e.g., the first transceiver 132_1) and other devices (e.g., second transceiver 132_2, third transceiver 132_3 and fourth transceiver 132_4), where the abscissa denotes the time. In other words, FIG. 15 shows an example of a transmission configuration controlled by m. As shown in FIG. 15, different response time multipliers $m_1$, $m_2$, $m_3$ can be allocated to the other devices, in detail, a first response time multiplier $m_1$ to the second transceiver 132_2, a second response time multiplier $m_2$ to the third transceiver 132_3 and a third response time multiplier $m_3$ to the fourth transceiver 132_2.

Figure 16:
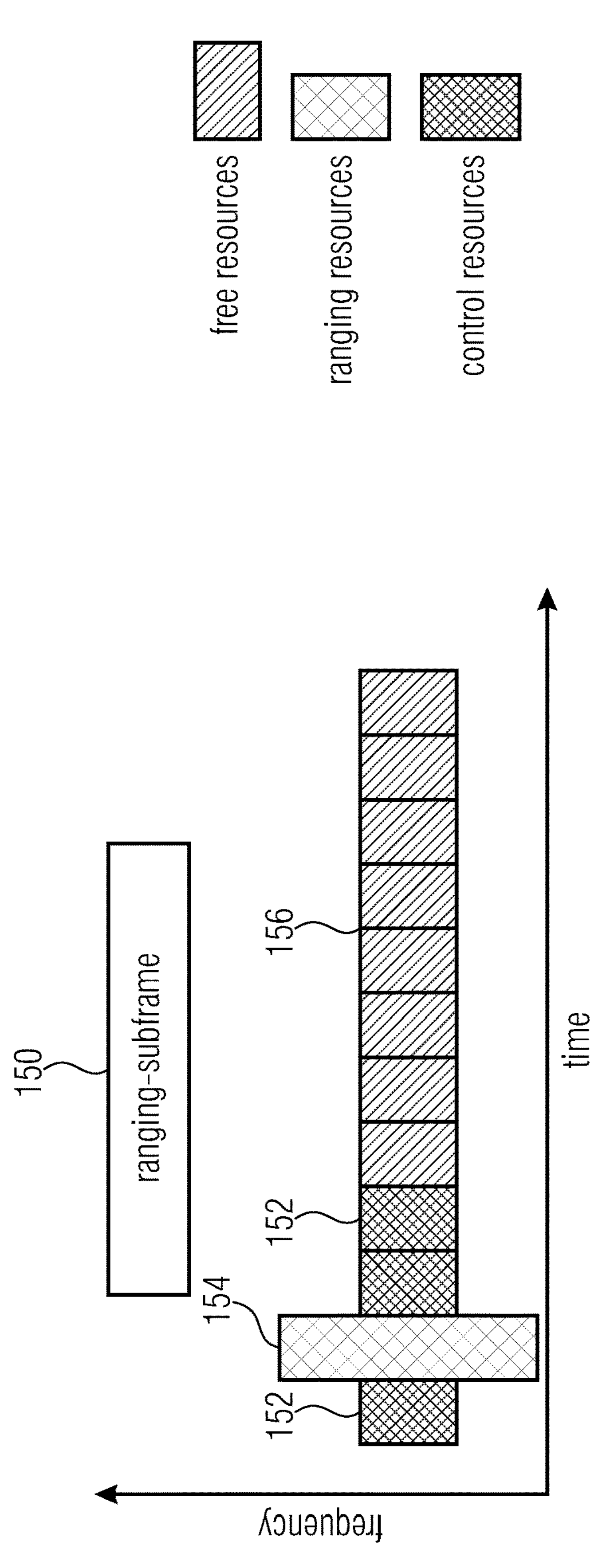
FIG. 16 shows in a diagram an exemplary ranging subframe configuration utilizing only a part of the resources, according to an embodiment.

FIG. 16 shows in a diagram an exemplary ranging subframe configuration utilizing only a part of the resources. Thereby, the ordinate denotes the frequency, where the abscissa denotes the time. As shown in FIG. 16, the ranging subframe 150 can comprise control resources 152, ranging resources 154 and free resources 156.

Figure 17:
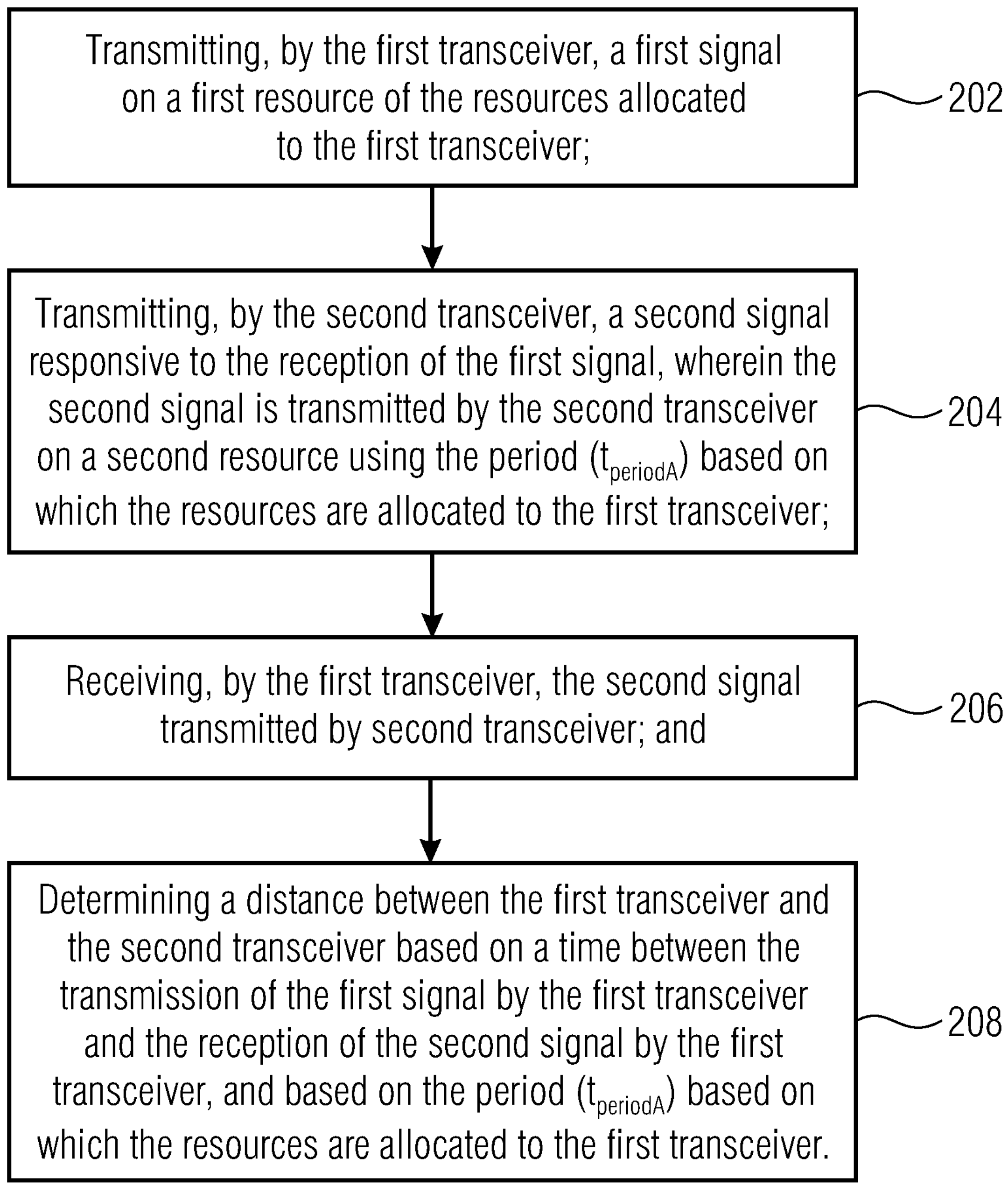
FIG. 17 shows a flowchart of a method for determining a distance between a first transceiver and a second transceiver of a wireless communication system, according to an embodiment, according to an embodiment.

FIG. 17 shows a flowchart of a method 200 for determining a distance between a first transceiver and a second transceiver of a wireless communication system, the first transceiver and the second transceiver communicating with each other using resources of a sidelink resource pool allocated to the first transceiver on a period basis with equal length periods $t_{periodA}$ and allocated to the second transceiver on a period basis with equal length periods $t_{periodA}$. The method 200 comprises a step 202 of transmitting, by the first transceiver, a first signal on a first resource of the resources allocated to the first transceiver. Further, the method 200 comprises a step 204 of transmitting, by the second transceiver, a second signal responsive to the reception of the first signal, wherein the second signal is transmitted by the second transceiver on a second resource using the period ($t_{periodA}$) or a multiple thereof N based on which the resources are allocated to the first transceiver. Further, the method 200 comprises a step 206 of receiving, by the first transceiver, the second signal transmitted by second transceiver. Further, the method 200 comprises a step 208 of determining a distance between the first transceiver and the second transceiver based on a time between the transmission of the first signal by the first transceiver and the reception of the second signal by the first transceiver, and based on the period ($t_{periodA}$) based on which the resources are allocated to the first transceiver.

Figure 18:
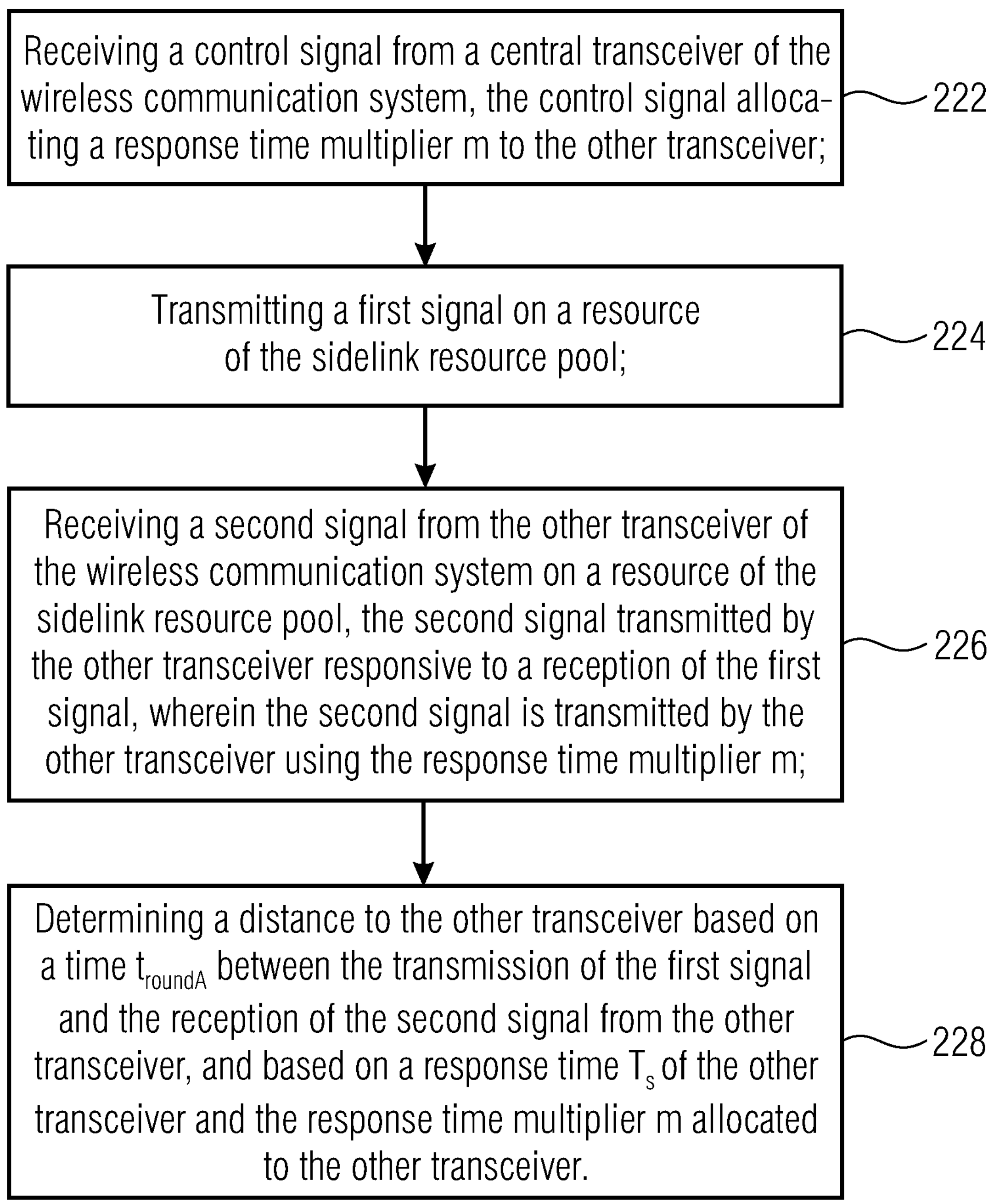
FIG. 18 shows a flowchart of a method for determining a distance between a first transceiver and a second transceiver of a wireless communication system, according to an embodiment.

FIG. 18 shows a flowchart of a method 220 for determining a distance between a first transceiver and a second transceiver of a wireless communication system, the first transceiver and the second transceiver communicating with each other using resources of a sidelink resource pool. The method 220 comprises a step 222 of receiving a control signal from a central transceiver of the wireless communication system, the control signal allocating a response time multiplier m to the other transceiver. Further, the method 220 comprises a step 224 of transmitting a first signal on a resource of the sidelink resource pool. Further, the method 220 comprises a step 226 of receiving a second signal from the other transceiver of the wireless communication system on a resource of the sidelink resource pool, the second signal transmitted by the other transceiver responsive to a reception of the first signal, wherein the second signal is transmitted by the other transceiver using the response time multiplier m. Further, the method 220 comprises a step 228 of determining a distance to the other transceiver based on a time $t_{roundA}$ between the transmission of the first signal and the reception of the second signal from the other transceiver, and based on a response time $T_s$ of the other transceiver and the response time multiplier m allocated to the other transceiver.

Note that N and m can be configured in the same application, although they were described in different embodiments.

Absolute Positioning

Subsequently, a first scenario with three synchronized central transceivers (e.g., base station (e.g., eNBs) and two or more ranging devices is described making reference to FIGS. 19 and 20.

Figure 19:
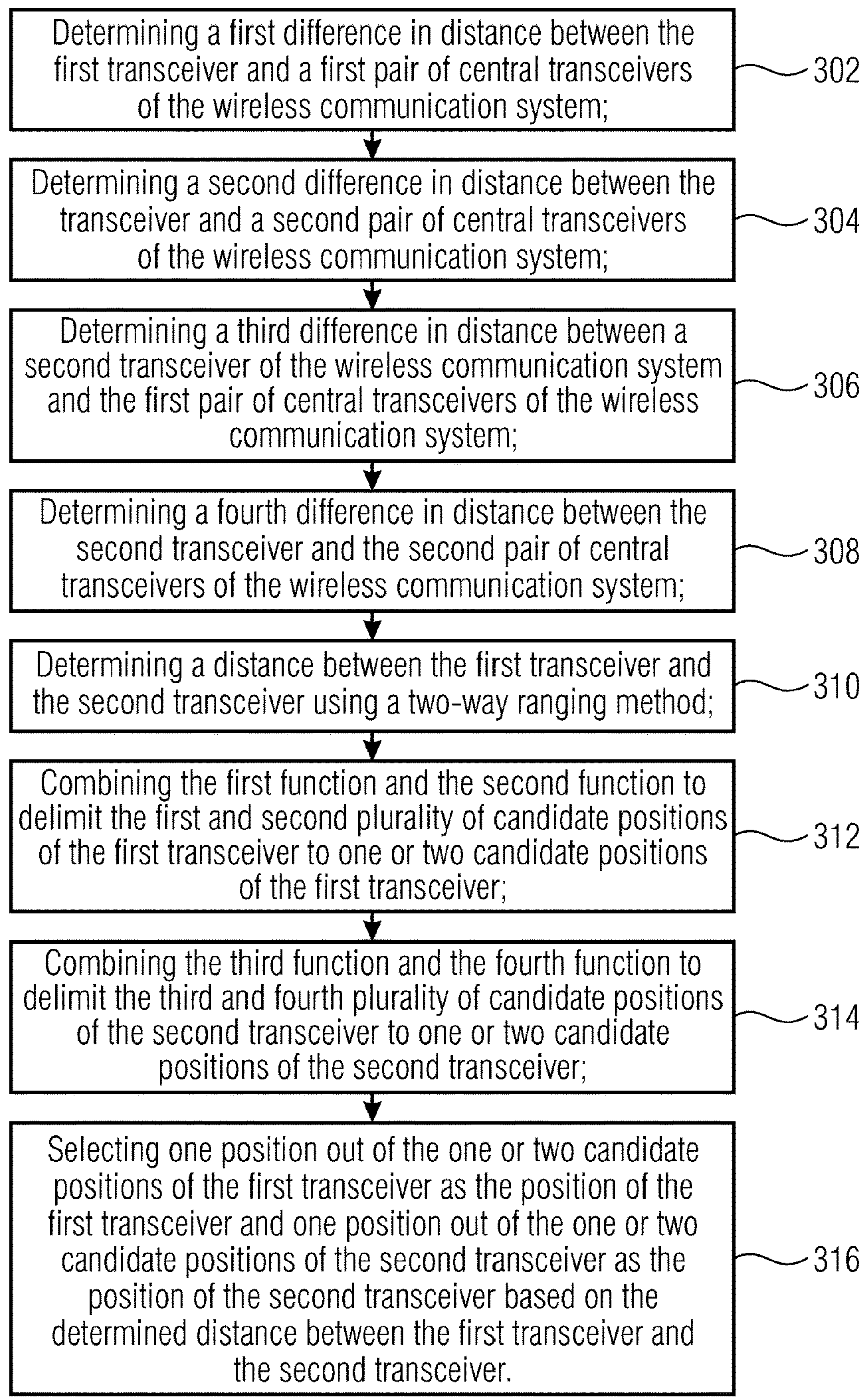
FIG. 19 shows a flowchart of a method for determining a position of a first transceiver of a wireless communication system, according to an embodiment.

FIG. 19 shows a flowchart of a method 300 for determining a position of a first transceiver of a wireless communication system. The method 300 comprises a step 302 of determining a first difference in distance between the first transceiver and a first pair of central transceivers (e.g., a first base station (e.g., eNB1) and a second base station (e.g., eNB2)) of the wireless communication system based on a first time difference of arrival of a signal of the first transceiver received at the first pair of central transceivers, to obtain a first function describing a first plurality of candidate positions of the first transceiver. Further, the method 300 comprises a step 304 of determining a second difference in distance between the transceiver and a second pair of central transceivers (e.g., the first base station (e.g., eNB1) and a third base station (e.g., eNB3)) of the wireless communication system based on a second time difference of arrival of a signal of the first transceiver received at the second pair of central transceivers, to obtain a second function describing a second plurality of candidate positions of the first transceiver. Further, the method 300 comprises a step 306 of determining a third difference in distance between a second transceiver of the wireless communication system and the first pair of central transceivers of the wireless communication system based on a third time difference of arrival of a signal of the second transceiver received at the first pair of central transceivers, to obtain a third function describing a third plurality of candidate positions of the second transceiver. Further, the method 300 comprises a step 308 of determining a fourth difference in distance between the second transceiver and the second pair of central transceivers of the wireless communication system based on a fourth time difference of arrival of a signal of the second transceiver received at the second pair of central transceivers, to obtain a fourth function describing a fourth plurality of candidate positions of the second transceiver. Further, the method 300 comprises a step 310 of determining a distance between the first transceiver and the second transceiver using a two-way ranging method. Further, the method 300 comprises a step 312 of combining the first function and the second function to delimit the first and second plurality of candidate positions of the first transceiver to one or two candidate positions of the first transceiver. Further, the method 300 comprises a step 314 of combining the third function and the fourth function to delimit the third and fourth plurality of candidate positions of the second transceiver to one or two candidate positions of the second transceiver. Further, the method 300 comprises a step 316 of selecting one position out of the one or two candidate positions of the first transceiver as the position of the first transceiver and one position out of the one or two candidate positions of the second transceiver as the position of the second transceiver based on the determined distance between the first transceiver and the second transceiver.

For example, the first function can describe a first hyperbolic curve describing the first plurality of candidate positions of the first transceiver, wherein the second function can describe a second hyperbolic curve describing the second plurality of candidate positions of the first transceiver. Combining the first function and the second function can comprise determining one or more intersections between the first hyperbolic curve and the second hyperbolic curve, to delimit the first and second plurality of candidate positions of the first transceiver to one or two candidate positions of the first transceiver.

For example, the third function can describe a third hyperbolic curve describing the third plurality of candidate positions of the second transceiver, wherein the fourth function can describe a fourth hyperbolic curve describing the fourth plurality of candidate positions of the second transceiver. Combining the third function and the fourth function can comprise determining one or more intersections between the third hyperbolic curve and the fourth hyperbolic curve, to delimit the third and fourth plurality of candidate positions of the second transceiver to one or two candidate positions of the second transceiver.

In the following, the method 300 for determining the position of the first transceiver of the wireless communication system of FIG. 19 is explained in further detail making reference to the example shown in FIG. 20.

Figure 20:
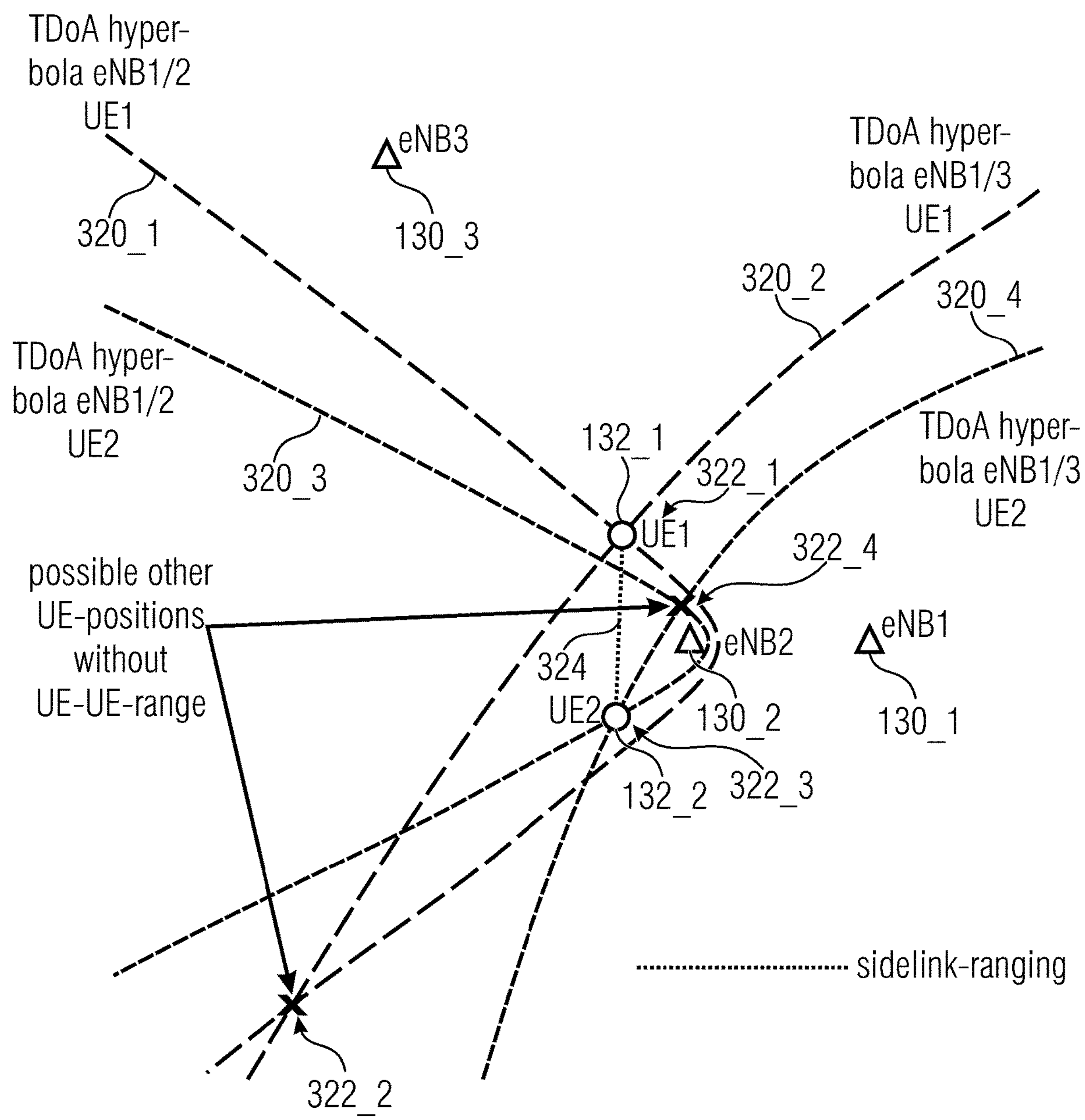
FIG. 20 shows a schematic view of a wireless communication network with three central transceivers and two transceivers, as well as TDOA functions describing candidate positions of the two transceivers, according to an embodiment.

FIG. 20 shows a schematic view of a wireless communication network 100 with three central transceivers (e.g., base stations (e.g., eNB)) and two transceivers (e.g., UEs) as well as TDOA functions describing candidate positions of the two transceivers. In other words, FIG. 20 shows a schematic sketch of TDOA with 3 eNBs (Mode1).

In detail, FIG. 20 shows a first central transceiver (e.g., first base station (e.g., eNB1)) 130_1, a second central transceiver (e.g., second base station (e.g., eNB2)) 130_2 and a third central transceiver (e.g., third base station (e.g., eNB3)) 130_3. The three central transceivers 130_1, 130_2 and 130_3 are synchronized in time and located at known positions. Aim is to determine the position of the first transceiver (e.g., UE1) 132_1 and (optionally) of the second transceiver (e.g., UE2) 132_2.

For that purpose, the first central transceiver 130_1 and the second central transceiver 130_2 can determine a first time difference of arrival (TDOA) of a signal from the first transceiver 132_1, to obtain a first difference in distance to the first transceiver 132_1. The first difference in distance can be expressed by a first hyperbolic function (or hyperbolic curve) 320_1, which describes a first plurality of candidate positions of the first transceiver 132_1.

Further, the first central transceiver 130_1 and the third central transceiver 130_3 can determine a second time difference of arrival (TDOA) of a signal from the first transceiver 132_1, to obtain a second difference in distance to the first transceiver 132_1. The second difference in distance can be expressed by a second hyperbolic function (or hyperbolic curve) 320_2, which describes a second plurality of candidate positions of the first transceiver 132_1.

Further, the first central transceiver 130_1 and the second central transceiver 130_2 can determine a third time difference of arrival (TDOA) of a signal from the second transceiver 132_2, to obtain a third difference in distance to the second transceiver 132_2. The third difference in distance can be expressed by a third hyperbolic function (or hyperbolic curve) 320_3, which describes a third plurality of candidate positions of the second transceiver 132_2.

Further, the first central transceiver 130_1 and the third central transceiver 130_3 can determine a fourth time difference of arrival (TDOA) of a signal from the second transceiver 132_2, to obtain a fourth difference in distance to the second transceiver 132_2. The fourth difference in distance can be expressed by a fourth hyperbolic function (or hyperbolic curve) 320_4, which describes a fourth plurality of candidate positions of the second transceiver 132_2.

After having determined the four hyperbolic functions 320_1 to 320_4 describing the candidate positions of the first transceiver 132_1 and the second transceiver 132_2, intersections between the four hyperbolic functions 320_1 to 320_4 can be determined, to delimit the candidate positions of the first transceiver 132_1 and the second transceiver 132_2.

In detail, a first intersection 322_1 and a second intersection 322_2 between the first hyperbolic function 320_1 and the second hyperbolic function 320_2 can be determined, to delimit the first and second plurality of candidate positions of the first transceiver 132_1 to two candidate positions, i.e., the first intersection 322_1 describes a first candidate position of the first transceiver 132_1, where the second intersection 322_2 described a second candidate position of the first transceiver 132_1.

Further, a third intersection 322_3 and a fourth intersection 322_4 between the third hyperbolic function 320_3 and the fourth hyperbolic function 320_4 can be determined, to delimit the third and fourth plurality of candidate positions of the second transceiver 132_2 to two candidate positions, i.e., the third intersection 322_3 describes a third candidate position of the second transceiver 132_2, where the fourth intersection 322_4 describes a fourth candidate position of the second transceiver 132_2.

Finally, based on a known distance 324 between the first transceiver 132_1 and the second transceiver 132_2, which can be determined, for example, based on the above described ranging method, one of the first and second candidate positions of the first transceiver 132_1 can be determined (or selected) as the position of the first transceiver 132_1, and one of the third and fourth candidate positions of the second transceiver 132_2 can be determined (or selected) as the position of the second transceiver 132_2.

Thus, by using a TDOA-method with three central transceivers (e.g., eNBs) 130_1 to 130_3 of known position, two hyperbolas of potential positions are obtained per transceiver (e.g., UE). For the first transceiver (e.g., UE1) 132_1, these hyperbolas are the hyperbolas 320_1 and 320_2, where for the second transceiver (e.g., UE2) 132_2, these hyperbolas are the hyperbolas 320_3 and 320_4. Each hyperbola 320_1 to 320_4 expresses the possible location of each transceiver. At the intersections 322_1 and 322_2 of the hyperbolas 320_1 and 320_2, there are the two possible locations of the first transceiver (e.g., UE1) 132_1, where at the intersections 322_3 and 322_4 of the hyperbolas 320_3 and 320_4, there are the two possible locations of the second transceiver (e.g., UE2) 132_2. The correct locations can now be determined by comparing the measured distance 324 between the first transceiver (e.g., UE1) 132_1 and the second transceiver (e.g., UE2) 132_2 and all distances between the possible locations of the first transceiver (e.g., UE1) 132_1 and the second transceiver (e.g., UE2) 132_2.

Subsequently, a second scenario with two synchronized central transceivers (e.g., base stations (e.g., eNBs)), one or more not synchronized stations (e.g., road side units (e.g., RSUs)), and two or more ranging devices is described making reference to FIGS. 21 and 22.

FIG. 21 shows a flowchart of a method 400 for determining a position of a first transceiver of a wireless communication system 100. The method comprises 400 a step 402 of determining a first difference in distance between the first transceiver and a first pair of central transceivers (e.g., a first base station (e.g., eNB1) and a second base station (e.g., eNB2)) of the wireless communication system based on a first time difference of arrival of a signal of the first transceiver received at the first pair of central transceivers, to obtain a first function describing a first plurality of possible positions of the first transceiver. Further, the method 400 comprises a step 404 of determining a first distance between a fixed transceiver (e.g., a road side unit (e.g., RSU)) and the first transceiver using a two-way ranging method, to obtain a second function describing a second plurality of possible locations of the first transceiver. Further, the method 400 comprises a step 406 of determining a second difference in distance between a second transceiver and the first pair of central transceivers (e.g., the first base station (e.g., eNB1) and the second base station (e.g., eNB2)) of the wireless communication system based on a second time difference of arrival of a signal of the second transceiver received at the first pair of central transceivers, to obtain a third function describing a third plurality of possible positions of the second transceiver. Further, the method 400 comprises a step 408 of determining a second distance between the fixed transceiver (e.g., the road side unit (e.g., RSU)) and the second transceiver using a two-way ranging method, to obtain a fourth function describing a fourth plurality of possible locations of the second transceiver. Further, the method 400 comprises a step 410 of determining a third distance between the first transceiver and the second transceiver using a two-way ranging method. Further, the method 400 comprises a step 412 of combining the first function and the second function to delimit the first and second plurality of candidate positions of the first transceiver to one or two candidate positions of the first transceiver. Further, the method 400 comprises a step 414 of combining the third function and the fourth function to delimit the third and fourth plurality of candidate positions of the second transceiver to one or two candidate positions of the second transceiver. Further, the method 400 comprises a step 416 of selecting one position out of the one or two candidate positions of the first transceiver as the position of the first transceiver and one position out of the one or two candidate positions of the second transceiver as the position of the second transceiver based on the determined distance between the first transceiver and the second transceiver.

For example, the first function can describe a first hyperbolic curve describing the first plurality of candidate positions of the first transceiver, wherein the second function can describe a first circle describing the second plurality of candidate positions of the first transceiver. Combining the first function and the second function can comprise determining one or more intersections between the first hyperbolic curve and the first circle, to delimit the first and second plurality of candidate positions of the first transceiver to one or two candidate positions of the first transceiver.

For example, the third function can describe a second hyperbolic curve describing the third plurality of candidate positions of the second transceiver, wherein the fourth function can describe a second circle describing the fourth plurality of candidate positions of the second transceiver. Combining the third function and the fourth function can comprise determining one or more intersections between the second hyperbolic curve and the second circle, to delimit the third and fourth plurality of candidate positions of the second transceiver to one or two candidate positions of the second transceiver.

In the following, the method 400 for determining the position of the first transceiver of the wireless communication system of FIG. 21 is explained in further detail making reference to the example shown in FIG. 22.

Figure 22:
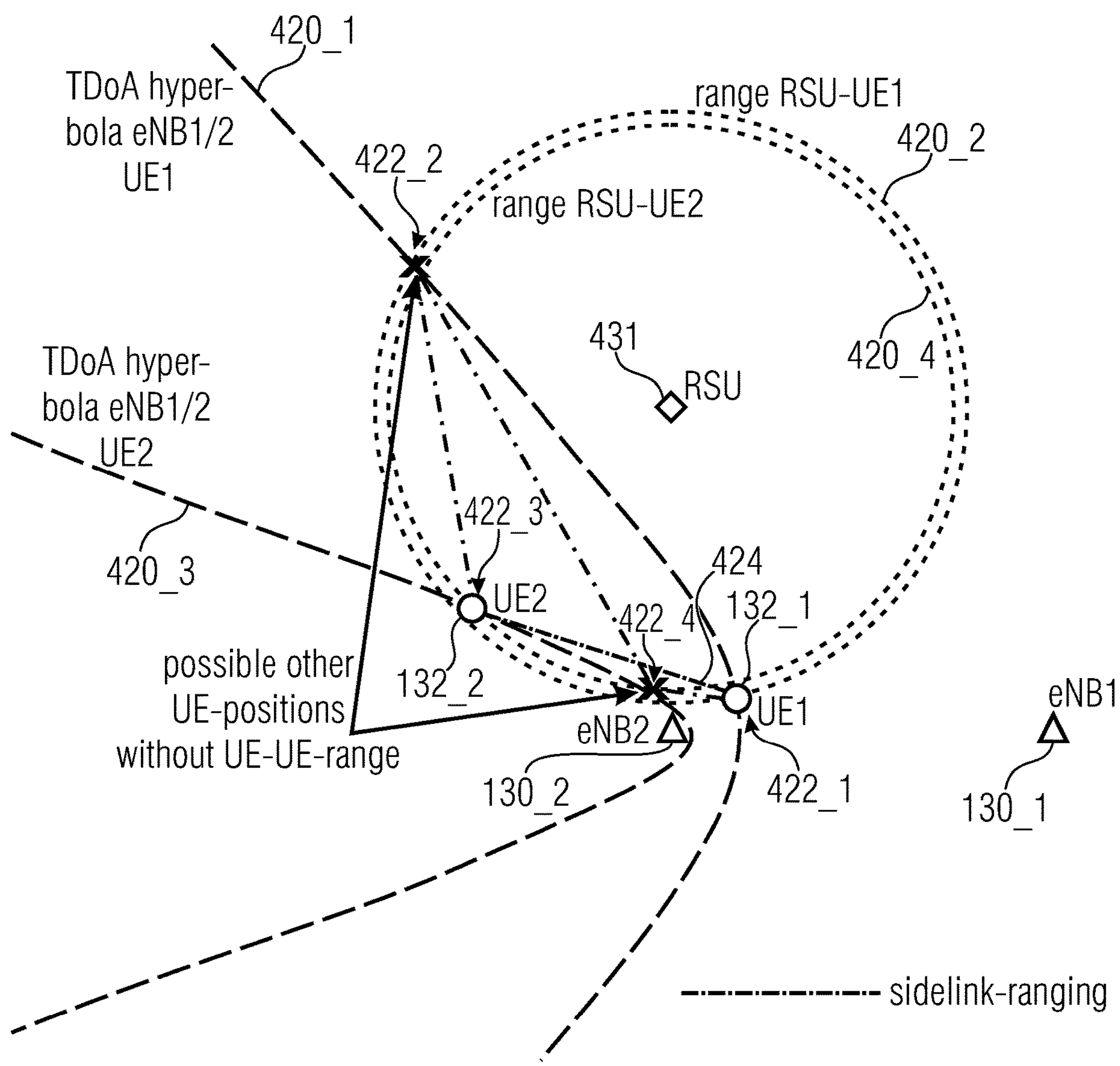
FIG. 22 shows a schematic view of a wireless communication network with two central transceivers, a fixed transceiver and two transceivers, as well as TDOA functions describing candidate positions of the two transceivers, according to an embodiment.

FIG. 22 shows a schematic view of a wireless communication network 100 with two central transceivers (e.g., base stations (e.g., eNB)), a fixed transceiver (e.g., a road side unit (e.g., RSU)) and two transceivers (e.g., UEs) as well as TDOA functions describing candidate positions of the two transceivers. In other words, FIG. 22 shows a schematic sketch of TDOA with 2 eNBs, RTT with RSU (Mode2).

In detail, FIG. 22 shows a first central transceiver (e.g., first base station (e.g., eNB1)) 130_1, a second central transceiver (e.g., second base station (e.g., eNB2)) 130_2 and a fixed transceiver (e.g., a road side unit (e.g., RSU)) 131. The two central transceivers 130_1 and 130_2 and the fixed transceiver 131 are located at known positions, wherein only the two central transceivers 130_1 and 130_2 are synchronized in time. Aim is to determine the position of the first transceiver (e.g., UE1) 132_1 and (optionally) of the second transceiver (e.g., UE2) 132_2.

For that purpose, the first central transceiver 130_1 and the second central transceiver 130_2 can determine a first time difference of arrival (TDOA) of a signal from the first transceiver 132_1, to obtain a first difference in distance to the first transceiver 132_1. The first difference in distance can be expressed by a first function (e.g., hyperbolic function, or hyperbolic curve) 420_1, which describes a first plurality of candidate positions of the first transceiver 132_1.

Further, the fixed transceiver 131 can determine a first distance to the first transceiver 132_1 using a two-way ranging method, to obtain a second function (e.g., circle function, or circle) 420_2 describing a second plurality of possible locations of the first transceiver 132_1.

Further, the first central transceiver 130_1 and the second central transceiver 130_2 can determine a second time difference of arrival (TDOA) of a signal from the second transceiver 132_2, to obtain a second difference in distance to the second transceiver 132_2. The second difference in distance can be expressed by a second function (e.g., hyperbolic function, or hyperbolic curve) 420_3, which describes a second plurality of candidate positions of the second transceiver 132_2.

Further, the fixed transceiver 131 can determine a second distance to the second transceiver 132_2 using a two-way ranging method, to obtain a fourth function (e.g., circle function, or circle) 420_4 describing a fourth plurality of possible locations of the second transceiver 132_2.

After having determined the four functions 420_1 to 420_4 describing the candidate positions of the first transceiver 132_1 and the second transceiver 132_2, intersections between the four functions 420_1 to 420_4 can be determined, to delimit the candidate positions of the first transceiver 132_1 and the second transceiver 132_2.

In detail, a first intersection 422_1 and a second intersection 422_2 between the first function (e.g., first hyperbolic curve) 420_1 and the second function (e.g., second circle) 420_2 can be determined, to delimit the first and second plurality of candidate positions of the first transceiver 132_1 to two candidate positions, i.e., the first intersection 422_1 describes a first candidate position of the first transceiver 132_1, where the second intersection 422_2 describes a second candidate position of the first transceiver 132_1.

Further, a third intersection 422_3 and a fourth intersection 422_4 between the third function (e.g., third hyperbolic curve) 420_3 and the fourth function (e.g., fourth circle) 420_4 can be determined, to delimit the third and fourth plurality of candidate positions of the second transceiver 132_2 to two candidate positions, i.e., the third intersection 422_3 describes a third candidate position of the second transceiver 132_2, where the fourth intersection 422_4 describes a fourth candidate position of the second transceiver 132_2.

Finally, based on a known distance 424 between the first transceiver 132_1 and the second transceiver 132_2, which can be determined, for example, based on the above described ranging method, one of the first and second candidate positions of the first transceiver 132_1 can be determined (or selected) as the position of the first transceiver 132_1, and one of the third and fourth candidate positions of the second transceiver 132_2 can be determined (or selected) as the position of the second transceiver 132_2.

Thus, by using TDOA with two central transceivers (e.g., eNBs) 130_1 and 130_2 with known position, one hyperbola 420_1 and 420_3 is obtained for each transceiver (e.g., UE). In FIG. 22, each hyperbola 420_1 and 420_3 represents a potential location of a transceiver (e.g., UE). Additionally, a fixed transceiver (e.g., road side unit (RSU)) 131 at a known position is introduced that ranges with the transceivers (e.g., UEs) 132_1 and 132_2. With the distance-information between the fixed transceiver 131 and a transceiver (e.g., UE) 132_1 or 132_2 two to four possible positions of the transceiver (e.g., UE) 132_1 or 132_2 can be obtained. The correct location can now be determined by comparing the measured distance between the first transceiver (e.g., UE1) 132_1 and the second transceiver (e.g., UE2) and all distances between the possible locations of the first transceiver (e.g., UE1) 132_1 and the second transceiver (e.g., UE2). The fixed transceiver (e.g., road side unit (RSU)) 130 may also be replaced by a third transceiver (e.g., UE) with exactly known position.

Subsequently, a third scenario with one or more fixed transceivers (e.g., road side units (e.g., RSUs)) in a tunnel is described making reference to FIGS. 23 and 25.

Figure 23:
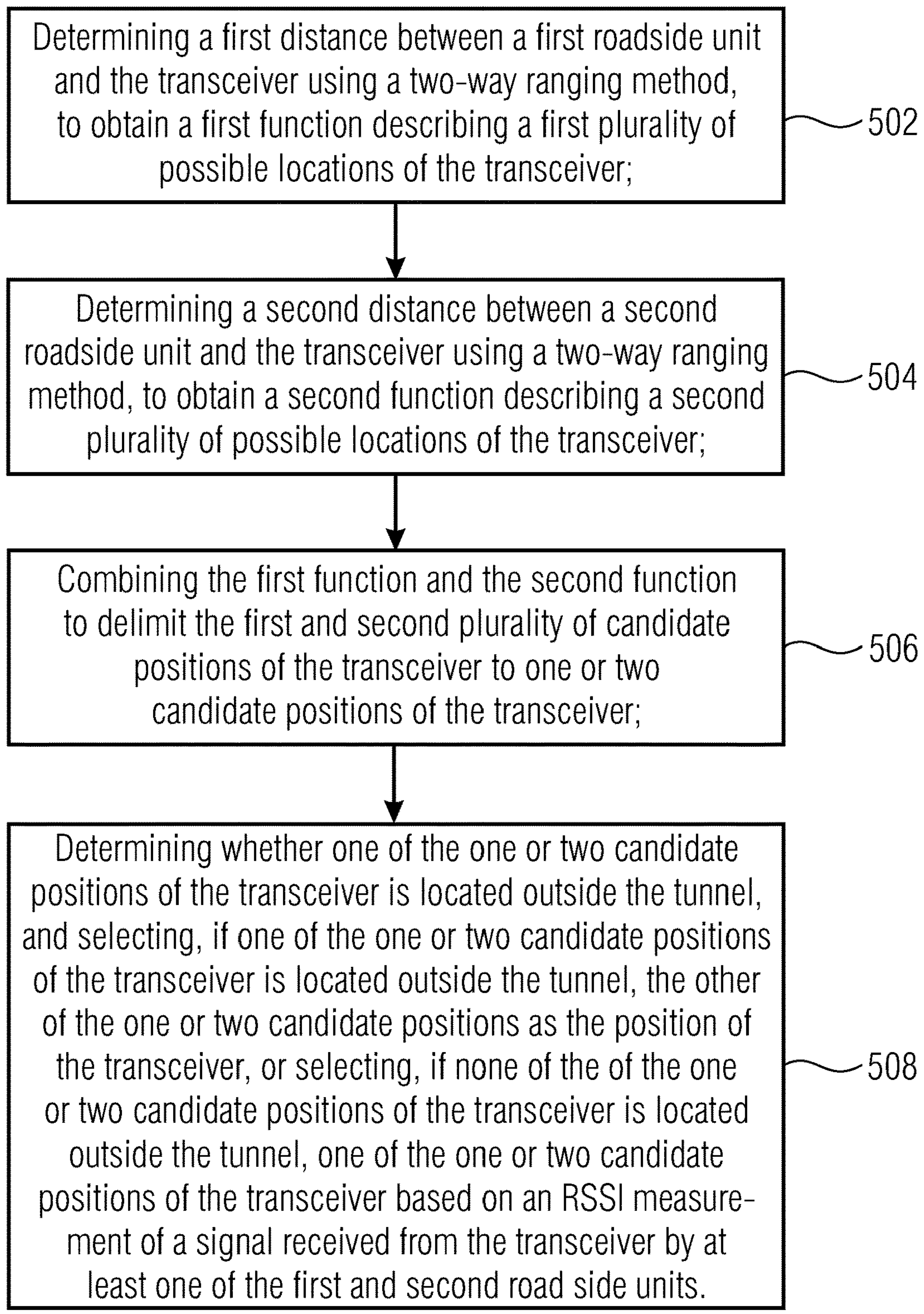
FIG. 23 shows a flowchart of a method for determining a position of a transceiver of a wireless communication system in a tunnel, according to an embodiment.

FIG. 23 shows a flowchart of a method 500 for determining a position of a transceiver of a wireless communication system 100 in a tunnel. The method 500 comprises a step 502 of determining a first distance between a first fixed transceiver (e.g., first roadside unit (e.g., RSU)) and the transceiver (e.g., user equipment (e.g., UE)) using a two-way ranging method, to obtain a first function describing a first plurality of possible locations of the transceiver. Further, the method 500 comprises a step 504 of determining a second distance between a second fixed transceiver (e.g., second roadside unit (e.g., RSU2)) and the transceiver using a two-way ranging method, to obtain a second function describing a second plurality of possible locations of the transceiver. Further, the method 500 comprises a step 506 of combining the first function and the second function to delimit the first and second plurality of candidate positions of the transceiver to one or two candidate positions of the transceiver. Further, the method 500 comprises a step 508 of determining whether one of the one or two candidate positions of the transceiver is located outside the tunnel, and selecting, if one of the one or two candidate positions of the transceiver is located outside the tunnel, the other of the one or two candidate positions as the position of the transceiver, or selecting, if none of the of the one or two candidate positions of the transceiver is located outside the tunnel, one of the one or two candidate positions of the transceiver based on an RSSI measurement of a signal received from the transceiver by at least one of the first and second fixed transceivers.

In the following, the method 500 for determining the position of the transceiver of the wireless communication system 100 of FIG. 23 is explained in further detail making reference to the example shown in FIG. 24.

Figure 24:
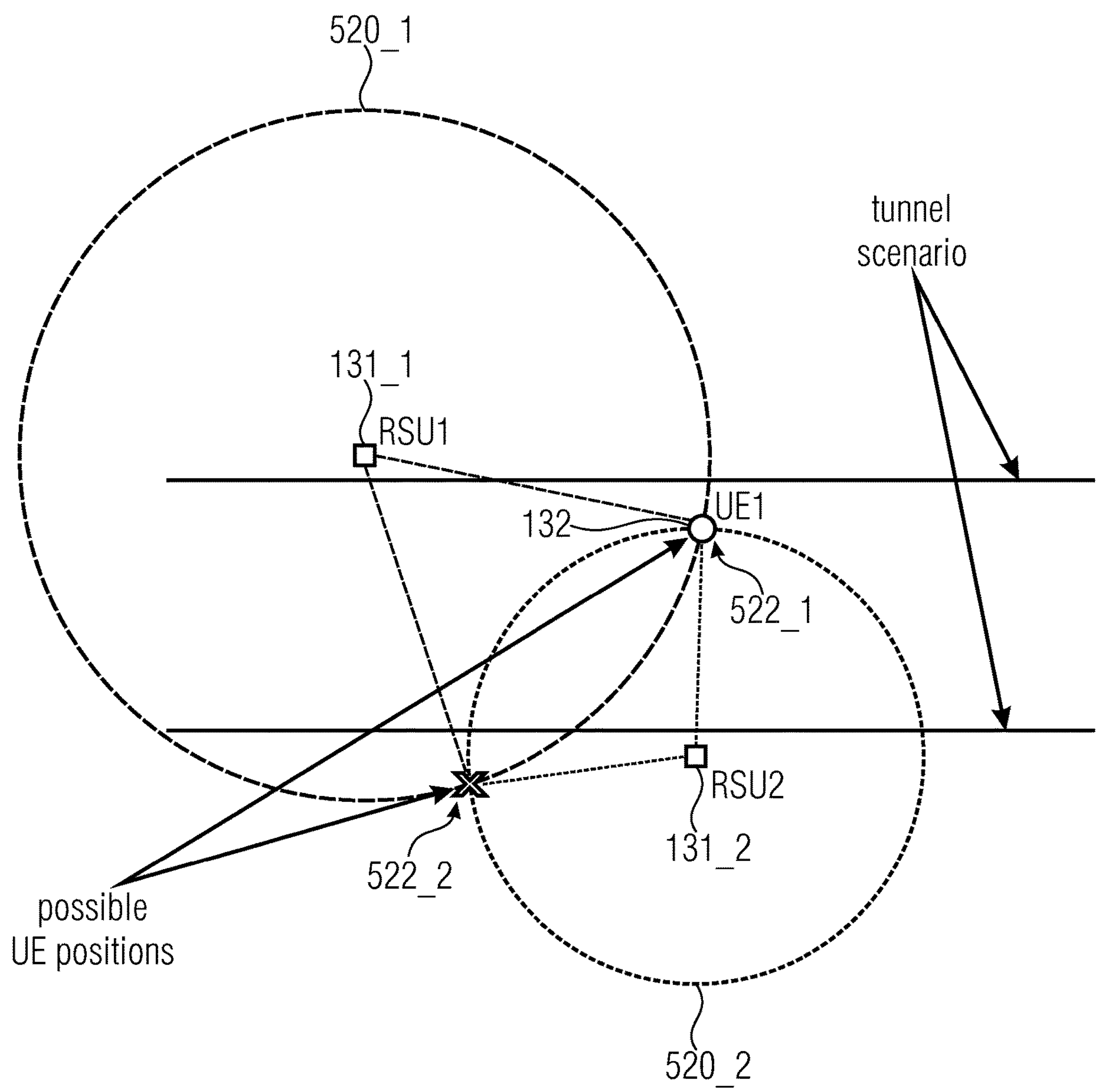
FIG. 24 shows a schematic view of a wireless communication network with two fixed transceivers and a transceiver, as well as TDOA functions describing candidate positions of the transceivers, according to an embodiment.

FIG. 24 shows a schematic view of a wireless communication network 100 with two fixed transceivers (e.g., road side units (RSUs)) and a transceiver (e.g., UE) as well as TDOA functions describing candidate positions of the transceivers. In other words, FIG. 24 shows a schematical sketch of RTT-Ranging in tunnel scenario.

In detail, FIG. 24 shows a first fixed transceiver (e.g., first road side unit (e.g., RSU1)) 131_1, a second fixed transceiver (e.g., second road side unit (e.g., RSU2)) 131_2. The two road side units are located at known positions in a tunnel or with respect to the tunnel. Aim is to determine the position of the transceiver (e.g., UE) 132 within the tunnel.

For that purpose, the first fixed transceiver (e.g., first road side unit (e.g., RSU1)) 131_1 can determine a first distance to the transceiver 132 using a two-way ranging method, to obtain a first function (e.g., a first circle) 520_1 describing a first plurality of possible locations of the transceiver 132.

Further, the second fixed transceiver (e.g., second road side unit (e.g., RSU2)) 131_2 can determine a second distance to the transceiver 132 using a two-way ranging method, to obtain a second function (e.g., a second circle) 520_2 describing a second plurality of possible locations of the transceiver 132.

After having determined the two functions 520_1 and 520_2 describing the candidate positions of the transceiver 132, intersections 522_1 and 522_2 between the two functions 520_1 and 520_2 can be determined, to delimit the candidate positions of the transceiver 132.

In detail, a first intersection 522_1 and a second intersection 522_2 between the first function (e.g., first circle) 520_1 and the second function (e.g., second circle) 520_2 can be determined, to delimit the first and second plurality of candidate positions of the transceiver 132 to two candidate positions, i.e., the first intersection 522_1 describes a first candidate position of the transceiver 132, where the second intersection 522_2 describes a second candidate position of the transceiver 132.

Then, it can be determined whether one of the two candidate positions 522_1 and 522_2 of the transceiver 132 is located outside the tunnel. If one of the two candidate positions 522_1 and 522_2 of the transceiver 132 is located outside the tunnel, then the other of the two candidate positions 522_1 and 522_2 can be selected as the position of the transceiver 132. If none of the two candidate positions 522_1 and 522_2 of the transceiver 132 is located outside the tunnel, then one of the two candidate positions 522_1 and 522_2 of the transceiver 132 can be selected based on an RSSI measurement of a signal received from the transceiver by at least one of the first and second fixed transceivers 131_1 and 131_2.

In other words, first, the range between the transceiver (e.g., UE) 132 and each fixed transceiver (e.g., RSU) 131_1 and 131_2 can be obtained. Second, intersection of circles around the fixed transceivers (e.g., RSUs) 131_1 and 131_2 with distance to the transceiver (e.g., UE) 132 delivers possible transceiver positions. Third, if one solution is outside of the tunnel, then the second intersection is the position of the transceiver (e.g., UE) and the method can be stopped here. Fourth, else if the real position can be distinguished by using RSSI measurements, then the position can be given out and the method can be stopped here. Fifth, otherwise in the next update rate it can be checked which position is reasonable and the position can be given out.

Figure 25:
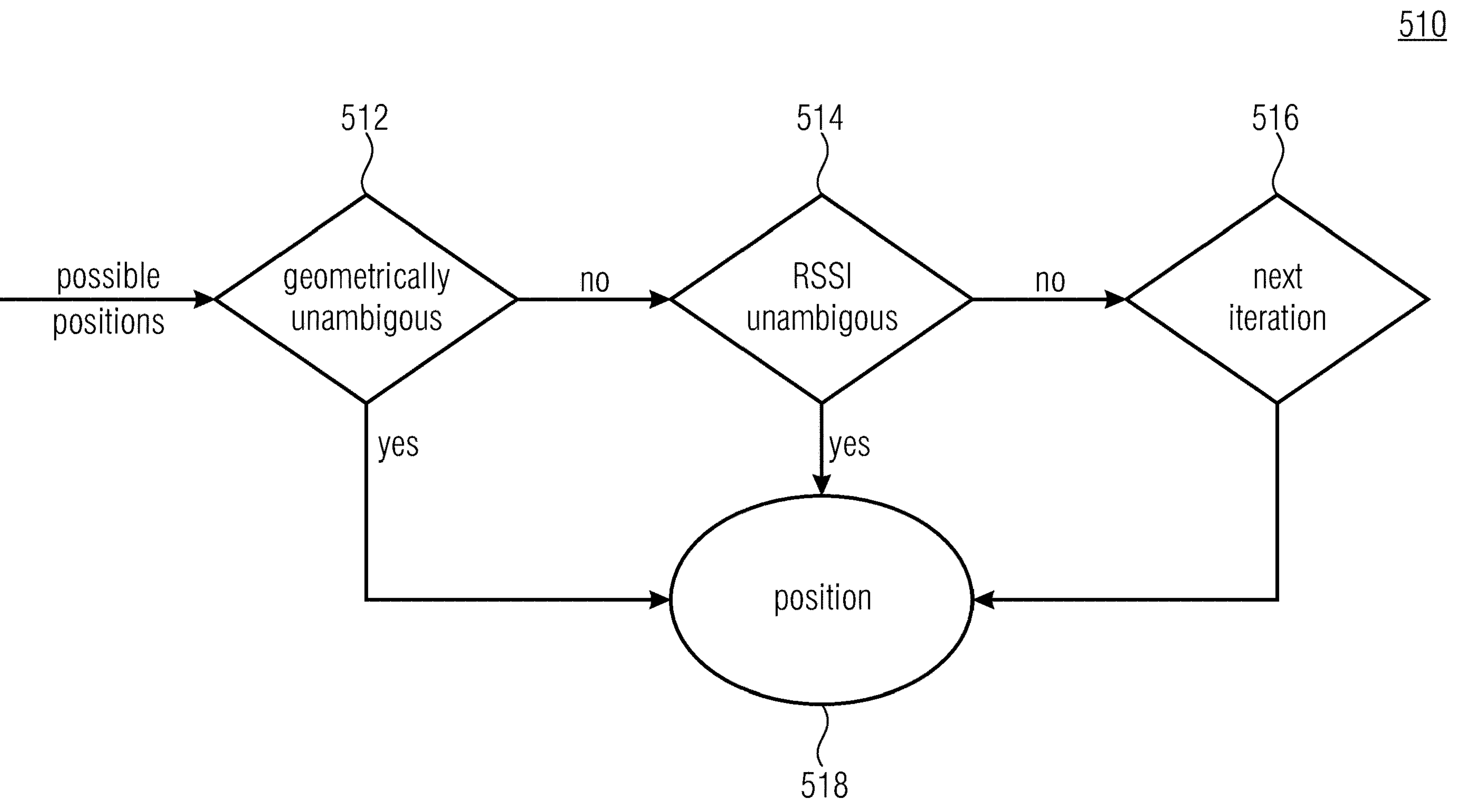
FIG. 25 shows a flowchart of a method for determining a position of a transceiver of a wireless communication system in a tunnel, according to an embodiment.

FIG. 25 shows another flowchart (sequence diagram) of a method 510 for determining a position of a transceiver of a wireless communication system 100 in a tunnel. In a first step 512, it can be determined whether the possible positions of the transceiver are geometrically unambiguous. If the positions of the transceiver are geometrically unambiguous, then the position is given out at step 518, else it is continued with the second step 514. In the second step it is determined whether RSSI measurements are unambiguous. If the RSSI measurements are unambiguous, then the position is given out at step 518, else it is continued with the third step 516, in which the method can be repeated in the next iteration step.

Calibration and Oscillator Effects

Figure 26:
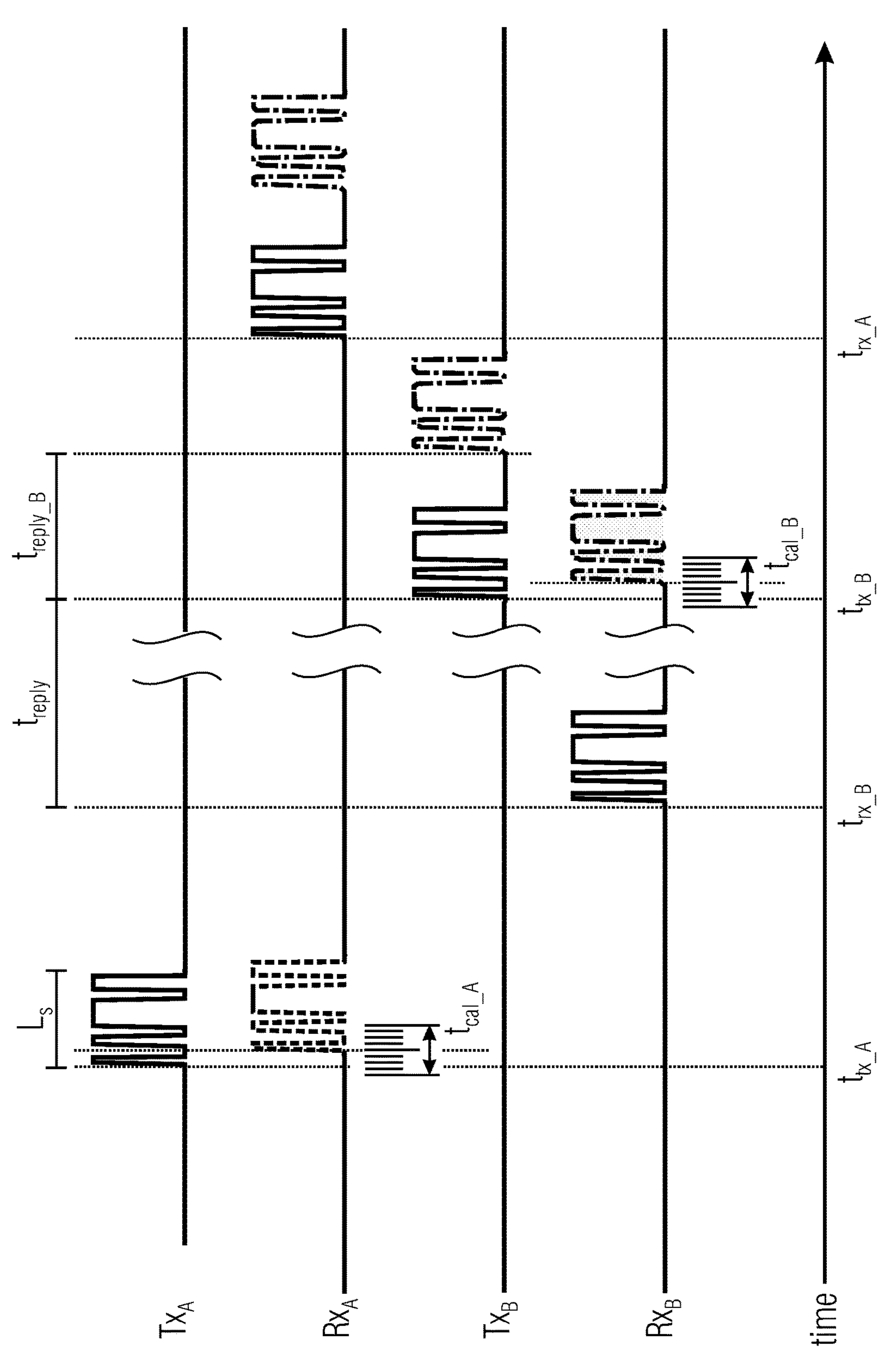
FIG. 26 shows in a diagram the transmission of the first signal and the second signal between the first user equipment and the second user equipment during ranging with online calibration, according to an embodiment.

If the devices are targeting very high accuracy and an online calibration is possible as shown in FIG. 26, then these calibration results can be reported back to the ranging device (e.g., first transceiver 132_1) or the location server (assuming the measurements are computed centrally).

In detail, FIG. 26 shows in a diagram the transmission of the first signal 136 and the second signal 138 between the first user equipment (UE1) 132_1 and the second user equipment (UE2) 132_2 during ranging with online calibration. Thereby, the ordinate denotes the respective Tx and Rx sidelink resource pools for UE1 and UE2 (i.e., $Tx_A$ and $Rx_A$ for UE1, and $Tx_B$ and $Rx_B$ for UE2), where the abscissa denotes the time. In other words, FIG. 26 shows an online calibration for the transceiver delays.

A further option is that a device requests a calibration process with a second device; they are then placed at known distance and the transceiver delay can then be estimated based on the difference between the known delay and measured one. In V2V (vehicle to vehicle) the on board sensors are in LOS scenario, these can be used for the initial calibration of the extra transceiver delays.

The mechanism has to take care of mobility, i.e. speed of involved devices. Frequency shift through Doppler has to be distinguished from oscillator "hardware" offsets.

In other cases, if the transceiver delays are known at the device, though, for example, manufacturer measurements, these should also be indicated in a flag.

Further Embodiments

Embodiments enable ranging on the sidelink given the current specifications and signaling constraints. Sidelink ranging enables estimating the distance between two or more sidelink devices. The fields in 3GPP where ranging on the sidelink can be applied are V2V, D2D or feD2D. Due to current signaling mechanisms over the sidelink, normal ranging cannot be applied, therefore, embodiments provide a method that enables ranging without major changes to current standards. In addition, embodiments make advantage from the distance measurements to get the absolute positioning estimates.

Sidelink ranging enables estimating the distance between two or more sidelink devices. Due to current signaling mechanism over the sidelink, normal ranging cannot be applied. The idea enables ranging or determining the distance separating user equipments given the signaling constraints under the current specification. Through resource allocation relative to the transmission periods from a sidelink enabled device a method to enable ranging can be applied. Embodiments also enable group ranging (i.e., ranging with multiple devices) with a low signaling overhead. In addition, several ways to make advantage from the distance measurements to get the absolute position positioning estimates are defined.

Embodiments assign ranging resources relative to the device performing the ranging measurement.

Embodiments enable group ranging with less signaling overhead.

Embodiments provide a mechanism to enable ranging for devices in and out of coverage applicable to ranging devices in and out of network coverage.

Embodiments define a "muting" pattern where the device has reserved ranging reception resources.

Embodiments enable a high accuracy mode that compensates the transceiver delay or/and enables more ranging responses.

Embodiments can be applied, for example, in services that involve (accurate) range information or positioning enhancement with ranging enhancement, such as

- finding the "relative range" in emergency situations: getting near or far from the device to discovered;
- providing absolute positioning in scenarios where synchronized networks are not available (Tunnel, shopping centers . . . );
- identifying a distance in V2X scenarios to assist other sensors; and
- UAVs cluster networks.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 27:
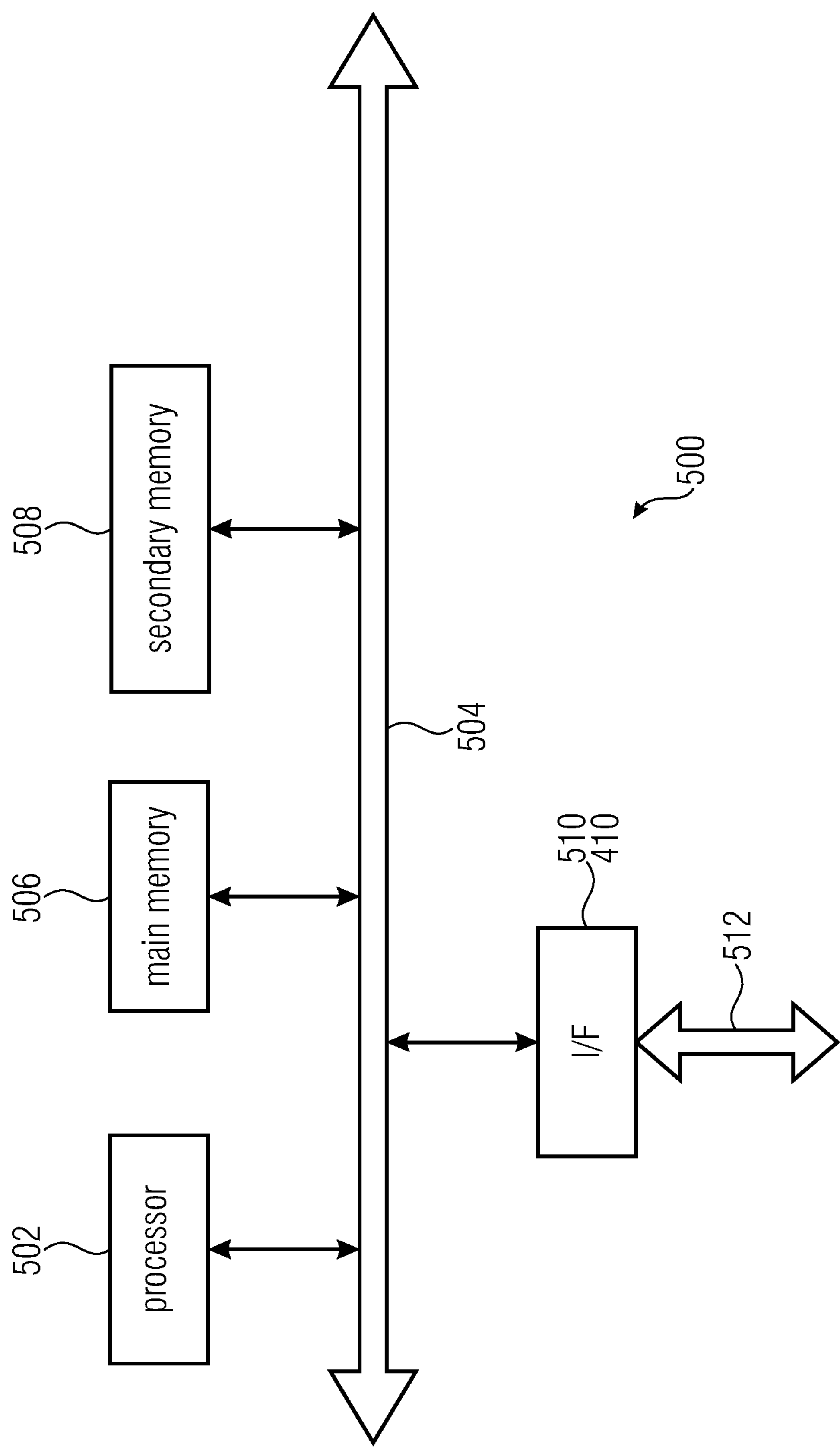
FIG. 27 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 27 illustrates an example of a computer system 500. The units or modules as well as the steps of the methods performed by these units may execute on one or more computer systems 500. The computer system 500 includes one or more processors 502, like a special purpose or a general purpose digital signal processor. The processor 502 is connected to a communication infrastructure 504, like a bus or a network. The computer system 500 includes a main memory 506, e.g., a random access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the form electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enable the computer system 500 to implement the present invention. In particular, the computer program, when executed, enable processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS eNB Enhanced
GNSS Global Navigation Satellite System
LS Location Server
LTE Long Term Evolution
OTDoA Observe Time Difference of Arrival
PCI Primary Cell Identifier
PRS Position Reference Signal
RSTD Reference Signal Time Difference
SDS Symmetric Double Sided
TOA Time of Arrival
TP Transmission Point
TRP Transmission/Reception Point
TWR Two Way Ranging
UAV Unmanned Aerial Vehicle
UE User Equipment

LIST OF REFERENCES

[1] NGMN Alliance a White Paper "Small Cell Backhaul Requirements", Version 1.0, Jun. 4, 2012
[2] Technical Specification 36.211 3GPP Physical Channels and Modulation 3rd Generation Partnership Project, 3rd Generation Partnership Project, 2016, V13.0.0
[3] Technical Specification 36.355 3GPP LTE Positioning Protocol (LPP) (Release 13) 3rd Generation Partnership Project, 3rd Generation Partnership Project, 2016
[4] TS 36.211 "E-UTRA Physical channels and modulation": Section 9-Sidelink
[5] TS 36.212 Section 5.4—Sidelink transport channels and control information
[6] TS 36.213 Section 14—UE procedure related to sidelink
[7] TS 36.331 Section 5.10, 6.3.8
[8] TS 36.101 A.6—Sidelink reference measurement channels

The invention claimed is:

1. A transceiver for a wireless communication system,
wherein the transceiver is configured to communicate with at least one other transceiver of the wireless communication system using a sidelink resource pool of the wireless communication system;
wherein the transceiver is configured to transmit signals on resources of the sidelink resource pool that are allocated to the transceiver on a period basis with equal length periods $t_{periodA}$;
wherein the transceiver is configured to transmit a first signal on a first resource of the resources allocated to the transceiver;
wherein the transceiver is configured to receive a second signal from another transceiver of the wireless communication system on a second resource, the second signal transmitted by the other transceiver responsive to a reception of the first signal, wherein the second signal is transmitted by the other transceiver on the second resource using the period $t_{periodA}$ based on which the resources are allocated to the transceiver;
wherein the transceiver is configured to determine a distance to the other transceiver based on a time $t_{roundA}$ between the transmission of the first signal and the reception of the second signal from the other transceiver, and based on the period $t_{periodA}$ based on which the resources are allocated to the transceiver;
wherein the second resource is one of the resources allocated to the transceiver following the first resource;
wherein the transceiver is configured to mute at least one transmission on at least one of the resources allocated to the transceiver following the first resource, to achieve at least one muted resource; and
wherein the second resource is one of the at least one muted resource.

2. The transceiver according to claim 1,
wherein the transceiver is configured to signal the second resource and/or the period $t_{periodA}$ based on which the resources are allocated to the transceiver.

3. The transceiver according to claim 1,
wherein the transceiver is configured to determine the distance to the other transceiver by determining a time $t_p$ the first signal and/or the second signal travels between the transceiver and the other transceiver based on
the time $t_{roundA}$ between the transmission of the first signal and the reception of the second signal from the other transceiver, and
the period $t_{periodA}$ based on which the resources are allocated to the transceiver.

4. The transceiver according to claim 3,
wherein the transceiver is configured to determine the distance to the other transceiver by determining the time $t_p$ the first signal and/or the second signal travels between the transceiver and the other transceiver further based on
a total response time $m \cdot T_s$ of the other transceiver, wherein m is a natural number equal to or greater than zero, wherein $T_s$ is a response time of the other transceiver.

5. The transceiver according to claim 1,
wherein the transceiver is configured to determine the distance $d_{AB}$ to the other transceiver based on the equation:

$$d_{AB} = \frac{t_{roundA} - N \cdot t_{periodA} - m \cdot T_s}{2} \cdot v$$

wherein $t_{roundA}$ is the time between the transmission of the first signal and the reception of the second signal, wherein N is a natural number equal to or greater than one, wherein $t_{periodA}$ is the period based on which the resources are allocated to the transceiver, wherein m is a natural number equal to or greater than zero, wherein $T_s$ is a response time of the other transceiver, and wherein v is a signal propagation speed.

6. The transceiver according to claim 1, wherein the second signal is transmitted by the other transceiver with a predetermined delay after the reception of the first signal or after a start of the reception of the first signal;

wherein the predetermined delay is a sum of a response time $T_s$ of the other transceiver and the period based on which the resources are allocated to the transceiver or a multiple thereof.

7. The transceiver according to claim 1, wherein the first signal is configured to cause the other transceiver to transmit the second signal.

8. The transceiver according to claim 1, wherein the second signal comprises ranging reference symbols.

9. The transceiver according to claim 1, wherein the transceiver is served by a central transceiver of the wireless communication system, a coverage area of the central transceiver comprising one zone or a plurality of zones, wherein the transceiver is configured to operate in a first mode of operation, including D2D Mode 1 or V2X Mode 3, in which scheduling of resources for the communication with the at least one other transceiver is performed by the central transceiver;

wherein the transceiver is configured to signal the second resource and/or the period $t_{periodA}$ based on which the resources are allocated to the transceiver, or wherein the second resource and/or the period $t_{periodA}$ based on which the resources are allocated to the transceiver are signaled by the central transceiver.

10. The transceiver according to claim 9, wherein the at least one muted resource is signaled using a muting pattern, the muting pattern indicating the at least one muted resource on which the transceiver expects a reception of the second signal.

11. The transceiver according to claim 1, wherein the transceiver and the other transceiver are located in a same zone, wherein the transceiver is configured to operate in a second mode of operation, including D2D Mode 2 or V2X Mode 4, wherein the transceiver is configured to schedule resources for sidelink communication autonomously or by sensing free channel resources;

wherein the transceiver is configured to signal the second resource and/or the period $t_{periodA}$ based on which the resources are allocated to the transceiver.

12. The transceiver according to claim 1, wherein the transceiver is configured to communicate with two or more other transceivers of the wireless communication system using the sidelink resource pool of the wireless communication system;

wherein the transceiver is configured to transmit a configuration message to the two or more other transceivers, wherein the configuration message comprises a resource pattern indicating one or more second resources selected out of the resources allocated to the transceiver;

wherein the transceiver is configured to receive second signals from the two or more other transceivers, wherein the second signals are transmitted by the two or more other transceivers responsive to a reception of the first signal, wherein the second signals are transmitted by the two or more other transceivers on one or more second resources using the period $t_{periodA}$ based on which the resources are allocated to the transceiver;

wherein the transceiver is configured, to determine distances to the two or more other transceivers based on times $t_{roundA}$ between the transmission of the first signal and the reception of the second signals from the two or more other transceivers, and based on the period $t_{periodA}$ based on which the resources are allocated to the transceiver.

13. The transceiver according to claim 12, wherein the transceiver is configured to transmit at least one configuration message to the two or more other transceivers.

14. The transceiver according to claim 12, wherein the transceiver is configured to allocate to each of the two or more other transceivers at least one second resource out of the resources allocated to the transceiver for transmitting the second signal;

wherein the configuration message further comprises a resource allocation information allocating to each of the two or more other transceivers the respective one or more second resources.

15. The transceiver according to claim 14, wherein the transceiver is configured to allocate for each of the two or more other transceivers the at least one or more second resources based on a signal-to-noise ratio of a signal received from the respective other transceiver.

16. The transceiver according to claim 15, wherein the at least one or more second resources comprise two or more second resources;

wherein the transceiver is configured to allocate a first resource of the at least two or more second resources to a first transceiver of the two or more other transceivers, a signal received from which comprises a higher signal-to-noise ratio than a signal received from a second transceiver of the two or more other transceivers; and wherein the transceiver is configuring to allocate a second resource of the at least two or more second resources to the second transceiver of the two or more other transceivers;

wherein the second resource follows the first resource in time.

17. The transceiver according to claim 14, wherein the transceiver is configured to allocate to at least two other transceivers out of the two or more other transceivers the same one or more second resources;

wherein the transceiver is configured to allocate to the at least two other transceivers different codes for separating the second signals transmitted by the at least two other transceivers on the same one or more second resources, or to allocate to the at least two other transceivers different resource elements of the same one or more second resources for separating the second signals transmitted by the at least two other transceivers on the same one or more muted resource;

wherein the resource allocation information of the one configuration message further allocates the different codes or different resource elements to the at least two other transceivers.

18. A system, comprising:

a transceiver for a wireless communication system, wherein the transceiver is configured to communicate with at least one other transceiver of the wireless communication system using a sidelink resource pool of the wireless communication system;

wherein the transceiver is configured to transmit signals on resources of the sidelink resource pool that are allocated to the transceiver on a period basis with equal length periods $t_{periodA}$;

wherein the transceiver is configured to transmit a first signal on a first resource of the resources allocated to the transceiver;

wherein the transceiver is configured to receive a second signal from another transceiver of the wireless communication system on a second resource, the second signal transmitted by the other transceiver responsive to a reception of the first signal, wherein the second signal is transmitted by the other transceiver on the second resource using the period $t_{periodA}$ based on which the resources are allocated to the transceiver;

wherein the transceiver is configured to determine a distance to the other transceiver based on a time $t_{roundA}$ between the transmission of the first signal and the reception of the second signal from the other transceiver, and based on the period $t_{periodA}$ based on which the resources are allocated to the transceiver;

wherein the second resource is one of the resources allocated to the transceiver following the first resource;

wherein the transceiver is configured to mute at least one transmission on at least one of the resources allocated to the transceiver following the first resource to achieve at least one muted resource;

wherein the second resource is one of the at least one muted resource; and the other transceiver, wherein the other transceiver is configured to transmit the second signal responsive to the reception of the first signal, wherein the other transceiver is configured to transmit the second signal on the second resource using the period based on which the resources are allocated to the transceiver.

19. The system according to claim 18, wherein the other transceiver knows the second resource and/or the $t_{periodA}$ based on which the resources are allocated to the transceiver.

20. The system according to claim 18, wherein the other transceiver is configured to receive signaling information from the transceiver or a central transceiver of the wireless communication system, the signaling information indicating the second resource and/or the $t_{periodA}$ based on which the resources are allocated to the transceiver.

21. The system according to claim 18, wherein the other transceiver is configured to determine the $t_{periodA}$ based on which the resources are allocated to the transceiver based on a reception of at least two first signals from the transceiver on at least two different resources allocated to the transceiver.

22. A method for determining a distance between a first transceiver and a second transceiver of a wireless communication system, the first transceiver and the second transceiver communicating with each other using resources of a sidelink resource pool allocated to the first transceiver on a period basis with equal length periods and allocated to the second transceiver on a period basis with equal length periods, the method comprising:

transmitting, by the first transceiver, a first signal on a first resource of the resources allocated to the first transceiver;

muting at least one transmission on at least one of the resources allocated to the transceiver following the first resource, to obtain at least one muted resource;

transmitting, by the second transceiver, a second signal responsive to the reception of the first signal, wherein the second signal is transmitted by the second transceiver on a second resource using the period based on which the resources are allocated to the first transceiver, wherein the second resource is one of the at least one muted resource;

receiving, by the first transceiver, the second signal transmitted by second transceiver; and determining a distance between the first transceiver and the second transceiver based on a time between the transmission of the first signal by the first transceiver and the reception of the second signal by the first transceiver, and based on the period based on which the resources are allocated to the first transceiver, wherein the second resource is one of the resources allocated to the transceiver following the first resource.

* * * * *